(12) United States Patent
Seidel et al.

(10) Patent No.: US 7,779,943 B2
(45) Date of Patent: Aug. 24, 2010

(54) HYBRID-POWERED SLOW-SPEED VEHICLE, VEHICLE TRAVEL-RANGE EXTENSION METHOD, AND METHOD OF HYBRID-VEHICLE MANUFACTURE

(75) Inventors: Richard Bruce Seidel, The Villages, FL (US); Edmund James Bowen, Williamsburg, MI (US)

(73) Assignee: Bosye, LLC, The Villages, FL (US)

( * ) Notice: Subject to any disclaimer, the term of this patent is extended or adjusted under 35 U.S.C. 154(b) by 43 days.

(21) Appl. No.: 12/287,457

(22) Filed: Oct. 8, 2008

(65) Prior Publication Data

US 2010/0084211 A1  Apr. 8, 2010

(51) Int. Cl.
*B60W 10/24* (2006.01)

(52) U.S. Cl. .............................. 180/65.29; 180/65.25

(58) Field of Classification Search ............... 180/65.28, 180/65.25, 65.225, 65.245, 65.1, 65.8, 65.29; 903/903, 906, 913

See application file for complete search history.

(56) References Cited

U.S. PATENT DOCUMENTS

| | | | |
|---|---|---|---|
| 3,115,945 A | | 12/1963 | Dry et al. |
| 3,650,345 A | | 3/1972 | Yardney |
| 4,042,056 A | | 8/1977 | Horwinski |
| 4,180,138 A | | 12/1979 | Shea |
| 4,199,037 A | * | 4/1980 | White .................... 180/65.245 |
| 4,335,797 A | | 6/1982 | Simmons |
| 4,351,405 A | * | 9/1982 | Fields et al. ........... 180/65.225 |
| 4,744,430 A | | 5/1988 | McCoy |
| 5,668,984 A | * | 9/1997 | Taborn et al. ................ 712/222 |
| 5,704,440 A | | 1/1998 | Urban et al. |
| 5,845,731 A | | 12/1998 | Buglione et al. |
| 5,890,554 A | | 4/1999 | Sturges |
| 5,908,077 A | * | 6/1999 | Moore ...................... 180/65.25 |
| 5,960,897 A | * | 10/1999 | Furuya et al. ............ 180/65.28 |
| 6,179,078 B1 | | 1/2001 | Belloso |
| 7,014,202 B2 | | 3/2006 | Bigsby |
| 7,252,165 B1 | * | 8/2007 | Gruenwald et al. ....... 180/65.25 |
| 7,392,871 B2 | | 7/2008 | Severinsky et al. |
| 7,449,793 B2 | | 11/2008 | Cho et al. |
| 2006/0097670 A1 | * | 5/2006 | Fukasaku et al. ............ 318/105 |

OTHER PUBLICATIONS

Dwangyahoo, Portable Generator, EVTrader.com Forum, May 29, 2007, p. 4 of 4, http://evtrader.strongpossibilities.com/forums/viewtopic.php?t=65&start=45, EVTrader.com, US.

* cited by examiner

*Primary Examiner*—Hau V Phan

(57) ABSTRACT

A hybrid-powered slow-speed vehicle (400) fundamentally comprising battery-electric slow-speed (BESS) vehicle (107) plus auxiliary-drive ICE-powertrain (200), hub-coaxial wheel positioner (269) and auxiliary-drive operational controller assembly (300); powertrain (200) having [a] high energy-density fuel supply (203), sufficient auxiliary driveline operational space (283) urged by wheel-positioner (269), [c] auxiliary-power driveline (235), component couplings of the driveline (235) ending with operable attachment of distal powerwheel (256) to auxiliary-driveline rear traction-wheel (262); operational controller assembly (300) within vehicle-driver zone (110); hybridized BESS-vehicle (400) extending travel range (145) of original BESS-vehicle (107), utilizing primary electric powertrain (151) and auxiliary ICE-powertrain (200) in various cooperative sequences and combinations of operations, retaining many advantages of original vehicle (107), while adding others, especially notably the opportunities to extend battery life, to augment vehicle power, and to increase the attainable primary travel-range (145) between plug-in rechargings of primary battery (154).

8 Claims, 51 Drawing Sheets

FIG. 7  (PRIOR ART)

TABLE II :   CERTAIN SPECIFICATIONS FOR A BESS-VEHICLE, VEHICLE-107

CURB WEIGHT -- 445 KG (980 LBS)

GROSS VEHICLE WEIGHT RATING (GVWR) -- 725 KG (1600 LBS)

VEHICLE PAYLOAD RATING (144) -- 280 KG (620 LBS)

MAXIMUM FORWARD VEHICLE SPEED(142) -- 40 KM/H (25 MPH)

TRAVEL RANGE (145) -- ROUGHLY 48-56 KM (30-35 MI)

POWERTRAIN DRIVE-LINK -- FRONT WHEEL PRIMARY POWERTRAIN (151)

Figure 1:
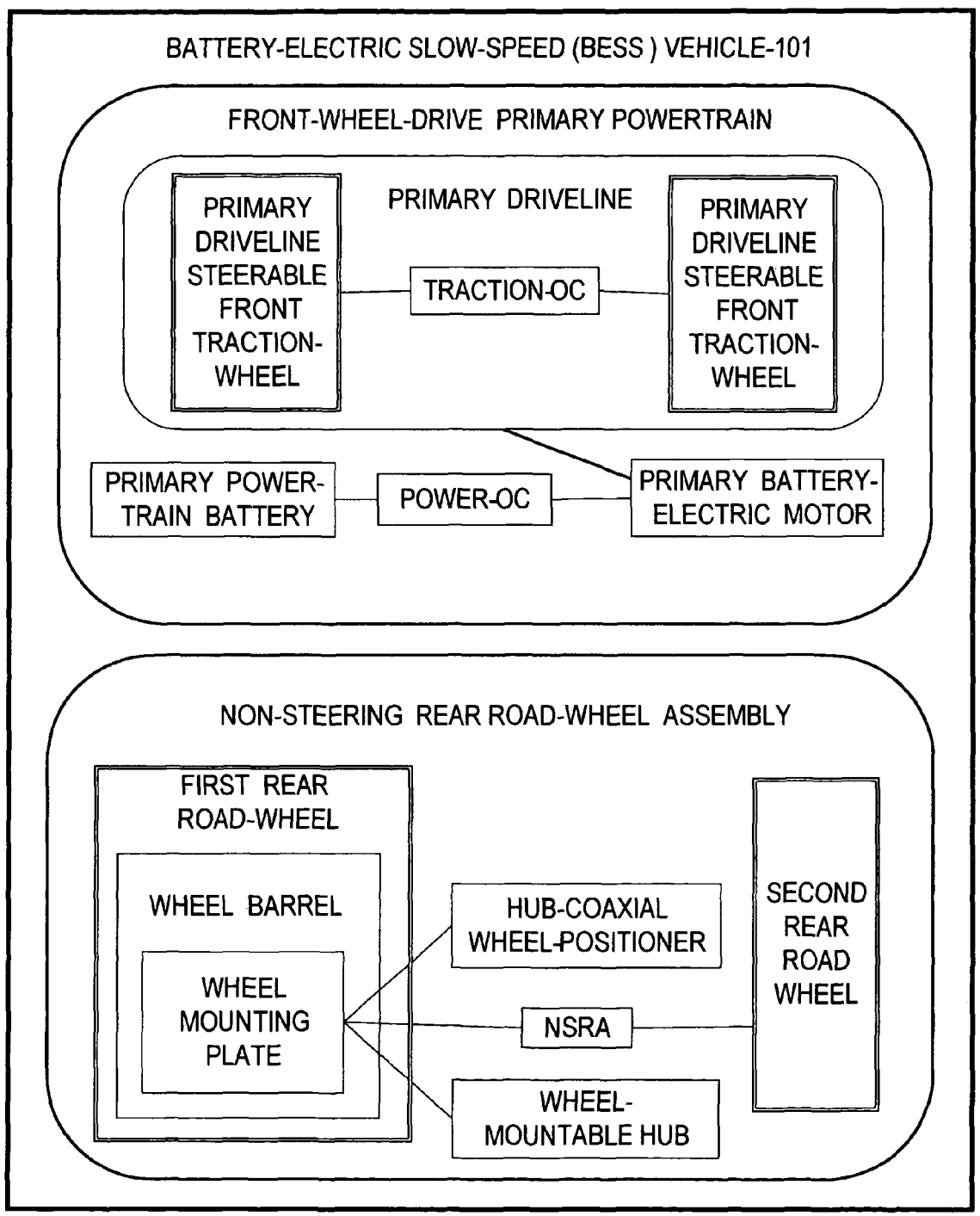

BATTERY (154) -- SIX BATTERY ARRAY, 12V, DEEP-CYCLE FLOODED
 LEAD-ACID, TROJAN_ SSC225

MOTOR BRAND -- GENERAL ELECTRIC DC-MOTOR

MOTOR HP -- 3.5HP (2.6KW) @ 4500 RPM

MOTOR TORQUE -- SAE NET TORQUE 5.2 LBS-FT (7 N-M) @ 2000 RPM

MOTOR OPERATING RANGE -- 2500 - 4000 RPM

NON-STEERING REAR ROAD-WHEELS (118) --
 18-IN TIRE OD (123);  REAR ROAD-WHEEL BARREL (124) HAVING
 10-IN OD (126);  & ZERO-OFFSET, 4 LUG-HOLE, REAR-BARREL
 WHEEL MOUNTING-PLATE (125)

DIFFERENTIAL -- DANA SPICER

MOTOR CONTROLLER -- GE

BATTERY CHARGER -- SCHOTT ONBOARD PLUG-IN SMART CHARGER

ACCELERATOR -- FOOT-PEDAL CONTROLLED

GENERALLY-AFT
VEHICLE SPACE
(109)

BESS-VEHICLE
(107)

GENERALLY-AFT
VEHICLE SPACE
(109)

BESS-VEHICLE
(107)

AFT-   -SPAT

BESS-VEHICLE (107)

(AFT-SPAT REMOVED)

BESS-VEHICLE (108)

GENERALLY-AFT VEHICLE SPACE (109-8)

FIG.11

-- TABLE III --
VARIOUS SPECIFICATIONS FOR ONE EXEMPLARY AUXILIARY-DRIVE POWERTRAIN 200

*ENGINE: INTERNAL COMBUSTION (SPARK IGNITION) SMALL ENGINE
    CLASSIFICATION, HONDA(TM)GXH100, GX-SERIES,
    COMMERCIAL GRADE (ICE 201)
*FEATURES: OVERHEAD VALVE DESIGN
*DIMENSIONS: 295MM (11.6IN) X 304MM (12IN) X 402MM (15.8IN)
*DRY WEIGHT: 10.6KG (23.4LB)
*SUITABLE FUEL (AUXILIARY-POWER ONBOARD FUEL-SUPPLY 203):
    UNLEADED REGULAR GASOLINE WITH UP TO 10% ETHANOL
*FUEL CAPACITY (ENGINE-INTEGRAL FUEL TANK): 0.77L (0.81USQT)
*NET HORSEPOWER OUTPUT (ENGINE-HP 204): 2.8HP (2.1KW) @ 3600 RPM
*PTO SHAFT (217): HORIZONTAL, COUNTER-CLOCKWISE ROTATION
*NET TORQUE (ENGINE-TORQUE 205): 4.2LBS-FT (5.7N-M)@3600RPM
*IDLE SPEED (ENGINE IDLE-SPEED 206): APPROX. 1500RPM
*OEM-RECOMMENDED OPERATING RANGE (RANGE 207):2500 - 4000 RPM
*PROXIMAL SHEAVE OUTER-DIAMETER (OD 239):36MM (1.4IN)
*DISTAL SHEAVE OUTER-DIAMETER (OD 257): 305MM (12IN)
*DISTAL SHEAVE INNER-DIAMETER (ID 258): 203MM (8IN)
*HUB-COAXIAL WHEEL POSITIONERS (269):
    **REAR WHEEL SPACER (270): 26MM (1IN)
    **WHEEL-MOUNTING LUG-SET (353) --
        ***FIRST LUG-SET (354)
        ***SECOND LUG-SET (355)

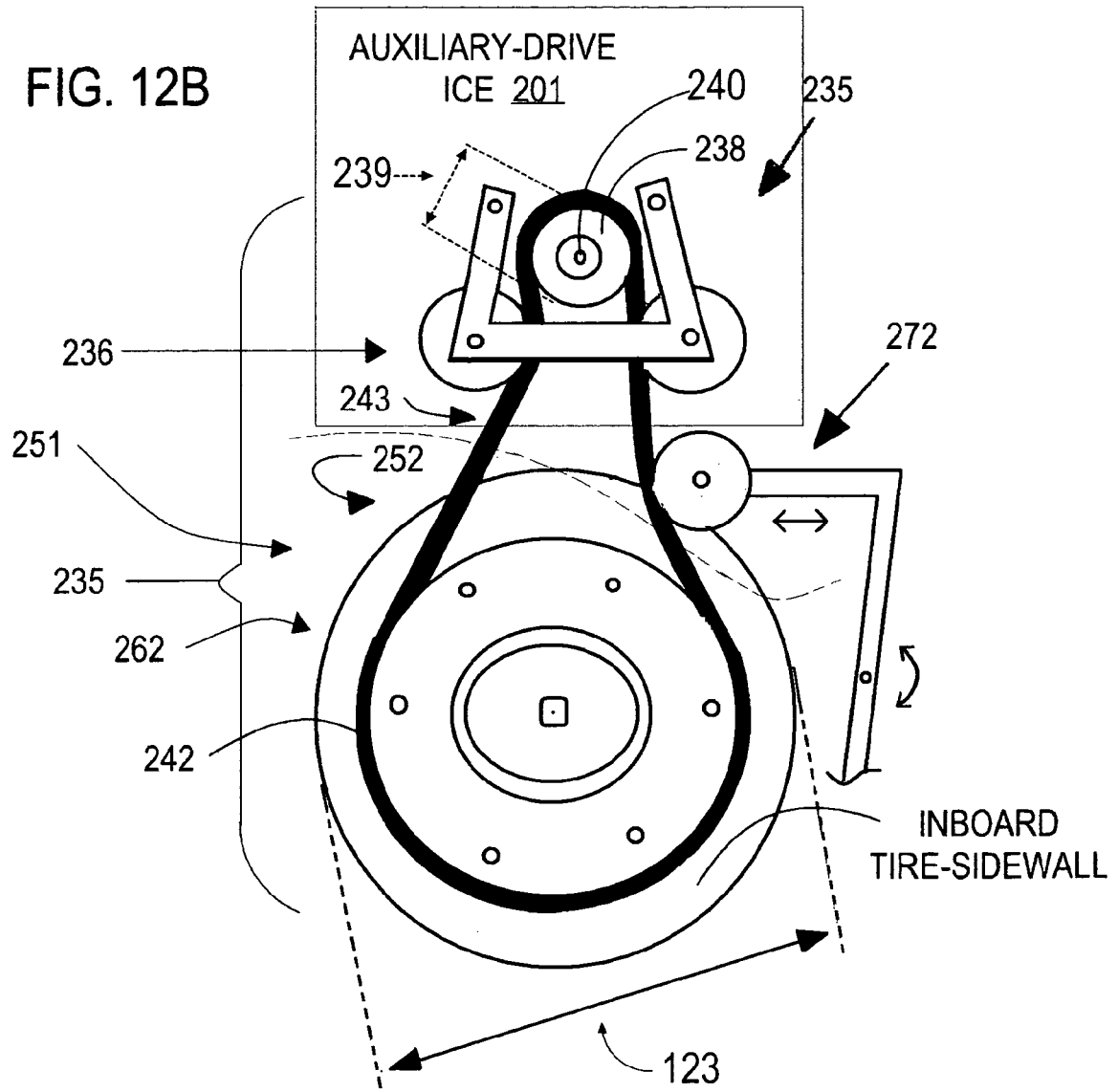

PARKING BRAKE HANDLE

FLOWCHART I
STEPS IN A METHOD (500) OF HYBRID-VEHICLE MANUFACTURE

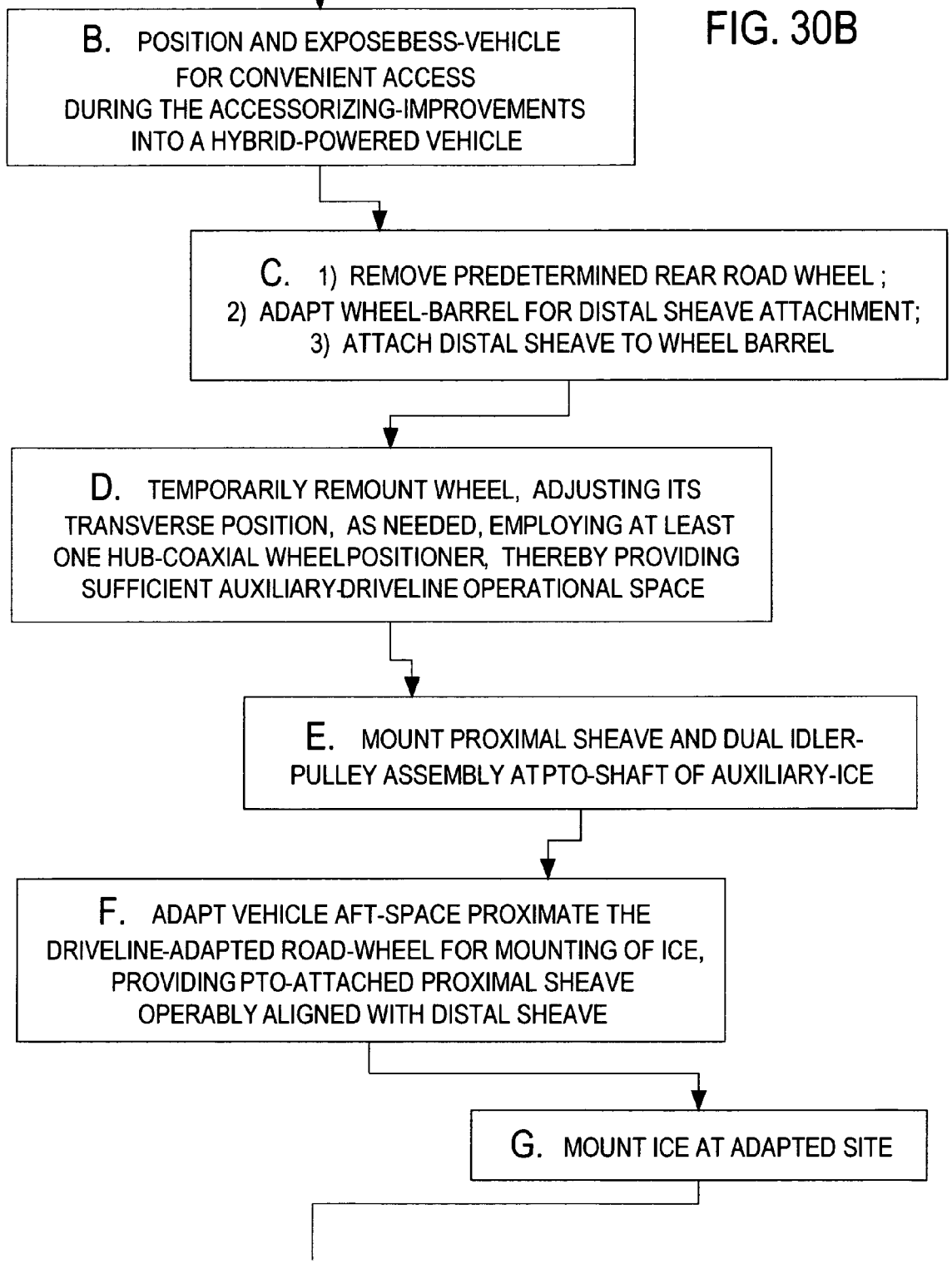

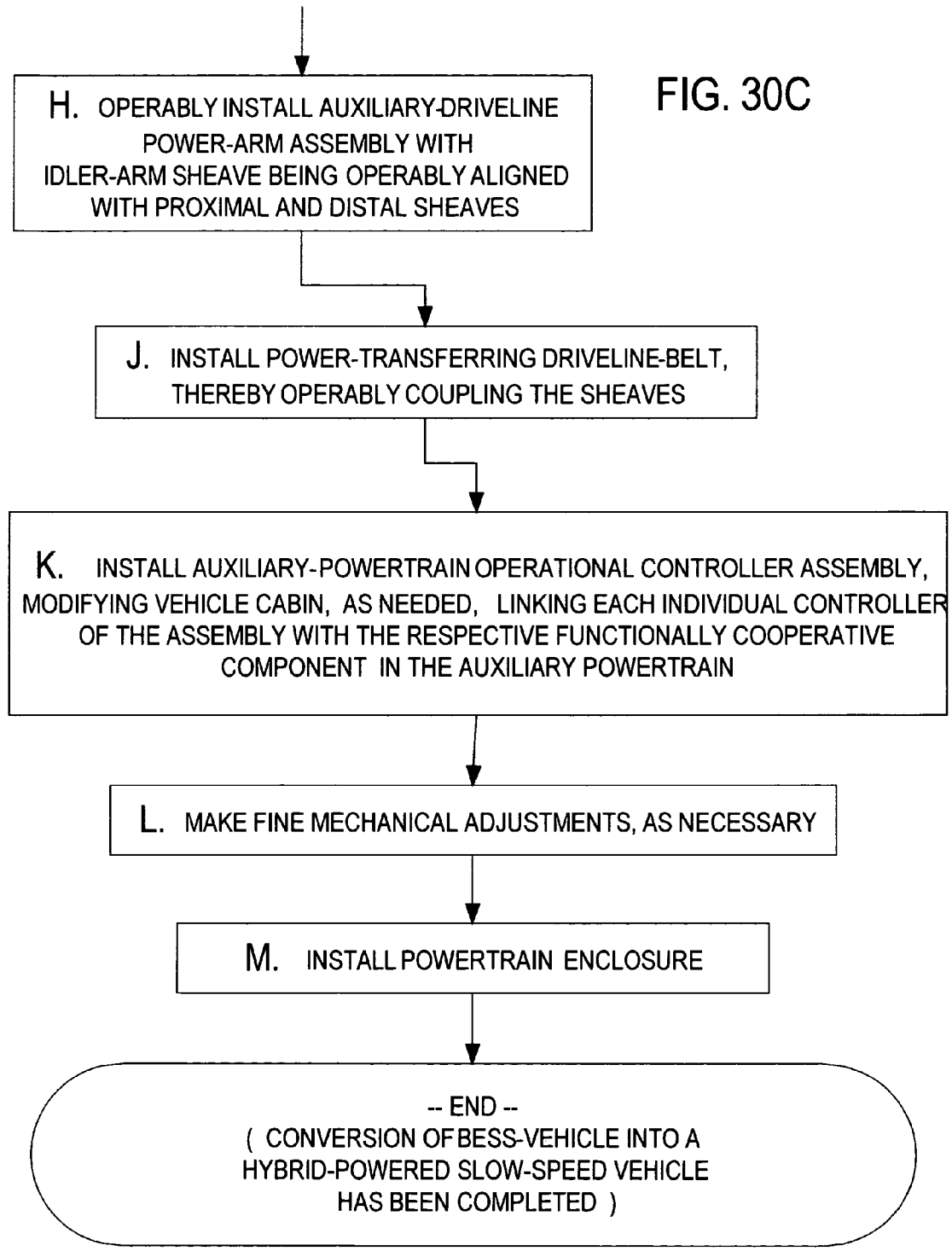

FLOWCHART II

METHOD (600) OF TRAVEL-RANGE EXTENSION
IN A BESS-VEHICLE

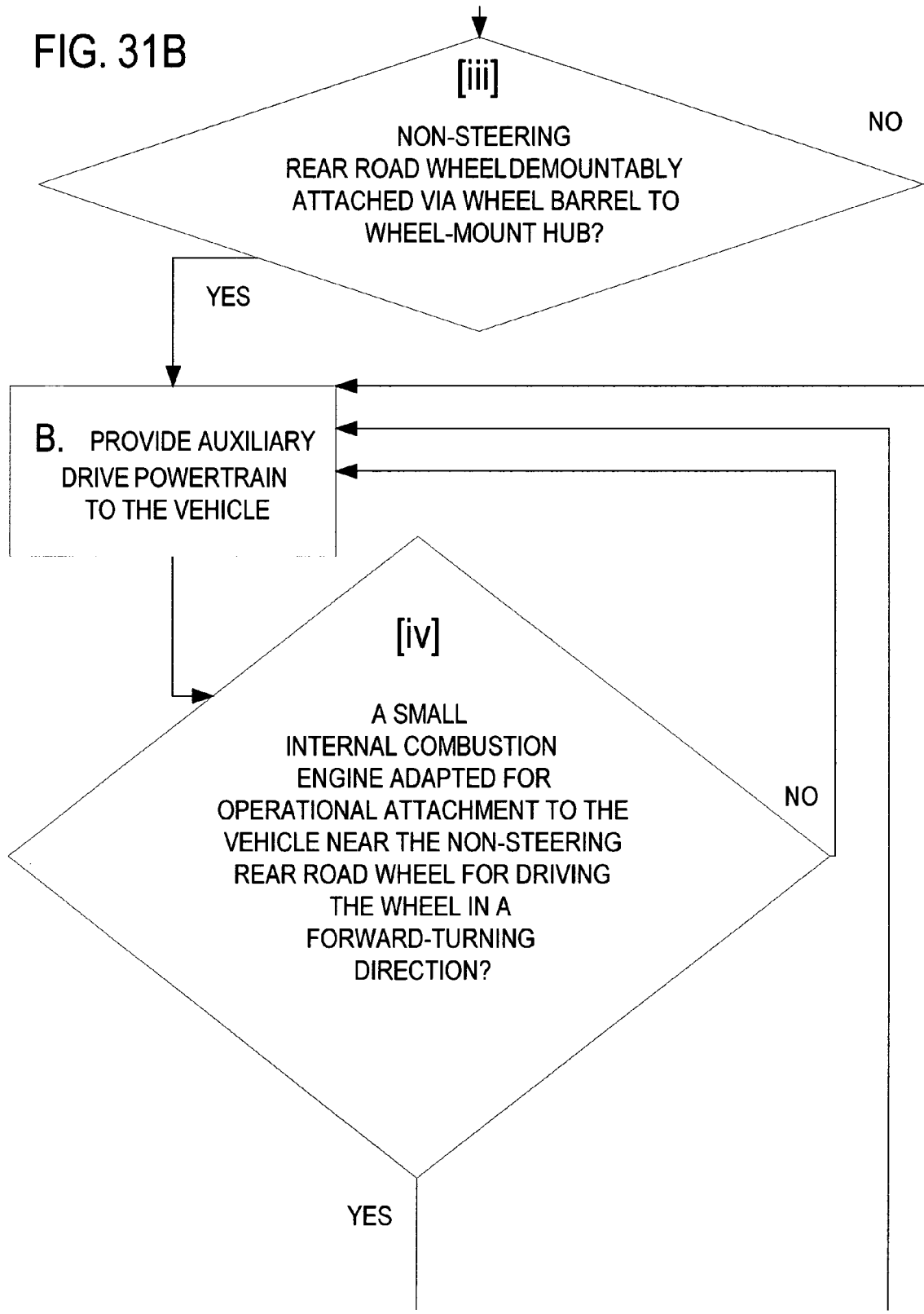

FIG. 31D

D.
OPERATE THE HYBRID-POWERED VEHICLE APPLYING TORQUE PROVIDED BY PRIMARY AND AUXILIARY POWERTRAINS IN VARIOUS SEQUENCES AND COMBINATIONS, EMPLOYING COMPLEMENTARY AND COOPERATIVE CONTRIBUTIONS OF EACH POWERTRAIN TO VEHICLE DRIVE -------

GENERALLY USING THE PRIMARY ELECTRIC POWERTRAIN FOR STARTS OF VEHICLE DRIVE AND FOR LOW TO MODERATE VEHICLE-SPEED OPERATION ------

GENERALLY STARTING THE AUXILIARY ICE WHEN THE VEHICLE REACHING LOW TO MODERATE VEHICLE-SPEEDS, PROPELLING THE VEHICLE USING THE AUXILIARY POWERTRAIN WITH OR WITHOUT CONTRIBUTIONS FROM PRIMARY POWERTRAIN ------

GENERALLY STOPPING THE ICE WHEN VEHICLE SPEED FALLS BELOW AUXILIARY-POWERTRAIN ENTRY SPEED, AT THOSE POINTS RESUMING SOLELY-PRIMARY POWERTRAIN DRIVE;

THEREBY REACHING EXTENDED TRAVEL RANGES FOR HYBRID-POWERED VEHICLE PER BATTERY FULL-CHARGE COMPARED TO BESS-VEHICLE RANGE; AND GENERALLY DURING LOW TO MODERATE VEHICLE SPEEDS ENJOYING SECONDARY BENEFITS OF THE ABSENCES OF AUXILIARY FUEL CONSUMPTION, OF COMBUSTION-RELATED NOISES, AND OF COMBUSTION-RELATED GASEOUS AND PARTICULATE EMISSIONS

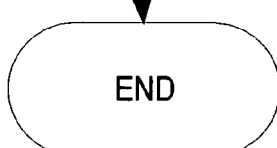

END (109-8) GAVS = GENERALLY-AFT VEHICLE SPACE;
(110-8) DROZ = DRIVER-REACHABLE OPERATIONAL ZONE; (235-8) APD = AUXILIARY-POWER DRIVELINE; (283-8) ADOS = AUXILIARY-DRIVELINE OPERATIONAL SPACE; (301) RESC = REMOTE ENGINE- STARTUP CONTROLLER; (302) RTC = REMOTE THROTTLE CONTROLLER; (303) ROOCC = REMOTE ON-OFF CIRCUIT CONTROLLER; (304) RMCC = REMOTE MANUAL CHOKE CONTROLLER; OC = OPERATIONAL COUPLING; M' = MOUNTING; W' = WHEEL

Figure 35E:
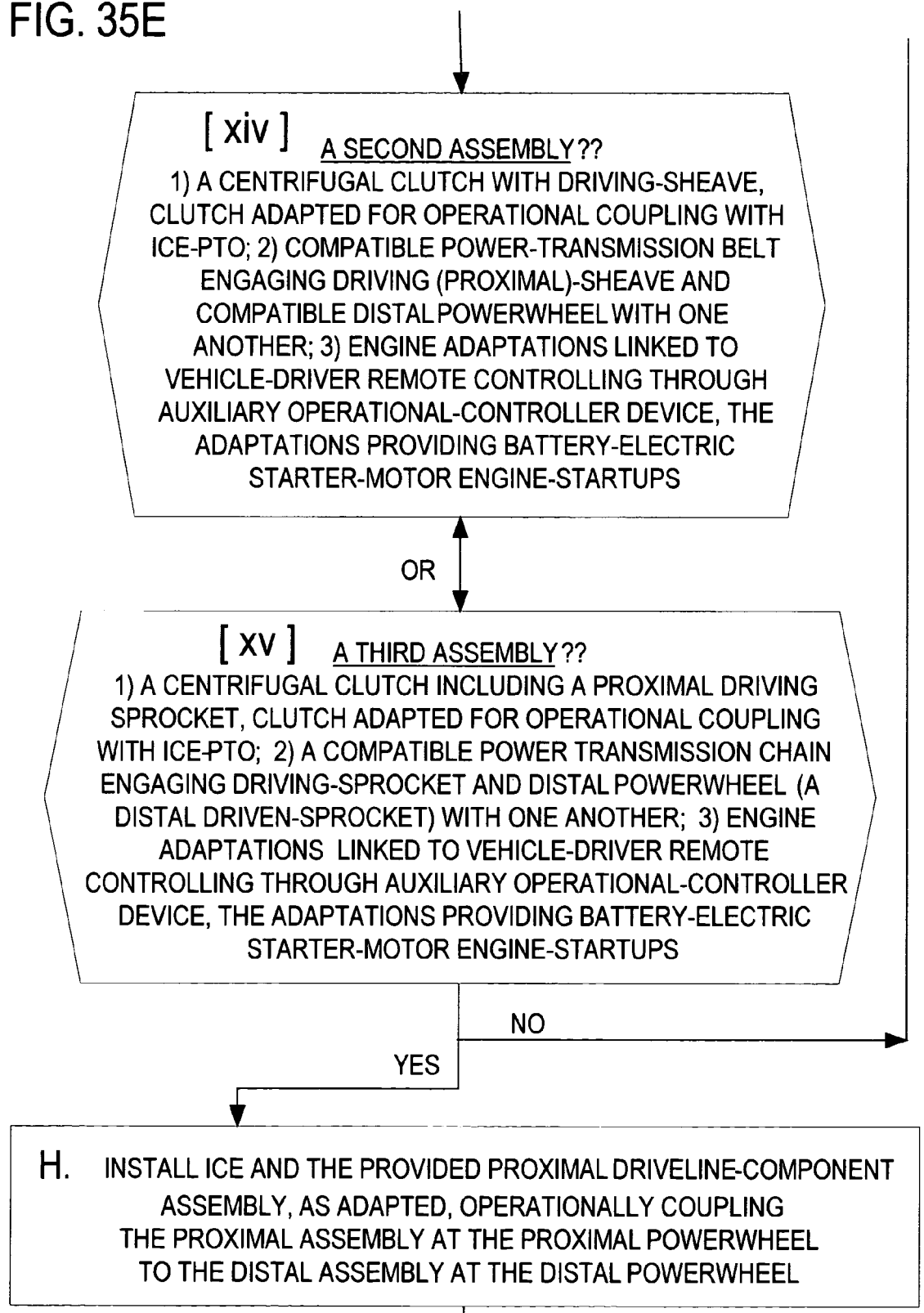

FIG. 35A  FLOWCHART III
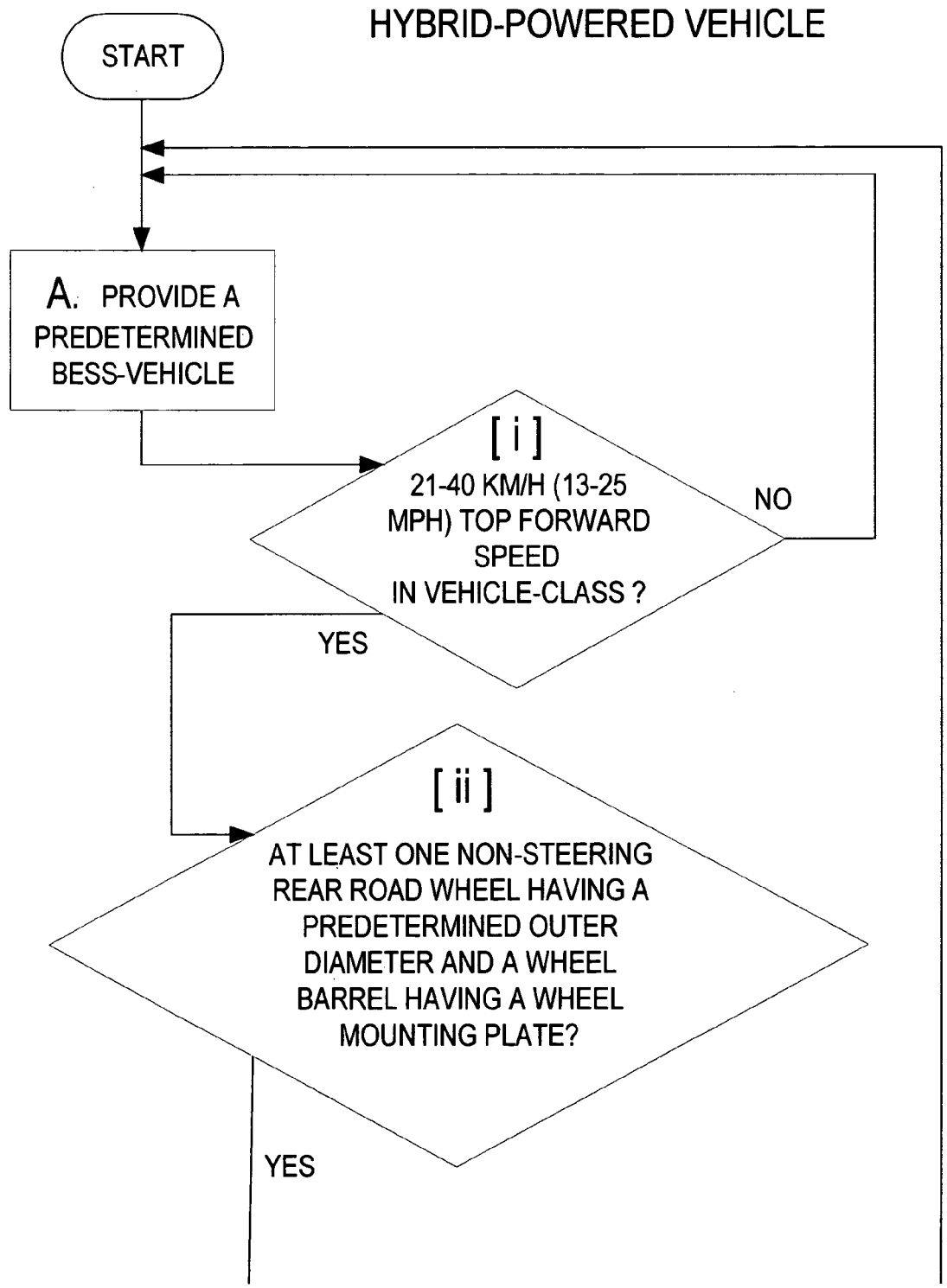

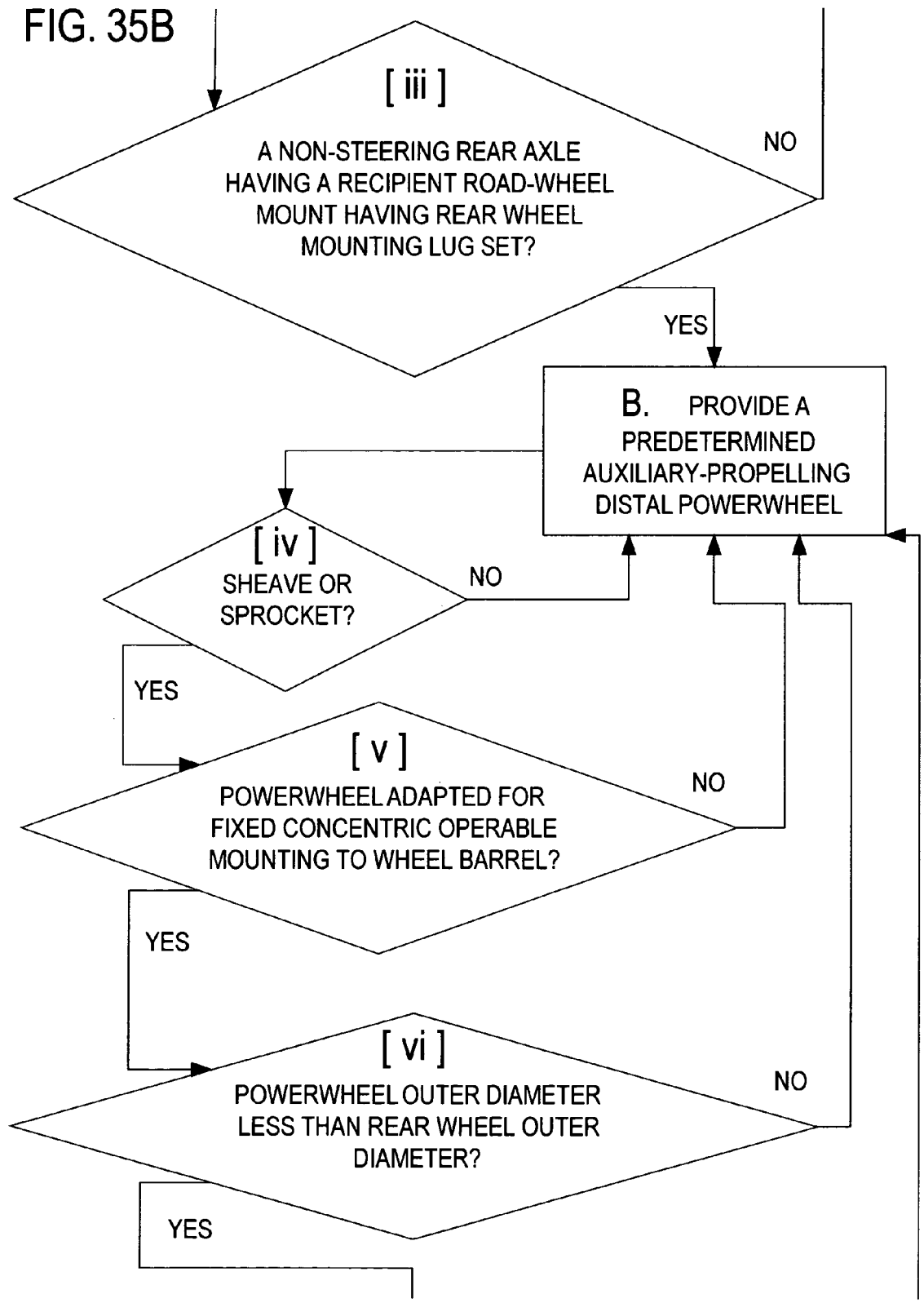

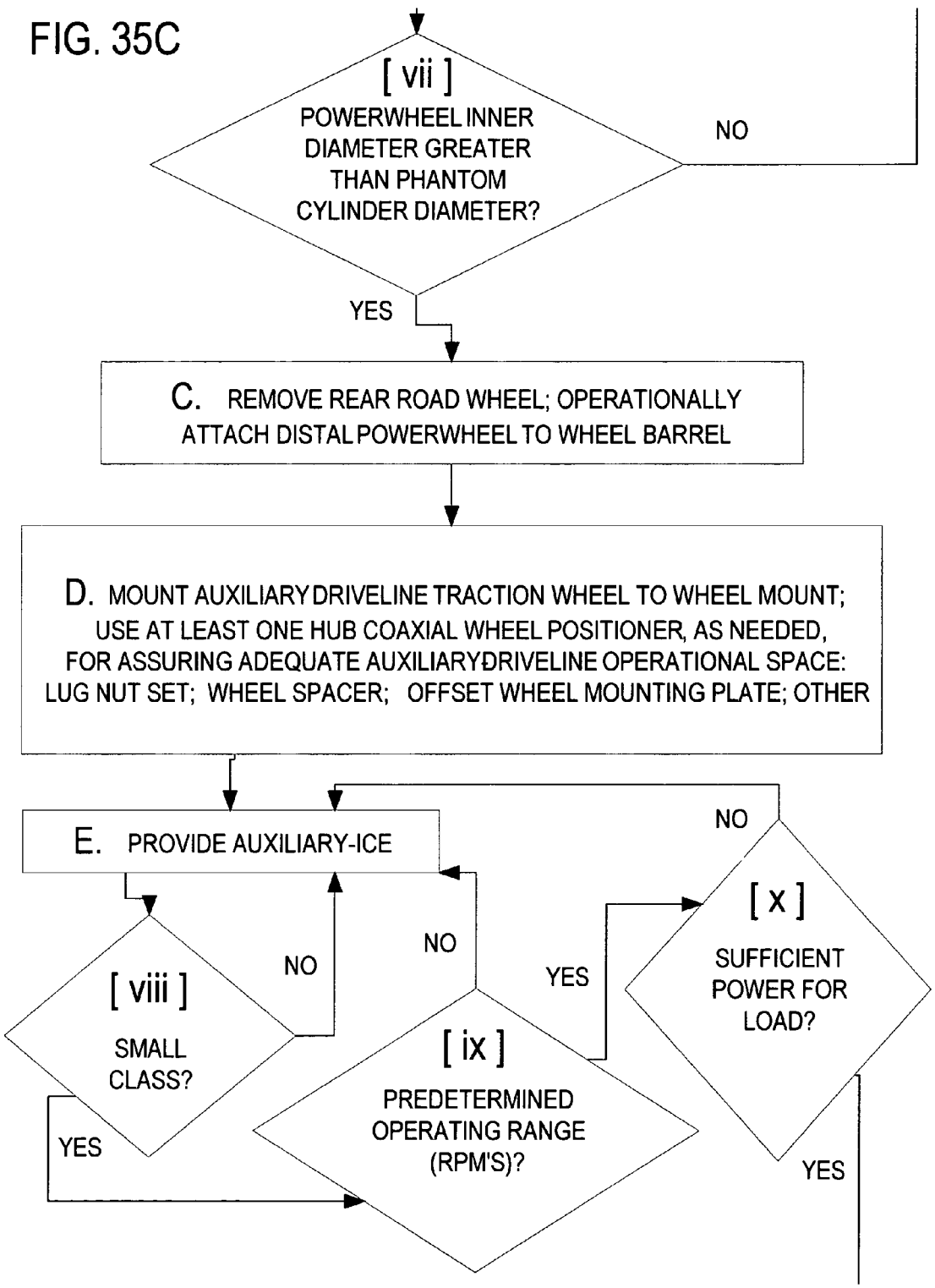

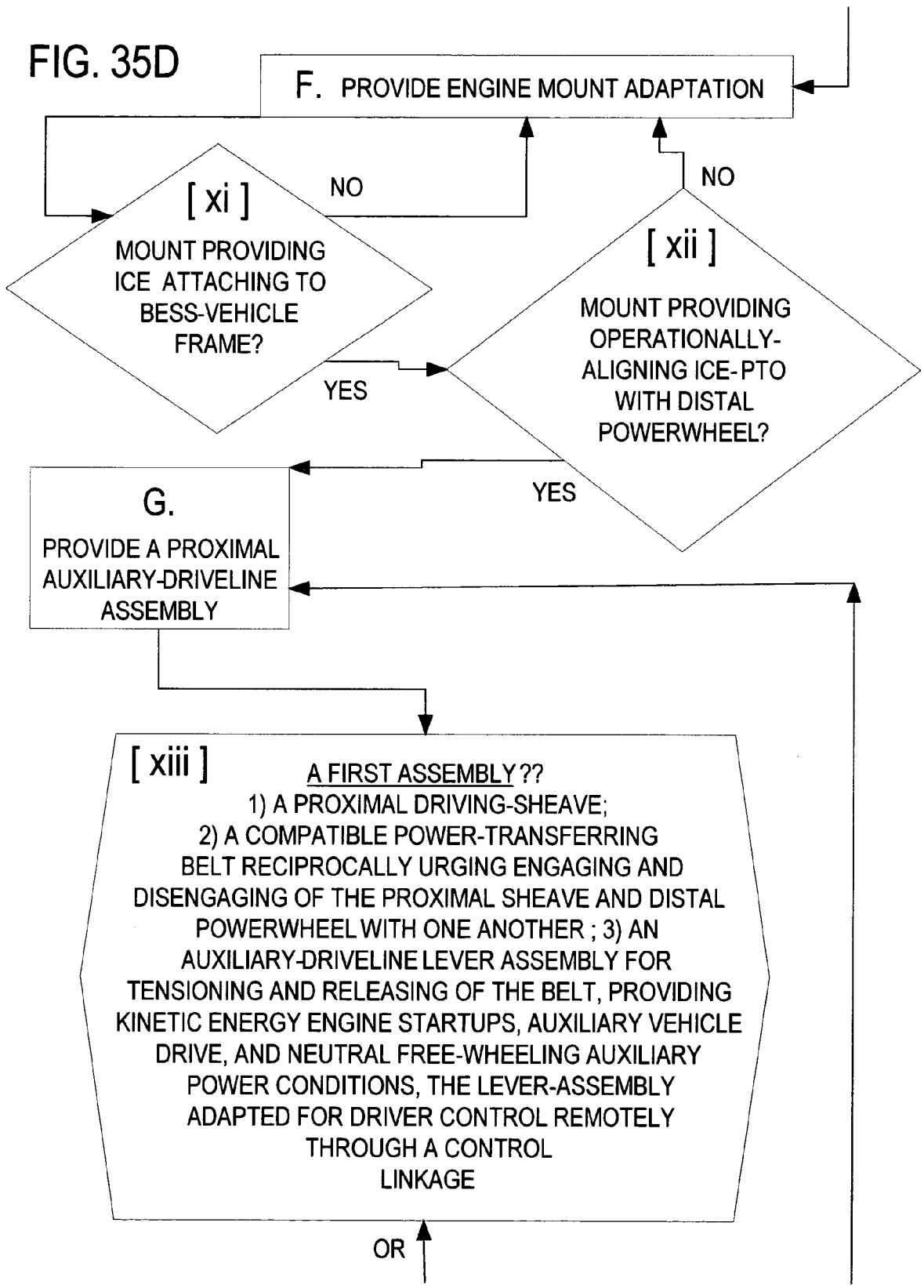

FIG. 35F

J.  PROVIDE AN AUXILIARY OPERATIONAL CONTROLLER ASSEMBLY
INCLUDING

1) ENGINE-THROTTLE CONTROLLER,
2) ENGINE ON-OFF CONTROLLER,
3) ENGINE STARTUP ACTUATOR CONTROLLER

THE ASSEMBLY OPERATIONALLY LINKABLE
TO THE AUXILIARY-DRIVE POWERTRAIN

INSTALLING THE ASSEMBLY IN DRIVER-REACHABLE OPERATIONAL ZONE,
OPERATIONALLY LINKING EACH CONTROLLER OF THE ASSEMBLY
WITH THE RESPECTIVE CONTROLLABLE PART OF THE
AUXILIARY-PROPELLING POWERTRAIN

END

HYBRID-POWERED SLOW-SPEED VEHICLE, VEHICLE TRAVEL-RANGE EXTENSION METHOD, AND METHOD OF HYBRID-VEHICLE MANUFACTURE

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of Invention

Embodiments of the present invention relate to a hybrid-powered slow-speed vehicle, a method for extending electric-vehicle travel-range, and a method of hybrid-vehicle manufacture.

2. Background and Prior Art

Sister vehicles in fundamental respects, battery-electric golf cars (legal top speed generally less than 32 km/hr, 20 mph), battery-electric low-speed-vehicles ("LSV's", legal top speed generally 32 to 40 km/hr, 20 to 25 mph), and other residential and commercial battery-electric slow-speed (BESS) vehicles have won a growing public interest and consumer following for business, social, governmental, utility, and recreational uses. They share fundamental similarities in their primary battery-electric powertrain systems and their performance characteristics, though may differ in wheel and wheelbase dimensions and configurations (see prior art illustrations, FIGS. 1-6 showing various non-exclusively exemplary wheelbase and primary-powertrain configurations). Slow-speed electric vehicles today—advantageous in their smooth, quiet, clean, odorless, and quick-startup qualities—are very common in retirement and other planned communities, and increasingly common in other residential and commercial settings.

Vehicles of this zero-emission sort have arguably helped reduce and at the least have helped shift the collective greenhouse-gas and particulate emissions and vehicle-noise pollution from sites of their uses. Strikingly, however, battery-electric powered vehicles in this slow-speed group offer substantially shorter travel ranges than their counterparts that have primary drivetrains powered by small, generally non-road-classified, internal combustion engines (ICE). Additionally, as state of battery-charge dwindles in the battery-electrics, many show declining acceleration, declining top-speed, and undesired deceleration on rising grades.

Figure 8A:
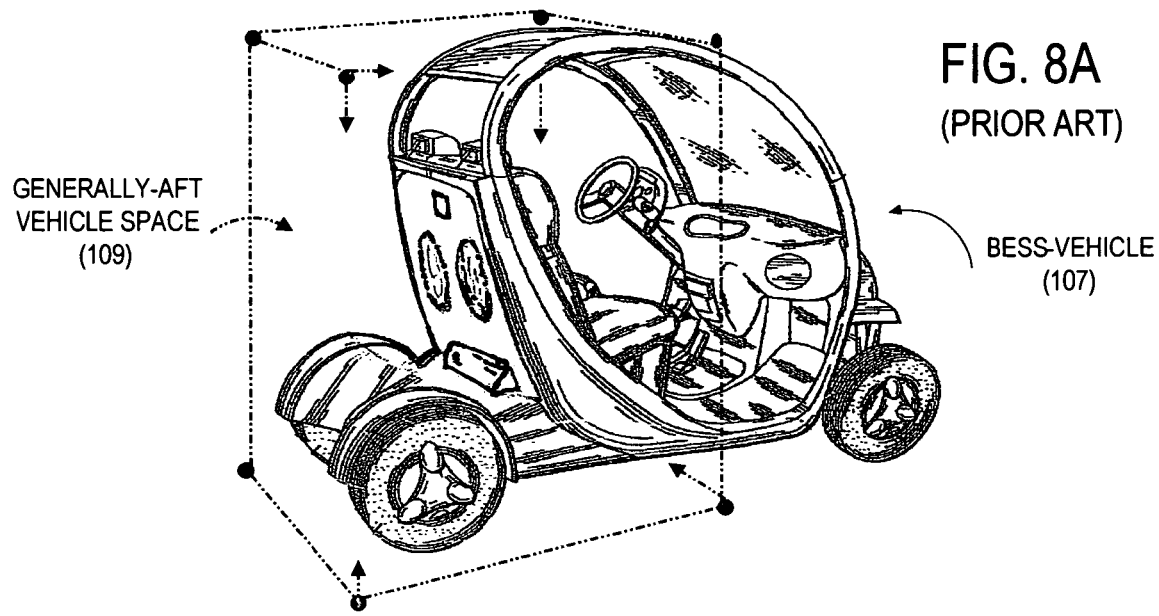
Figure 8B:
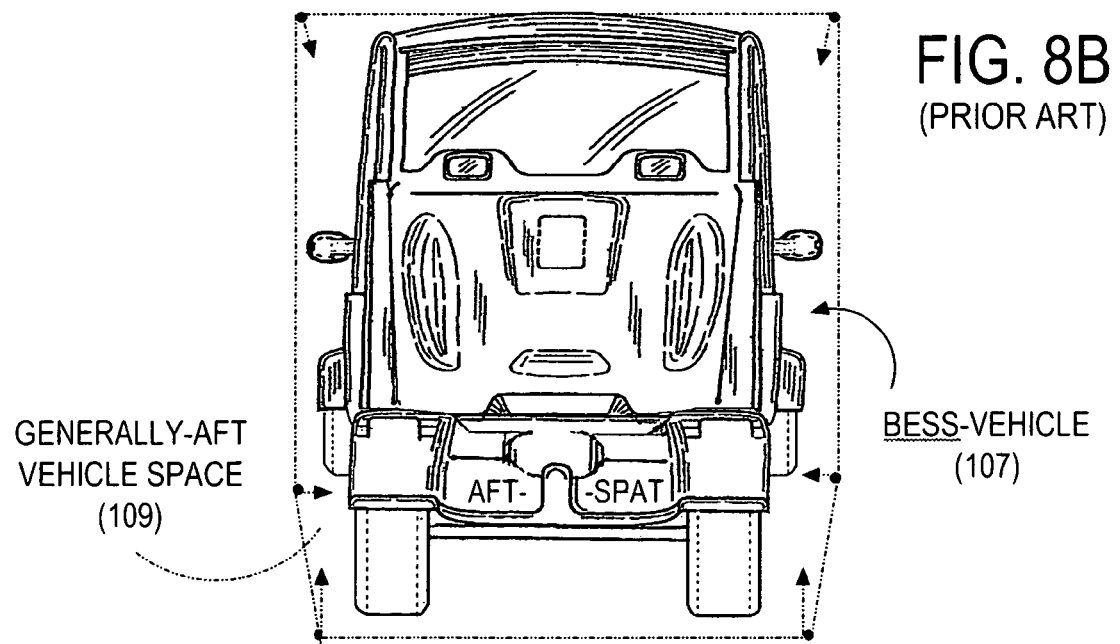
Figure 8C:
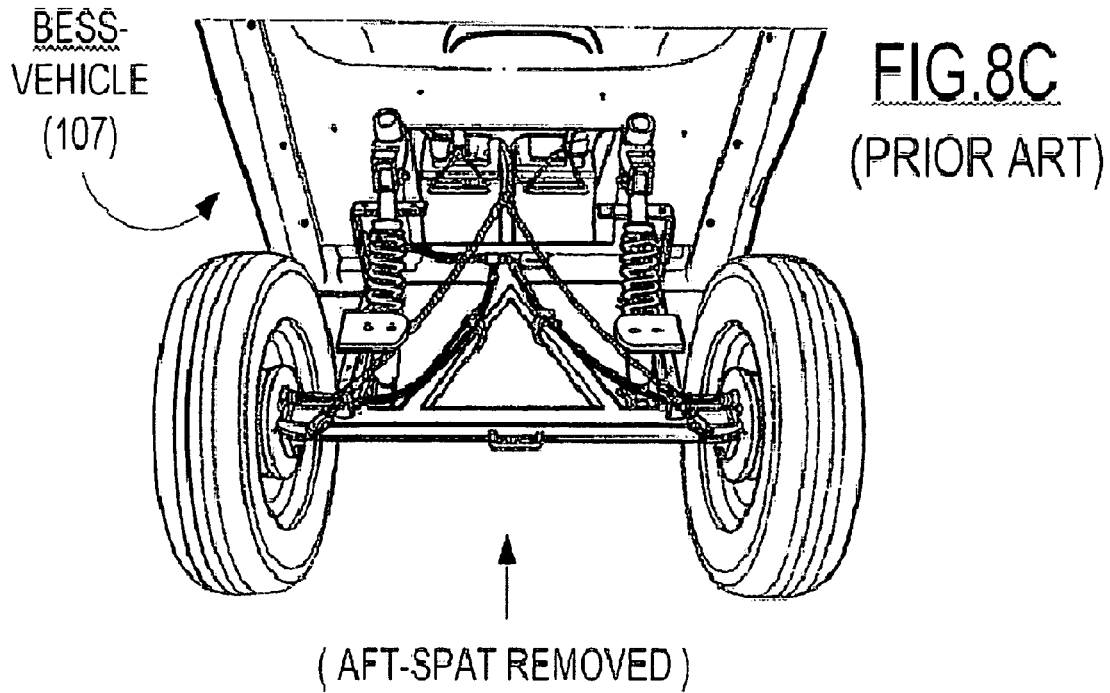
Figure 9:
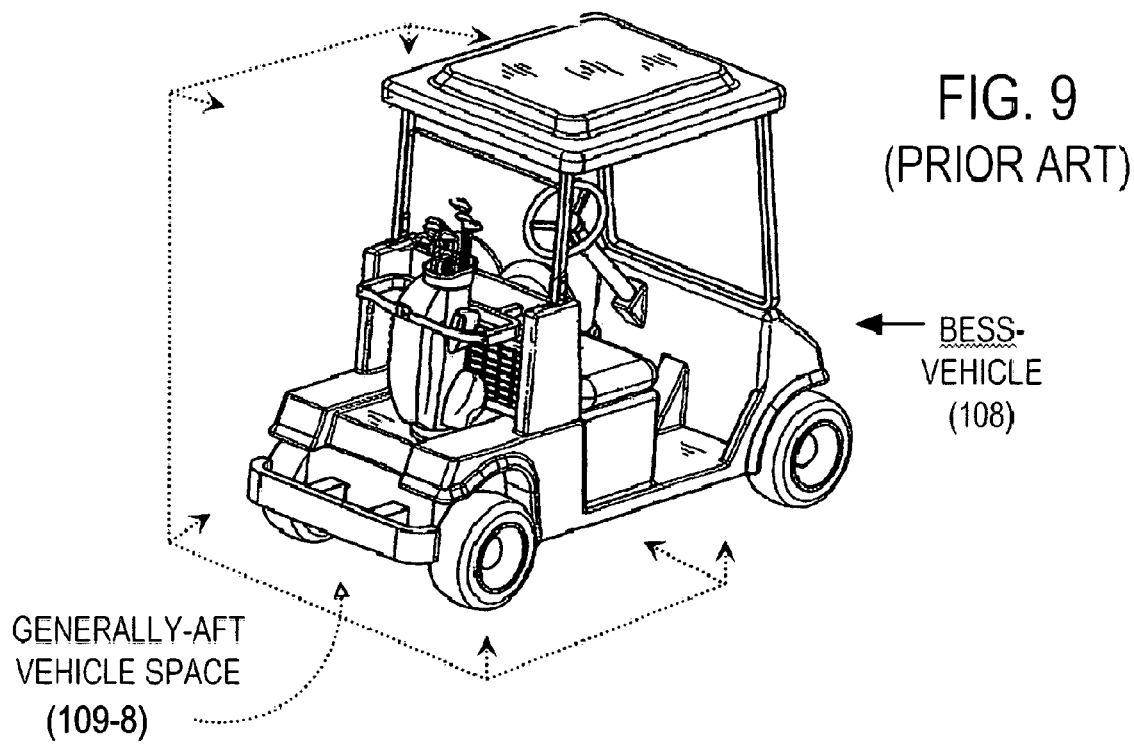

Among the many well-known prior art examples sharing similarly-slow vehicle top-speeds under propulsion of a primary battery-electric powertrain are various models of a front-wheel-drive BESS-vehicle that embodies certain aspects of U.S. Pat. No. 5,890,554 issued to Sturges on Apr. 6, 1999. Reference full-charge travel-range is roughly 48-56 km (30-35 ml) for these vehicles. (See FIG. 7 listing certain vehicle-specifications for one exemplary two-passenger model of this BESS-vehicle and FIGS. 8A-C illustrating three views of an embodiment of this vehicle that will be recognizable to those familiar with the art). Travel ranges for the newer embodiments are substantially unchanged from the older. Other BESS-vehicles having the more common rear-wheel-drive primary powertrain configurations (as non-exclusively exemplified in FIG. 2) constitute numerous additional prior-art examples. Many of the latter have body structures reflecting more traditional golf cart features (see FIG. 9 illustrating one embodiment of a golf-car-style BESS-vehicle). Stretch cargo-carrying and passenger-toting chassis versions (not shown) are also well-known in the art. Some of the vehicles in this group are marketed with claims of full-charge travel ranges as high as 96 km (60 ml); but large numbers of both the newer and older vehicles among these BESS-vehicles are well-known to have generally far-lesser ranges.

Beginning on fully-charged traction batteries, BESS-vehicles having comparable components and similarly undesirably-limited travel ranges, still may vary substantially among and within themselves in the magnitudes of their range-limits. Battery capacity is a primary range-defining specification for each. Range variations in like vehicles can be linked in part to the impacts on those battery capacities from such factors as battery life-cycle status, vehicle-driving styles, road-load demands, and even less controllably, from ambient temperatures. Battery power densities and the dependent vehicle-ranges may precipitously fall by half or more under such influences.

Standard traction batteries need lengthy deep chargings, commonly 8-12 hours, plus more frequent shallower opportunity-rechargings to sustain long life and good service. "Opportunity fast-charging" of traction batteries has proponents; but an infrastructure required to provide conveniently available fast-charges in an electric vehicle community poses significant drawbacks in the expenses and liabilities that accompany set-up and operations. In addition, the minimum fifteen to twenty-minute travel interruptions to users seeking fast-charges (and longer times, if consumer not be first-in-line) constitute further disadvantage. Furthermore, frequent fast-charging can shorten battery life substantially, thereby increasing rates of travel-range decline and overall travel costs in the expense of required replacement batteries coming even sooner.

Solar panel vehicle-roofs have been taught as a supplemental contributor to traction battery recharging. However, even in Sunbelt communities the low amperage solar trickle charging from such small-dimensioned panels provides only modest extensions of daily plug-in travel ranges in these solar-supplemented BESS-vehicles.

Prior art has taught alternative battery types, replacing the standard deep-cycle flooded lead-acid traction batteries in most common use. However, initial battery cost, secondary initial expenses (new charger and controller), future dead-battery replacement costs, limited availability of certain battery types, environmental concerns, and worrisome safety hazards (heat and fire) have been and remain substantial drawbacks.

As expansions of missions cause desired daily travel distances for vehicles of this sort to rise, limitations and uncertainties of travel-range per full battery-charge present an increasing challenge to meeting consumer-needs and providing user-satisfaction from a BESS-vehicle. The rising daily-travel objectives cultivate renewed though conflicted appeal of the generally much longer-ranged and consistently powerful, solely ICE-powered vehicles, even with their fossil-fuel-use related drawbacks.

Hybridization of power sources to gasoline plus battery-electric in advantageous combinations has become increasingly-known in today's highway-classified vehicles. However, ICE-electric hybridization configurations have been taught in only limited forms for BESS-vehicles. Contributing recharge to battery during vehicle operation, portable gasoline-powered inverter-generators accessorizing LSV's has been publicly exhibited as one series-hybrid gas-electric travel-range extension tactic. (See Internet Reference path <evtrader.strongpossibilities.com/forums/viewtopic.php?t=65&start=45>) Drawbacks include the modest range gain, estimated at only about 18 km (11 ml) at a cruising vehicle-speed of 48 km/h (25 mph). Other disadvantages include: a) required manual recoil start of generator; b) continuous engine operation throughout stop-start travels; c) fuel-energy transfer inefficiencies.

No prior art teachings have proposed, included, or envisioned a parallel ICE-electric power-hybridization for its advantages and solutions to certain limitations and disadvantages of today's BESS-vehicles. More specifically, an auxiliary-propelling ICE-powertrain in a slow-speed primary-drive battery-electric vehicle—a powertrain combination useful in economically extending vehicle travel-range, extending battery life, and preserving operator convenience, while still promoting overall-reduced local emissions, optional noise reductions, and other advantages of the battery-electric vehicle over those of solely ICE-powered counterpart vehicles—has not been taught until now.

Various electric golf cars, LSV's, and others in their BESS-vehicle family in many ways are meeting the transportation needs and related greenhouse-gas and noise-pollution concerns of their owners and operators. Still, there is and has been a long-unanswered need for a better solution to the relatively short full-charge travel-ranges and other power-related inadequacies and costs in BESS-vehicles.

SUMMARY OF THE INVENTION

Embodiments of the present invention a) provide exemplary hybrid-powered slow-speed vehicles; b) provide exemplary steps in a method for extending travel-ranges in battery-electric slow-speed (BESS) vehicles, such as electric golf-cars, LSV's, and others; and c) provide exemplary steps in a method of hybrid-powered-vehicle manufacture. Parallel power vehicle-hybridization and the vehicle-manufacture utilizing a primary-drive battery-electric powertrain vehicle complemented by a cooperative auxiliary-propelling ICE-powertrain and auxiliary-power operational-controller—aspects of the present invention—provide solutions to prior art disadvantages and deficiencies and achieve other objects too.

Objects of various embodiments of our present invention include:

providing an easily operable and reliable auxiliary-propelling ICE-powertrain assembly in a battery-electric slow-speed vehicle;

providing a battery-electric primary powertrain generally preserving attractive features of optional, intermittent, quieter, odorless, generally-efficient, solely-electric "green" operation, particularly at slower speeds of vehicle operation, as with portions of golf course and other similarly slow travels;

providing cooperative contributions of the auxiliary-propelling powertrain, providing hydrocarbon-fuel energy-density efficiencies for vehicle operation, generally across a predetermined range of vehicle speeds, reducing rates of battery energy depletions and depth of battery discharge per unit of distance, extending battery life;

providing cooperative and complementary use of auxiliary-propelling ICE-powertrain providing substantial increases in slow-speed battery-electric vehicle travel-range per full-charge of primary-drive battery-bank, still controllably constraining secondary gaseous and noise pollution in selected settings for which the primary electric powertrain is used exclusively;

integrating battery-electric slow-speed vehicle, auxiliary-propelling powertrain assembly, and auxiliary-power operational-controller, a) requiring no greater than minor modifications in battery-electric vehicle design and features; and b) requiring and causing no unsafe structural changes in the vehicle;

providing the auxiliary-drive powertrain assembly providing compatibility and cooperation with most existing fundamental mechanical components of the BESS-vehicle to which it is added;

providing a constrained additional weight of the auxiliary-propelling powertrain assembly, still preserving a substantial percentage of rated payload capacity for the vehicle;

providing the secondary powertrain energized by readily replaceable onboard fossil-fuel auxiliary-energy supply, reducing necessity for vehicle-tow after residual battery power for primary-drive powertrain falls to inadequate operational levels.

Through its high energy-density fuel, an auxiliary ICE-powertrain in its various embodiments takes on a significant share of a vehicle-travel load, its presence adding only a small percentage to curb weight of the vehicle, reducing the rate of battery energy discharge, and providing auxiliary propulsion to the slow-speed vehicle over an extended travel-range between battery full-recharging, a range significantly greater than the battery-full-charge range provided by operation of the primary battery-electric powertrain alone; still preserving significant advantages of a battery-electric slow-speed vehicle. The combined torque of the cooperative drivetrains can enhance vehicle performance on inclines and other conditions of load strain, helping prevent deteriorations in vehicle speed and acceleration. As a further advantage, auxiliary-powertrain usage can extend primary powertrain battery bank life by reducing depth of discharges (DOD) required to meet daily travel needs.

The foregoing and other attributes and advantages of various embodiments of our hybrid-powered vehicle, of our vehicle travel-range extension method, and of our method of hybrid-powered slow-speed-vehicle manufacture, in accordance with our present invention, will become further apparent from the detailed description herein of exemplary embodiments read in conjunction with the accompanying drawings. Those of ordinary skill in the art will appreciate that the conception upon which this disclosure is based may readily be utilized as a basis for the designing of other related methods and assemblies for carrying out the purposes of embodiments of our present invention. It is important, therefore, that the claims herein be regarded as including such equivalent constructions, insofar as they do not depart from the principles, spirit, and scope of our invention providing auxiliary propulsion for electric golf cars, LSV's, and other similar battery-electric slow-speed vehicles. The detailed description and the drawings herein are simply illustrative of a number of embodiments; they are not to be construed as limiting to our claims.

DRAWINGS, FLOWCHARTS, OTHER ILLUSTRATIONS

Figures (FIGS)

For reference-identification certain constituents of a drawing or other illustration are labeled using numbers, uppercase letters, or combinations of the two.

Closely related figures have the same number, but different alphabetic, numerical, or alphabetic-plus-numerical suffixes.

Figure 2:
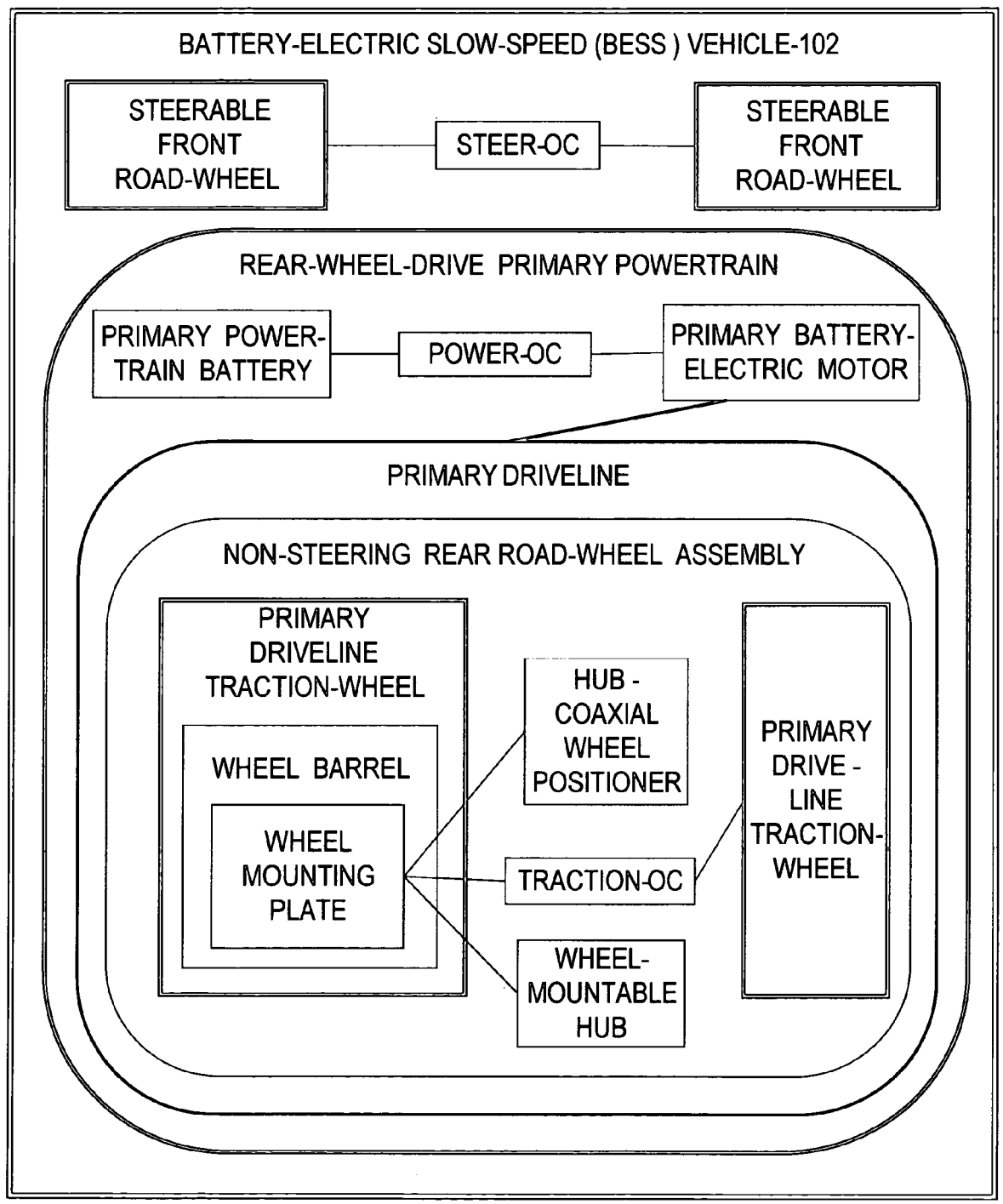
Figure 3:
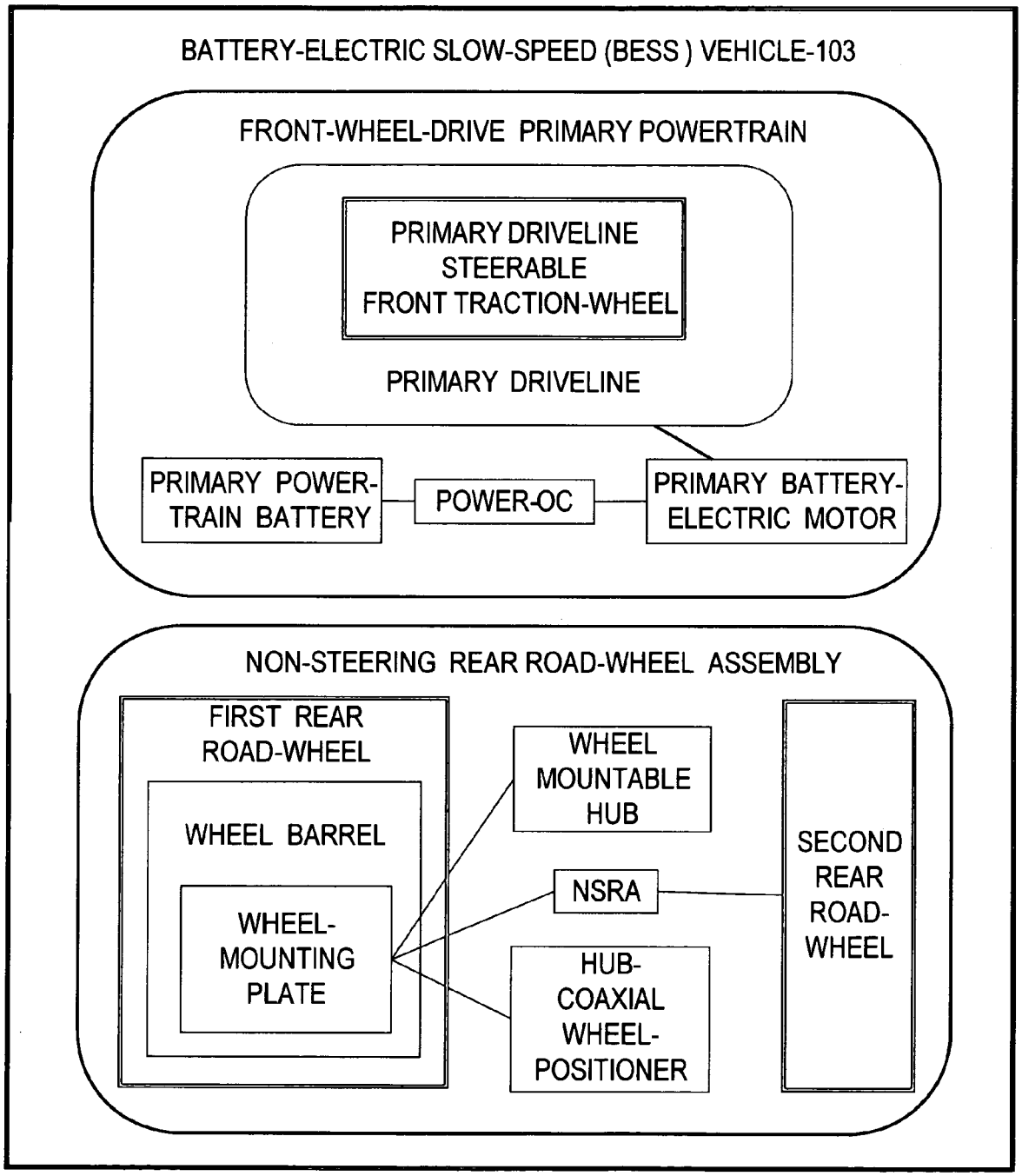
Figure 4:
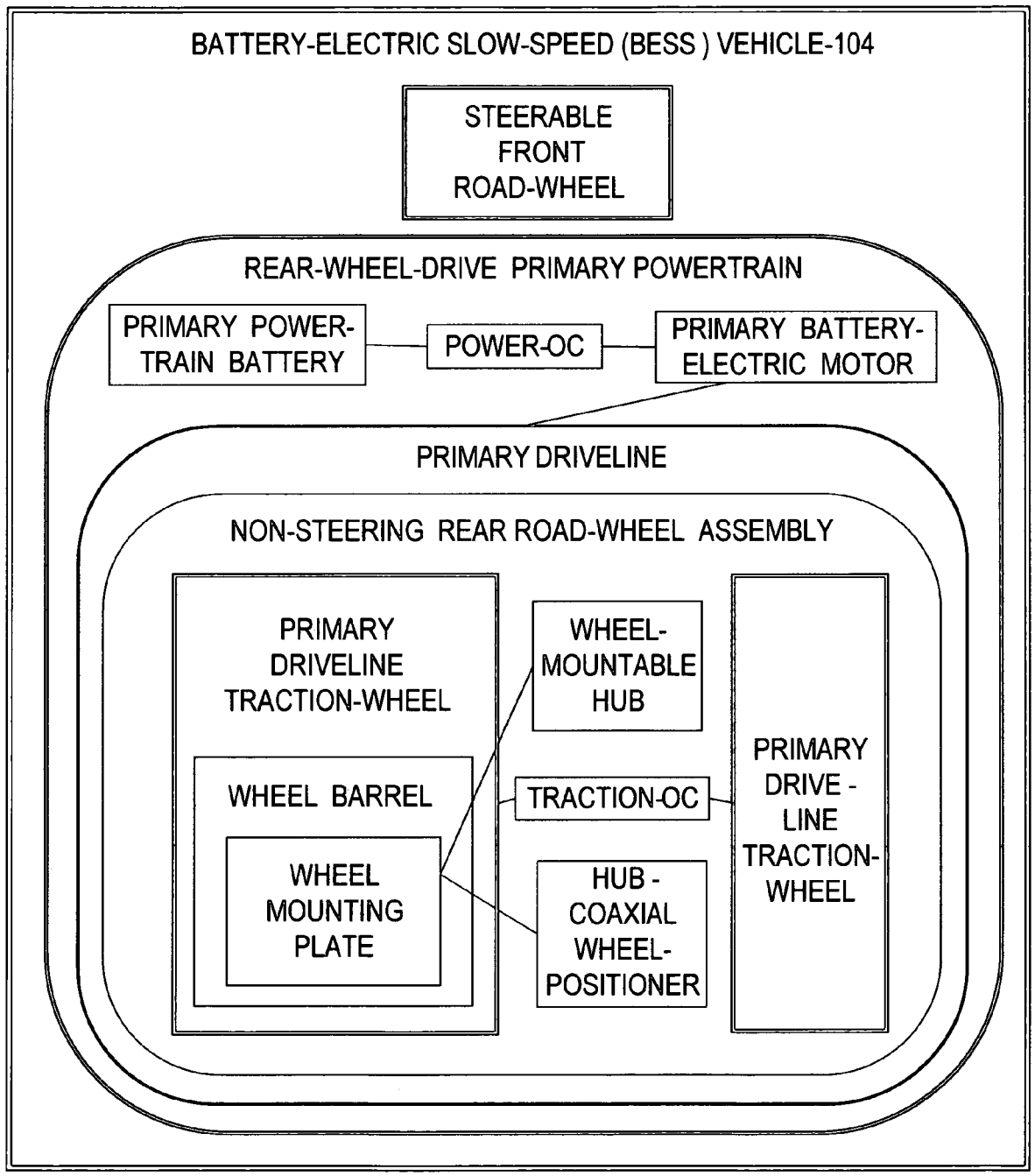
Figure 5:
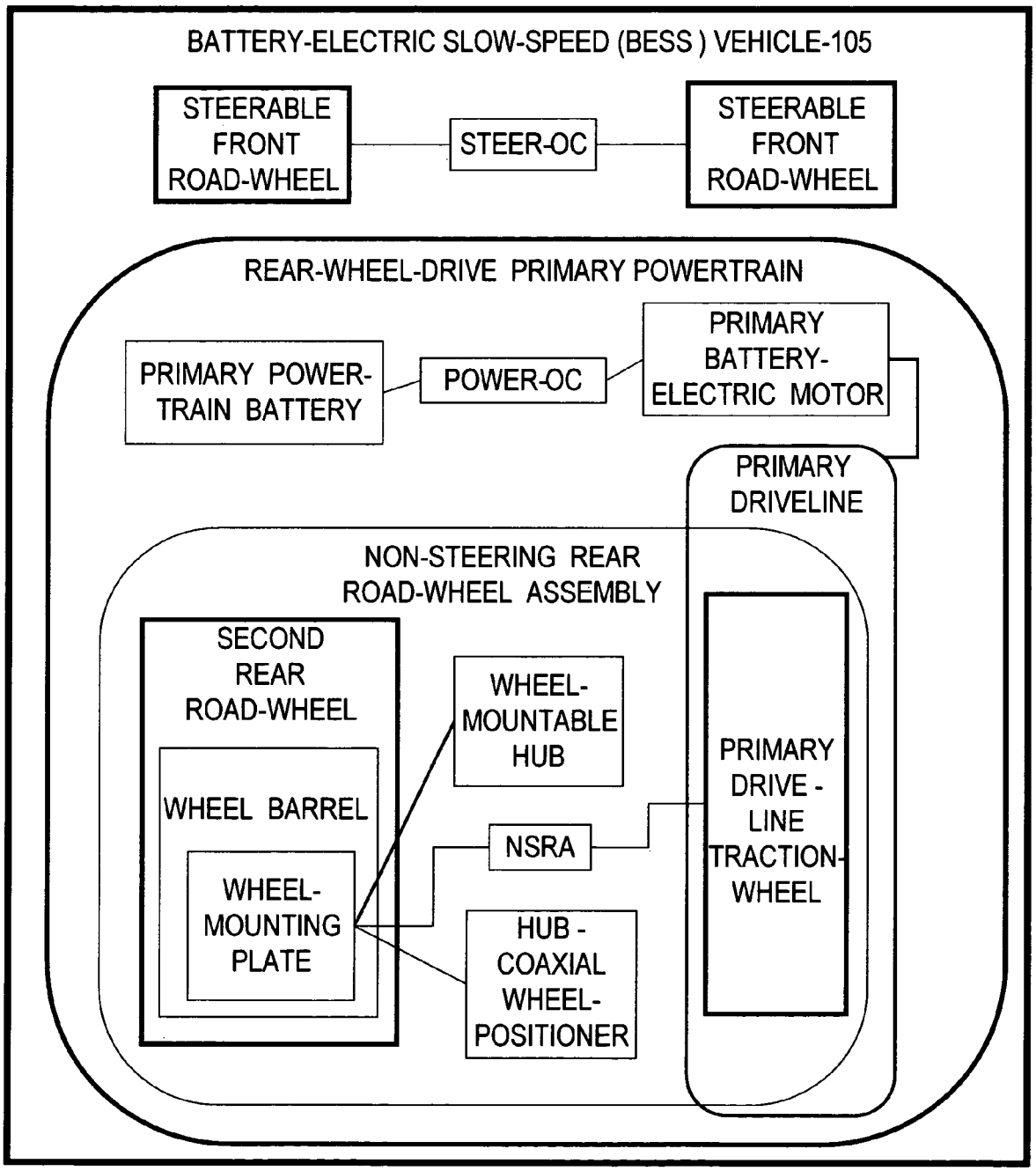
Figure 6:
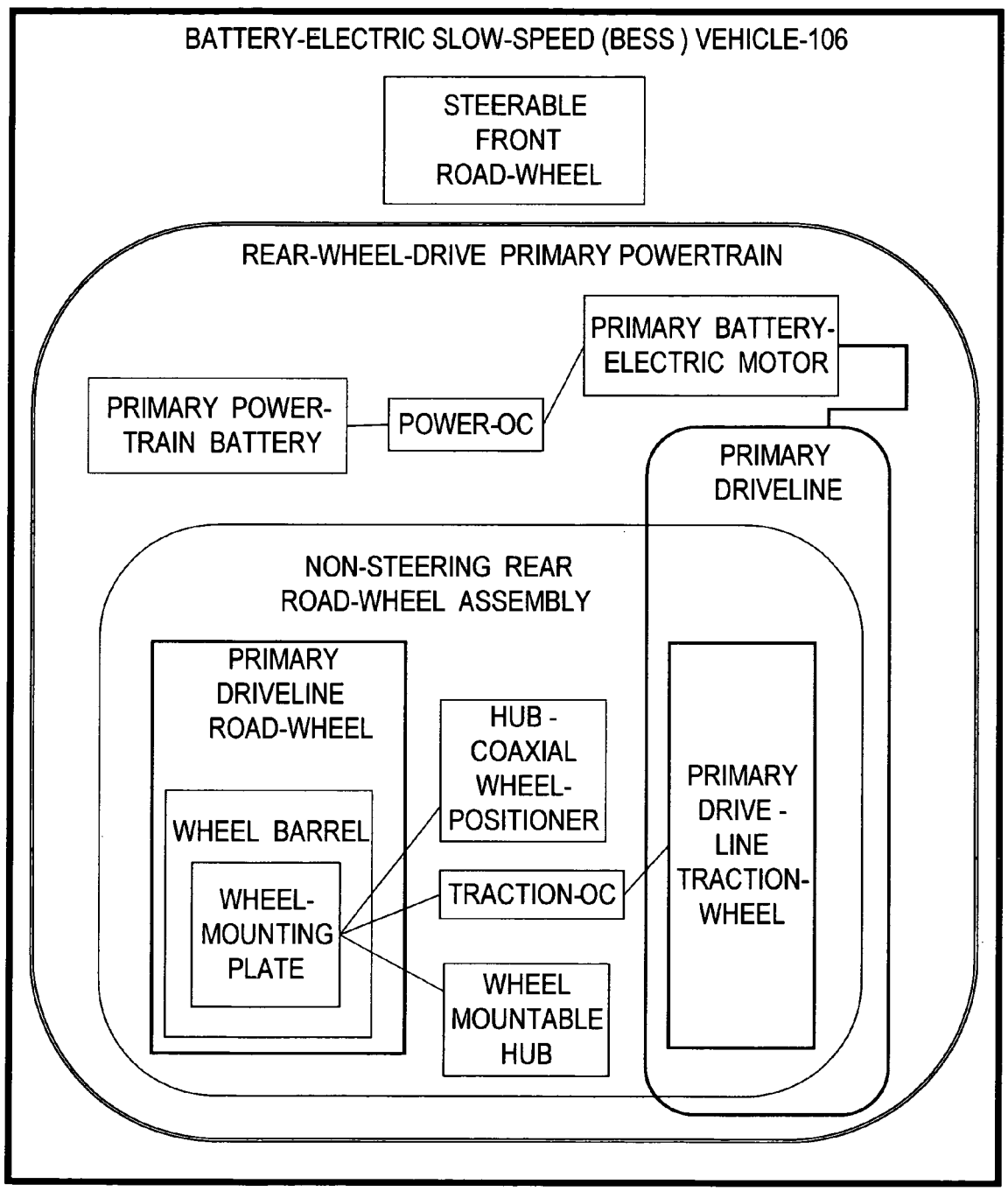
Figure 10:
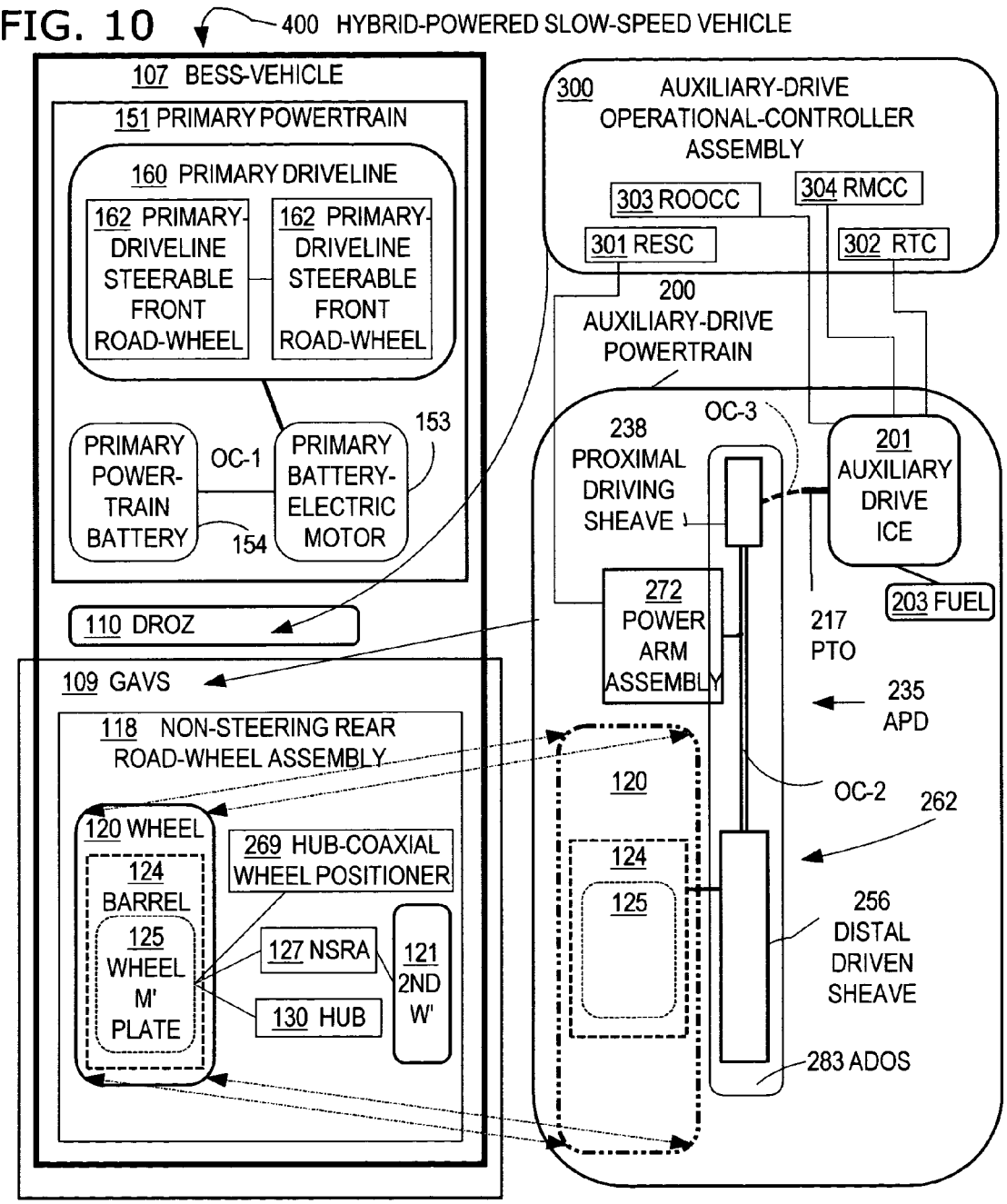

FIG. 1 (Prior Art)—a block-format schematic of a wheelbase and primary powertrain first configuration in a BESS-vehicle FIG. 2 (Prior Art)—a block-format schematic of a wheelbase and primary powertrain second configuration in a BESS-vehicle FIG. 3 (Prior Art)—a block-format schematic of a wheelbase and primary powertrain third configuration in a BESS-vehicle FIG. 4 (Prior Art)—a block-format schematic of a wheelbase and primary powertrain fourth configuration in a BESS-vehicle FIG. 5 (Prior Art)—a block-format schematic of a wheelbase and primary powertrain fifth configuration in a BESS-vehicle FIG. 6 (Prior Art)—a block-format schematic of a wheelbase and primary powertrain sixth configuration in a BESS-vehicle FIG. 7—Table II (Prior Art)—certain vehicle specifications for one BESS-vehicle FIG. 8A (Prior Art)—a perspective view drawing of one front-wheel-drive BESS-vehicle FIG. 8B (Prior Art)—a rear orthogonal view drawing of the BESS-vehicle shown in FIG. 8A FIG. 8C (Prior Art)—an elevated rear perspective view drawing of the BESS-vehicle in FIGS. 8A and 8B, aft-spat absent FIG. 9 (Prior Art)—a rear quarter perspective view drawing of an embodiment of a golf-car style BESS-vehicle FIG. 10-a block-format schematic illustrating certain fundamental configurations in a first embodiment of a hybrid-powered slow-speed vehicle in accordance with our present invention FIG. 11 (Table III)—certain auxiliary-powertrain specifications for a first embodiment of our hybrid-powered vehicle shown in FIG. 10

Figure 12A:
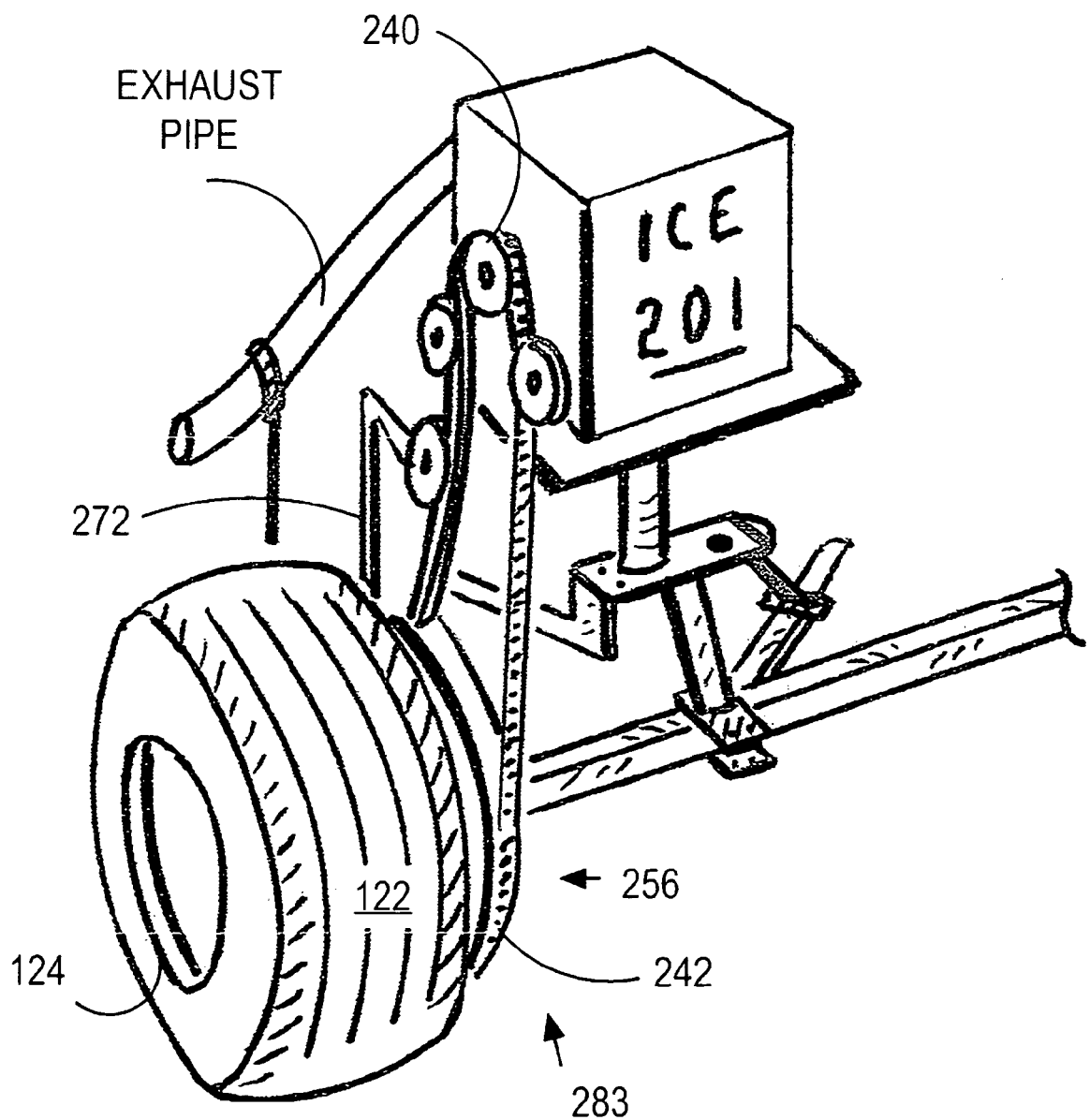

FIG. 12A—rear-quarter, elevated, perspective view drawing of an auxiliary-power driveline for a first embodiment of our hybrid-powered vehicle shown in FIG. 10

Figure 13:
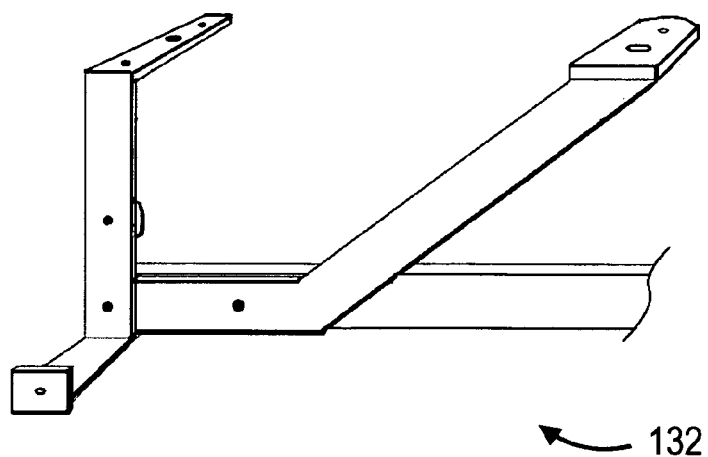

FIG. 12B—inboard-to-outboard perspective view drawing of further detail in the auxiliary-power driveline shown in FIG. 12A FIG. 13—outboard perspective view drawing of an aft vehicle-framework in a first embodiment of our hybrid-powered vehicle shown in FIG. 10

Figure 14:
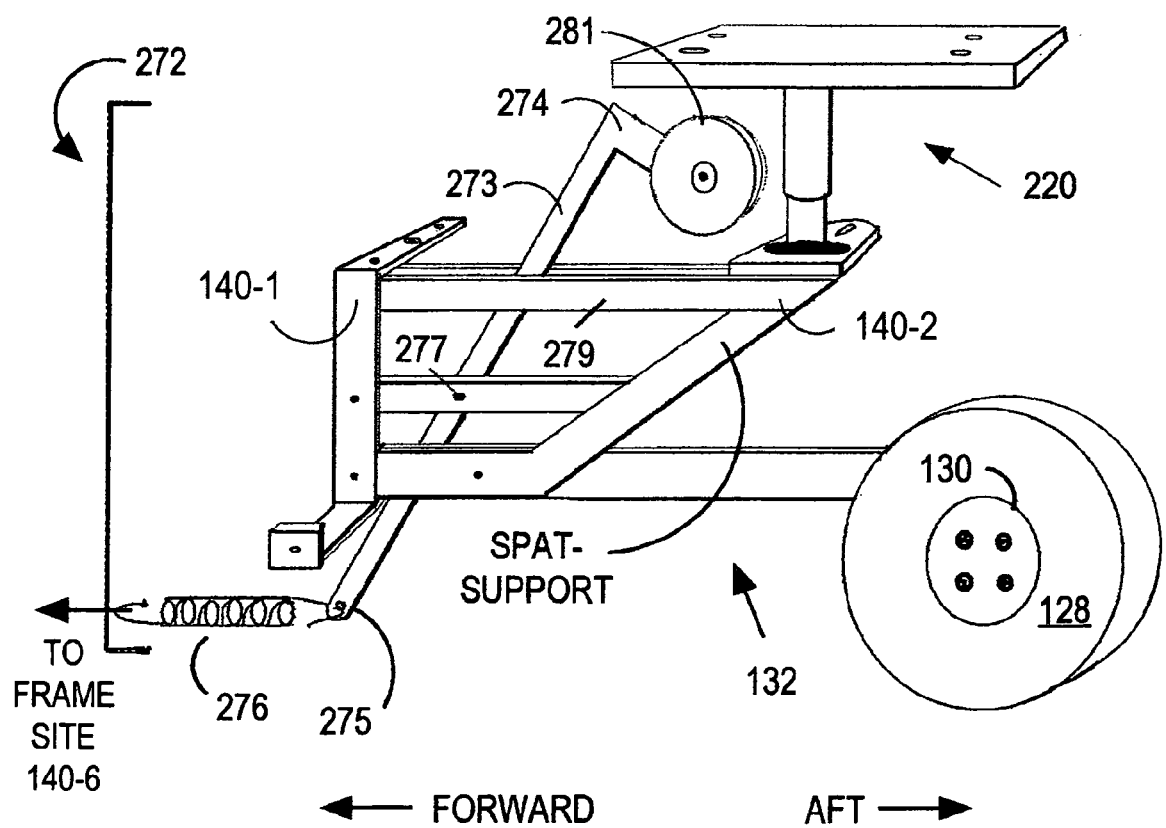

FIG. 14—outboard, perspective view drawing of an auxiliary-driveline power-arm assembly for a first embodiment of our hybrid-powered vehicle shown in FIG. 10

Figure 15A:
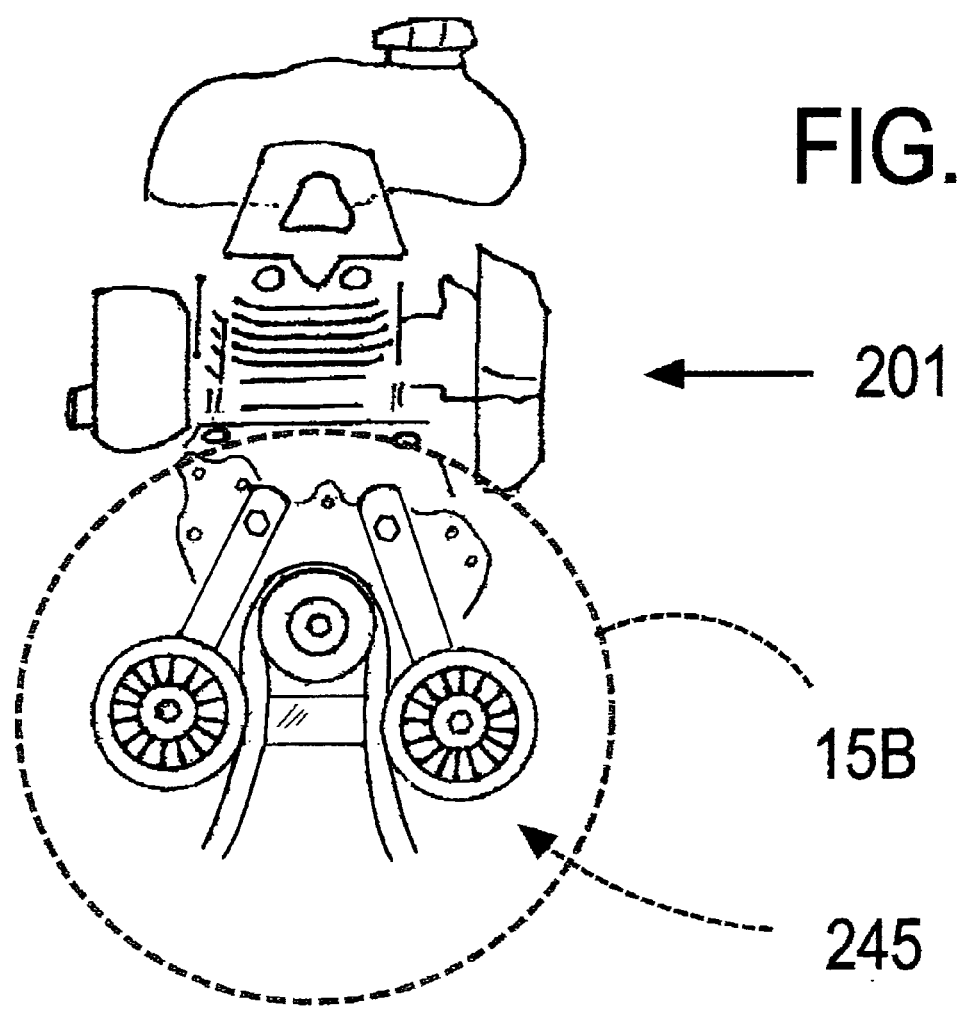
Figure 15B:
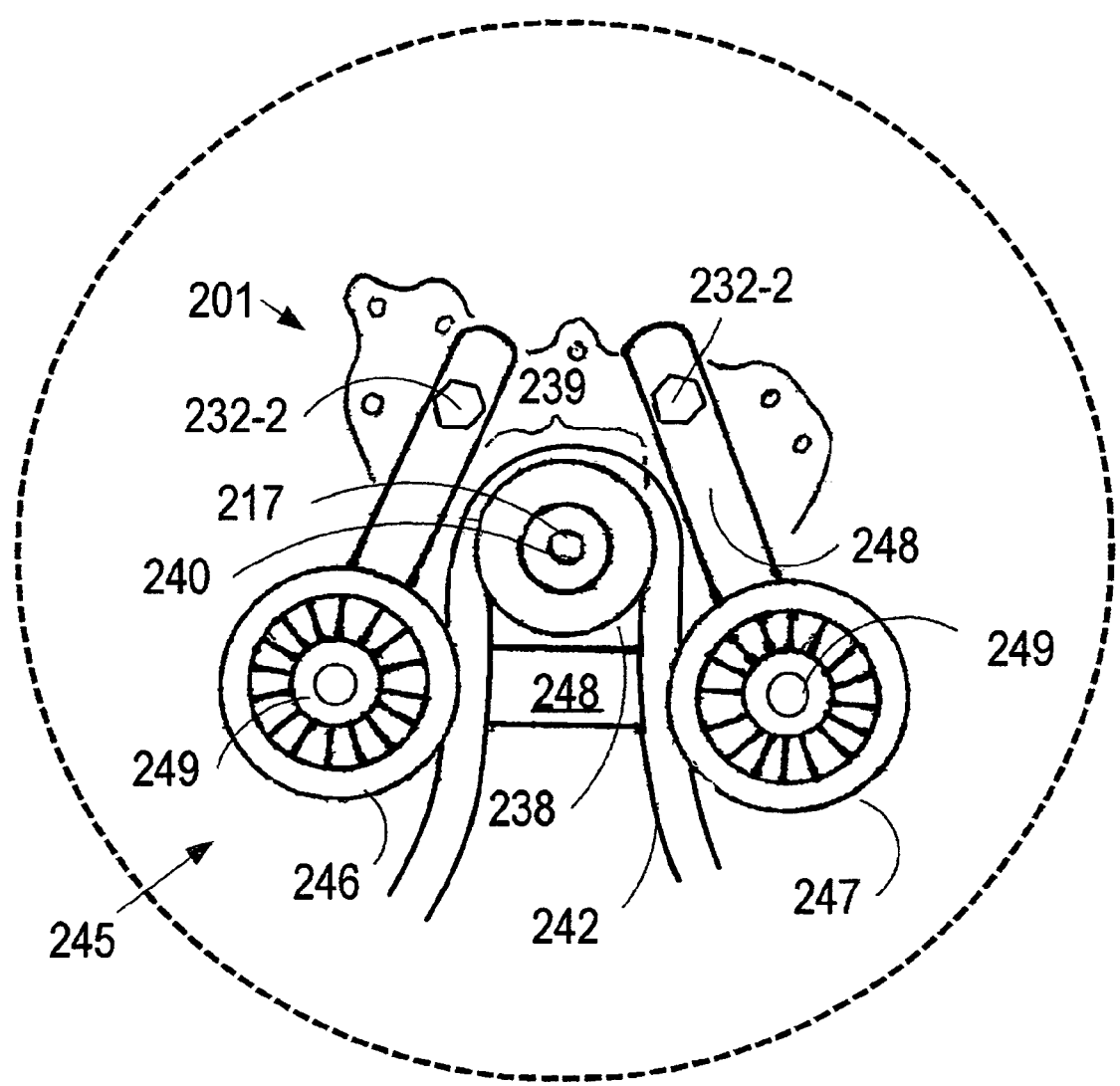
Figure 16:
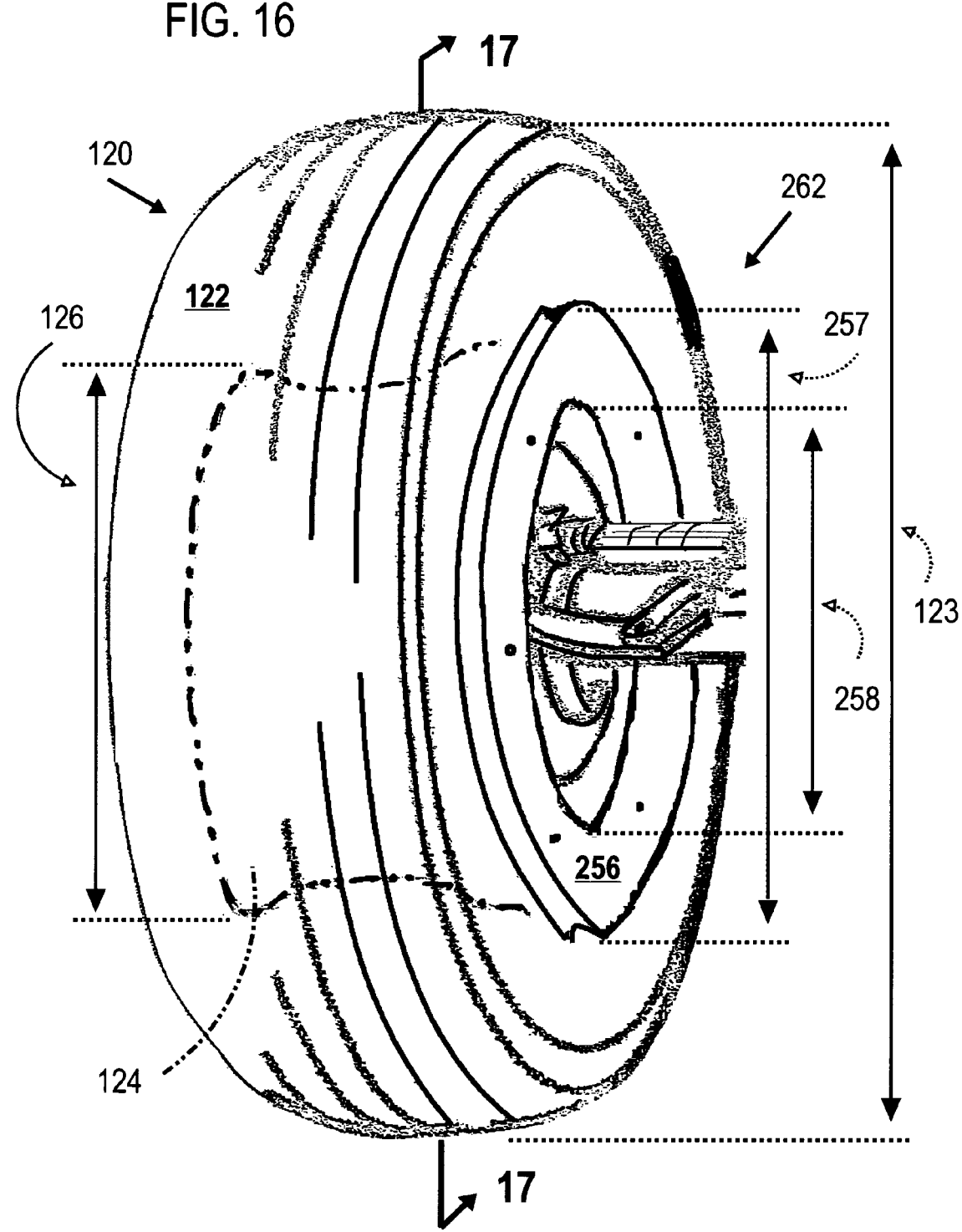

FIG. 15A—left side orthogonal view drawing of an idler-pulley assembly at an auxiliary proximal sheave of an auxiliary power driveline FIG. 15B—enlarged view of the idler pulley assembly in FIG. 15A FIG. 16—perspective view drawing of an auxiliary-driveline rear traction-wheel of a first embodiment of our vehicle shown in FIG. 10

Figure 17:
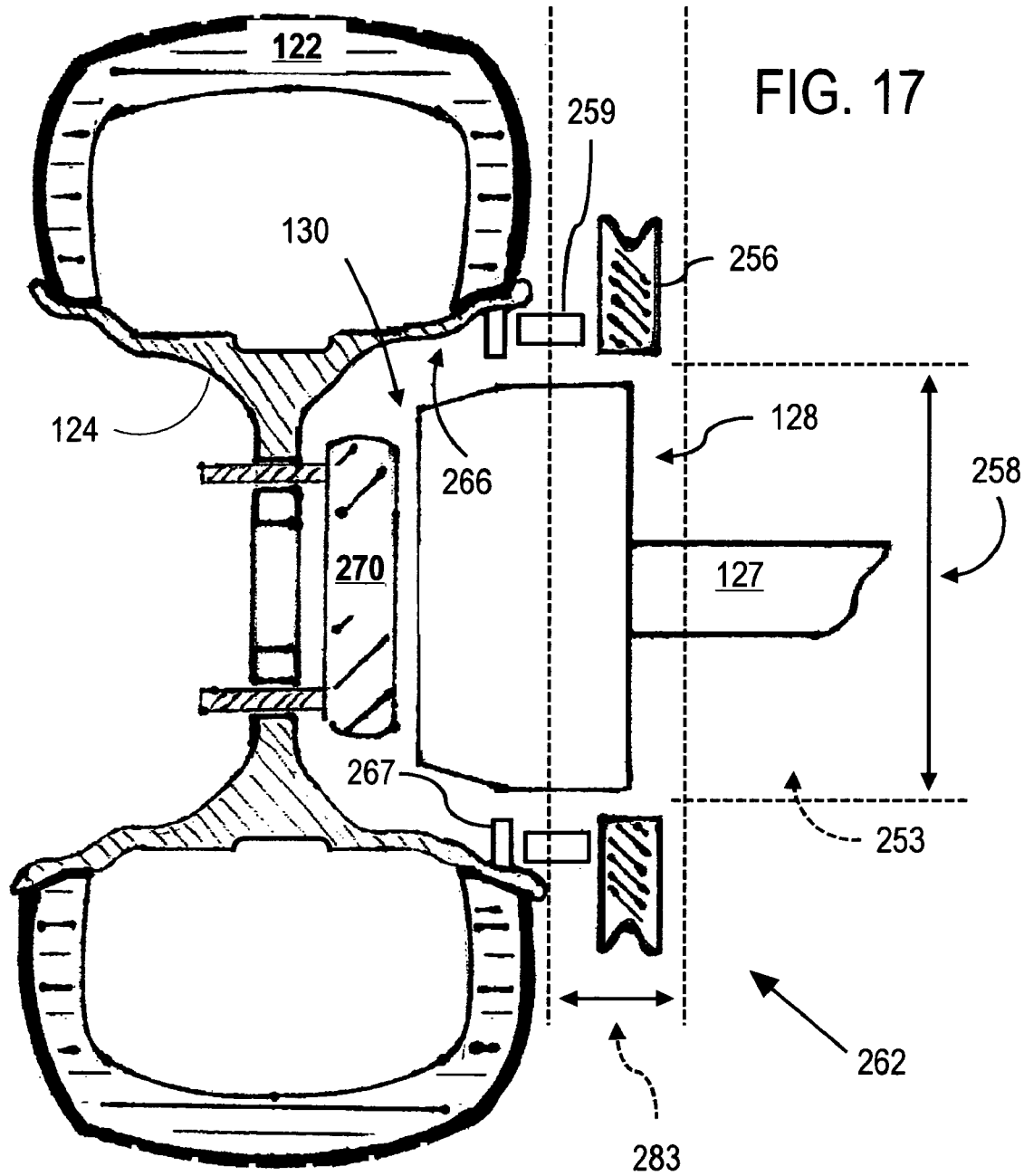

FIG. 17—transverse sectional view drawing of first rear traction-wheel shown in FIG. 16

Figure 18:
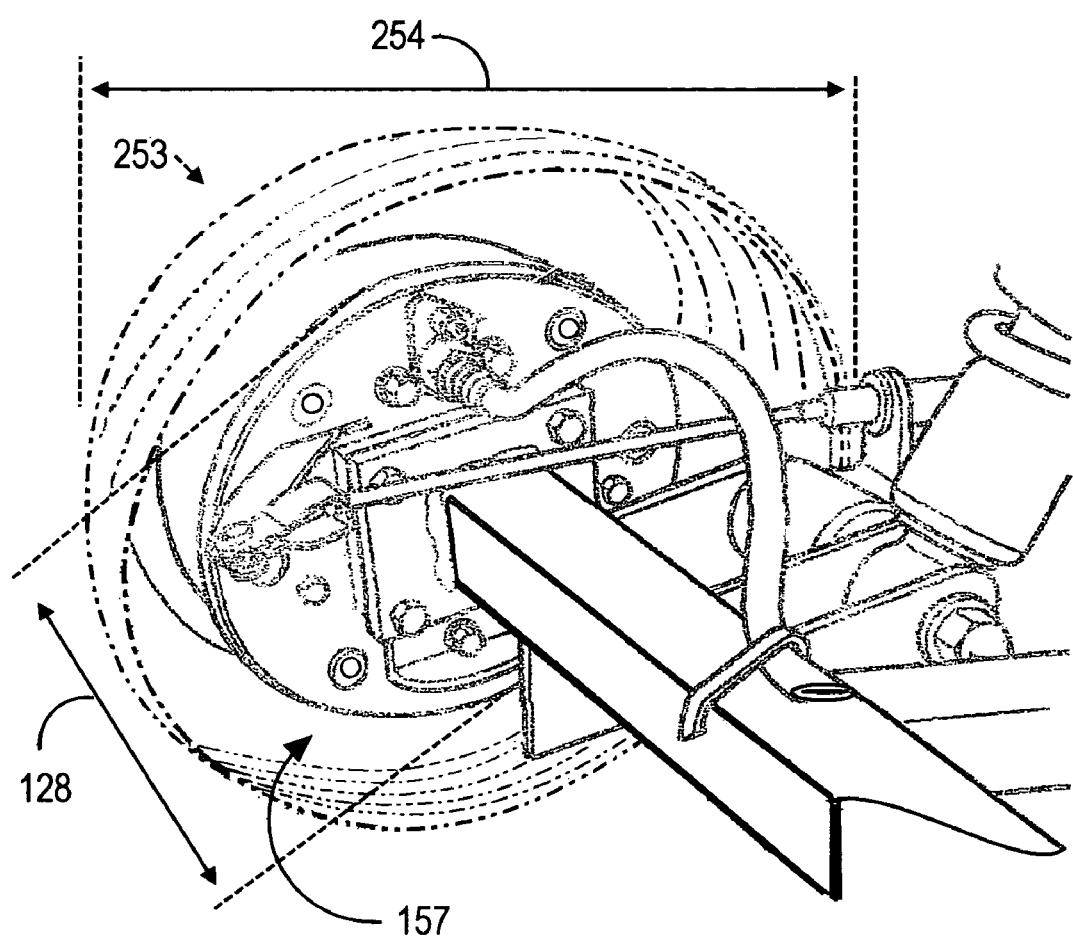

FIG. 18—perspective view drawing of a phantom cylinder surrounding a rear brake-drum assembly adjoining a first rear auxiliary-driveline traction-wheel shown in FIG. 10

Figure 19:
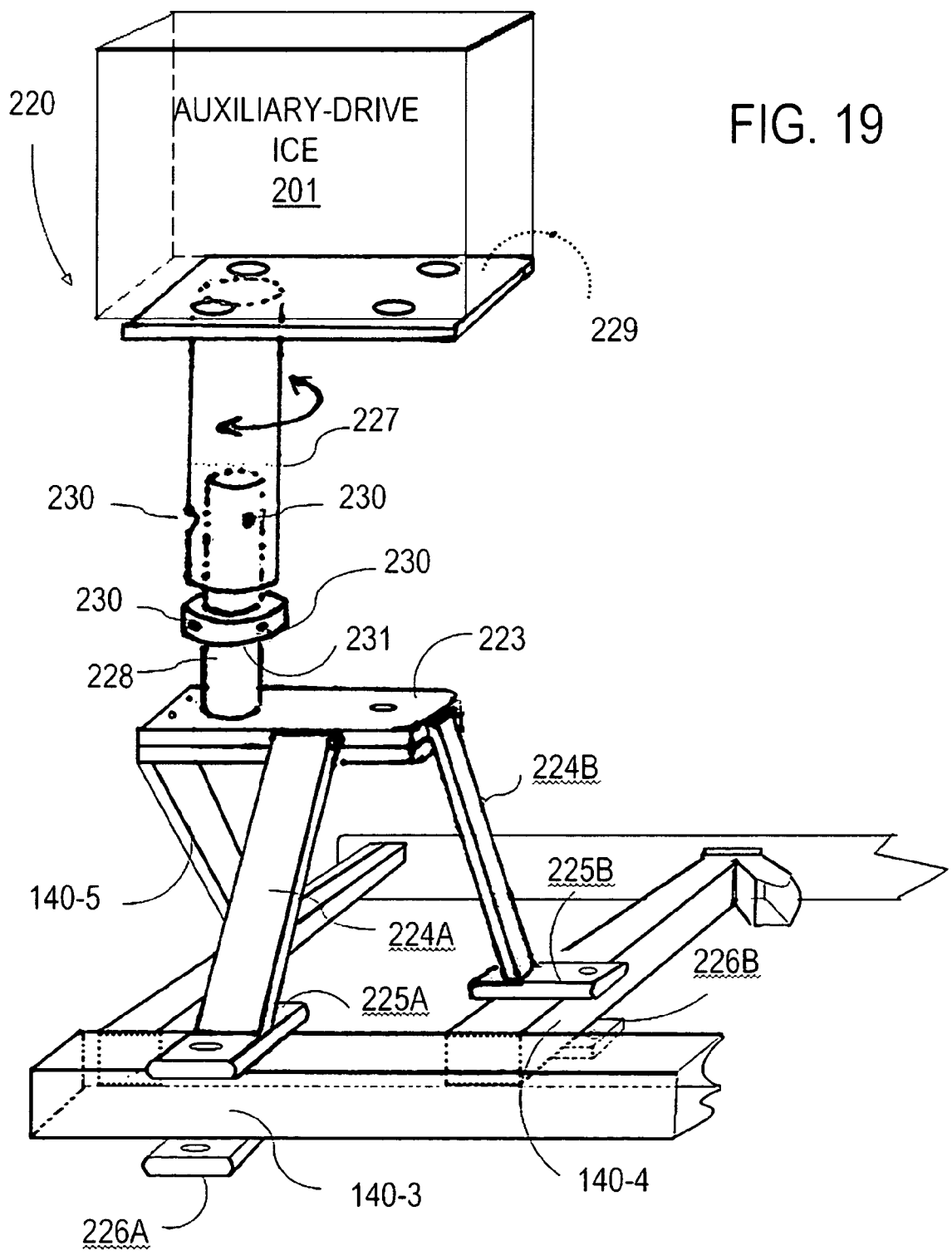

FIG. 19—rear perspective view drawing of an engine-mounting assembly for a first embodiment of our hybrid-powered vehicle shown in FIG. 10

Figure 20:
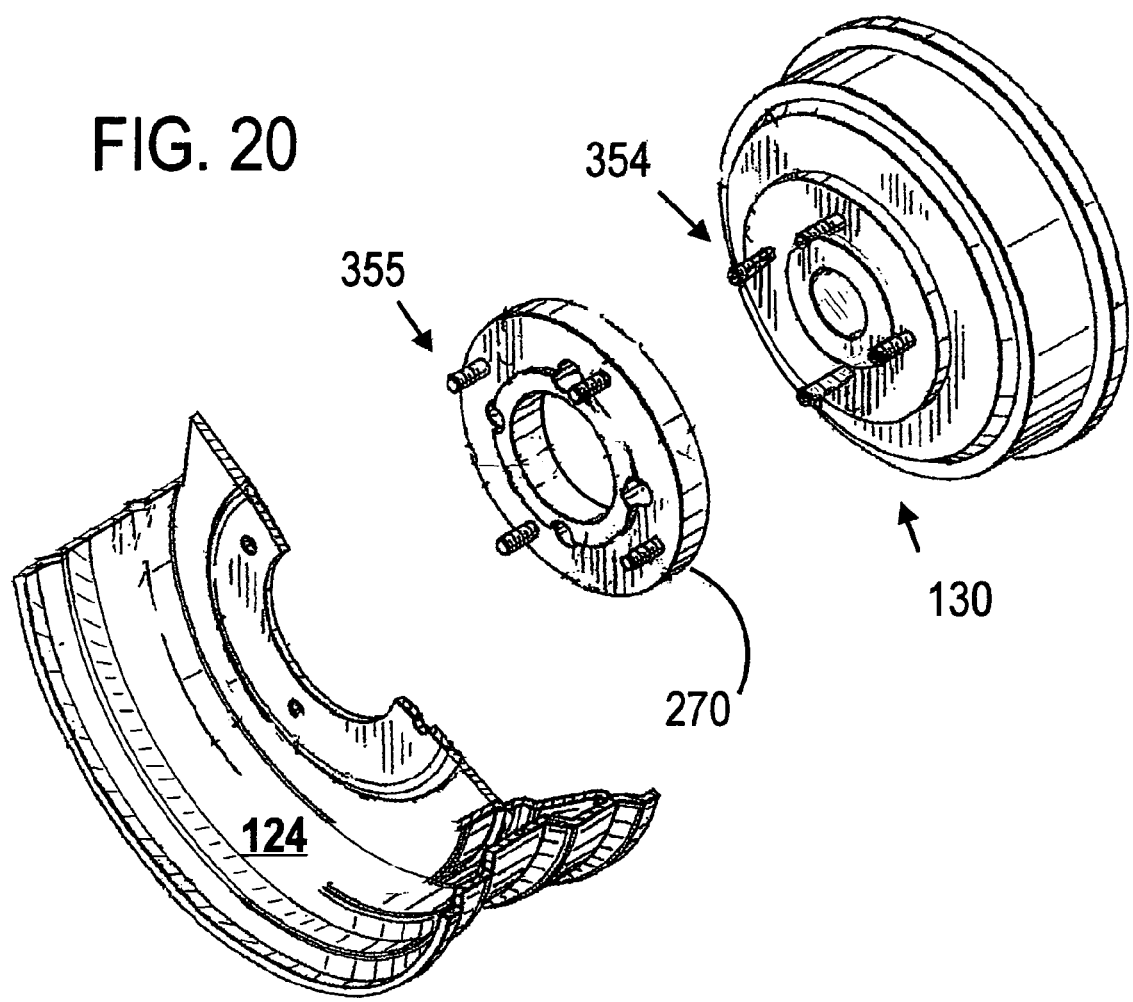
Figure 21:
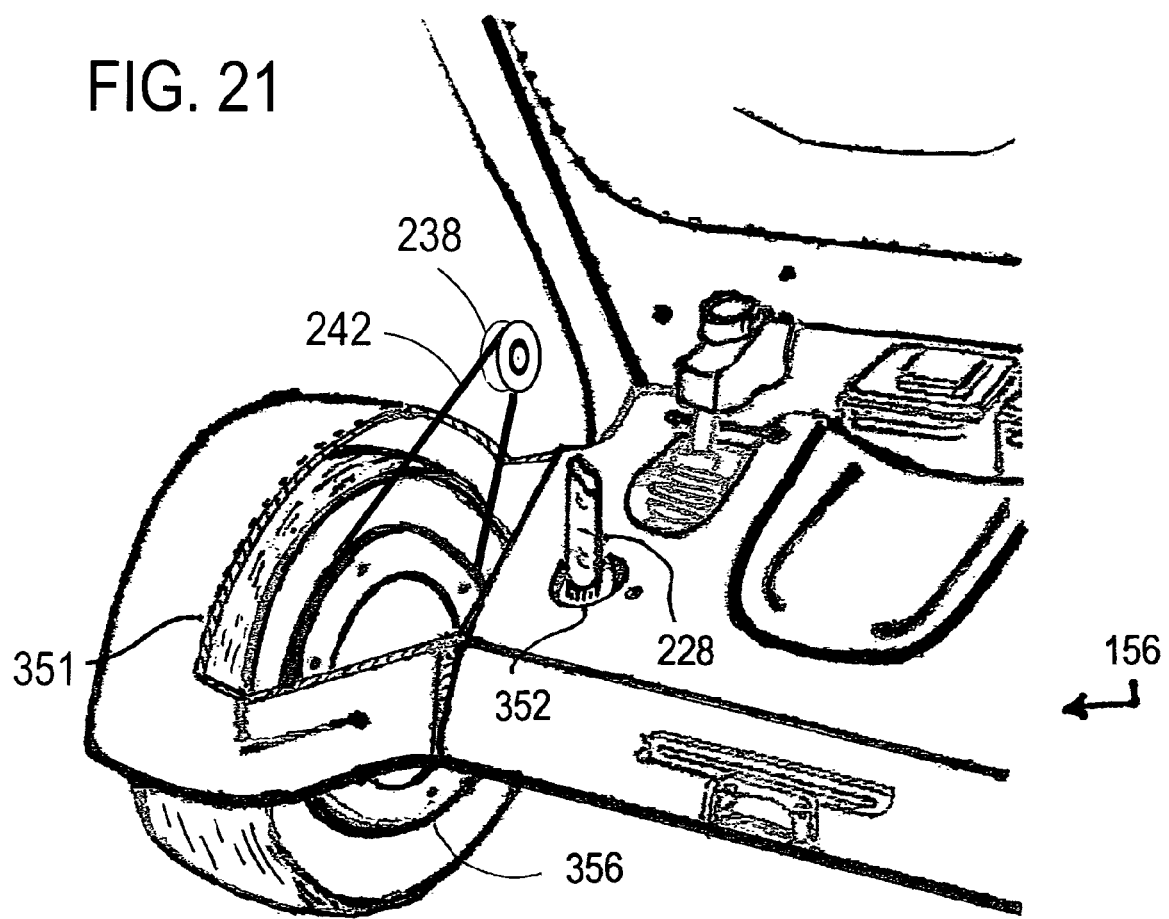
Figure 22:
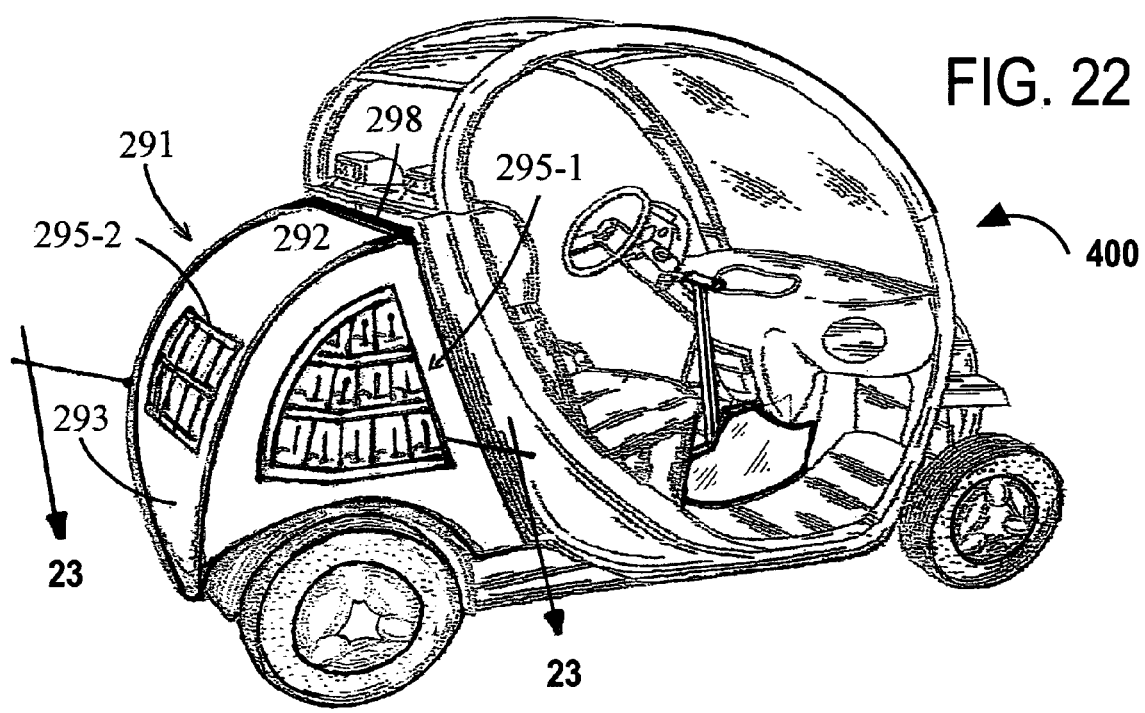

FIG. 20—exploded perspective view of one embodiment of a hub-coaxial wheel-positioner assembly FIG. 21—elevated rear perspective view drawing of prescribed modifications in the aft-spat shown in FIG. 8B FIG. 22—elevated rear perspective view drawing of one embodiment of an auxiliary powertrain enclosure suitable for a first embodiment of our hybrid-powered vehicle shown FIG. 10

Figure 23:
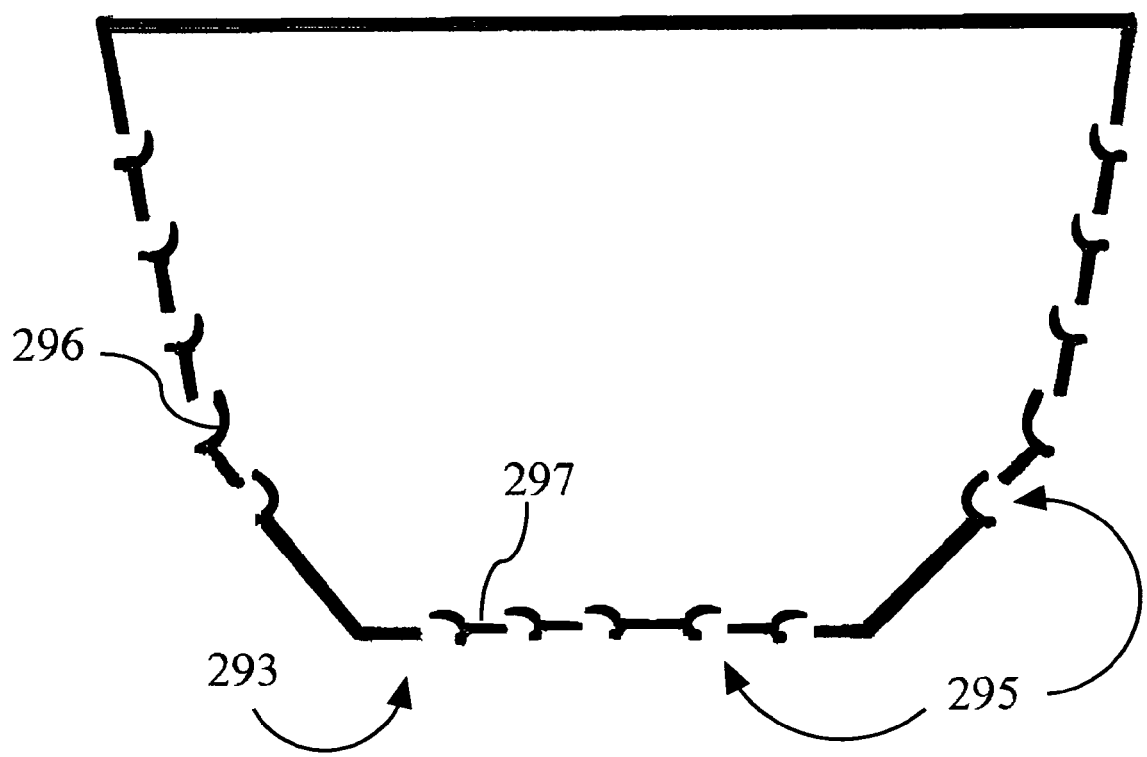

FIG. 23—enlarged transverse sectional view drawing through the enclosure shown in FIG. 22

Figure 24A:
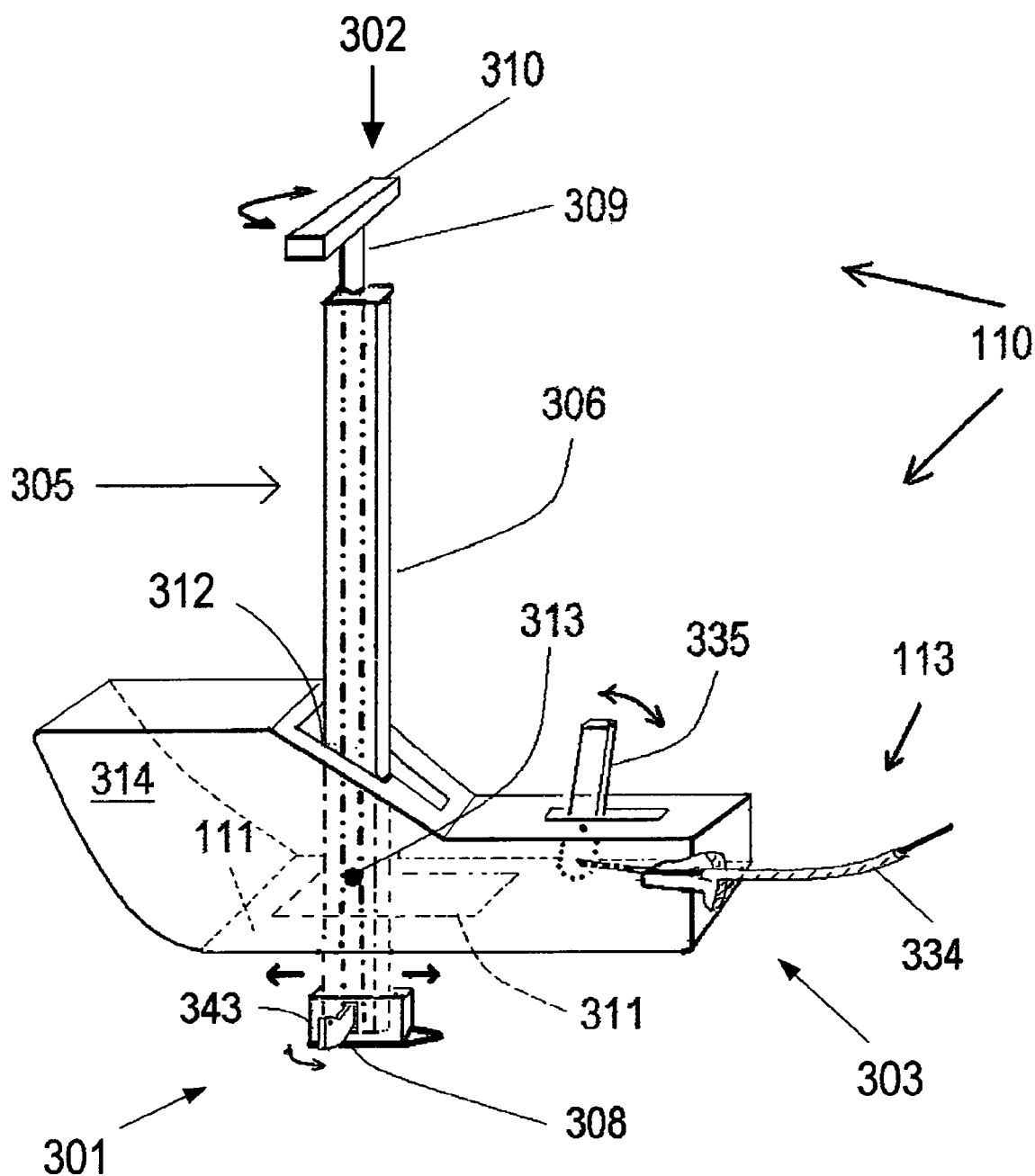

FIG. 24A—left perspective view drawing of an auxiliary-drive operational-controller assembly in a first embodiment of our hybrid-powered vehicle shown in FIG. 10

Figure 24B:
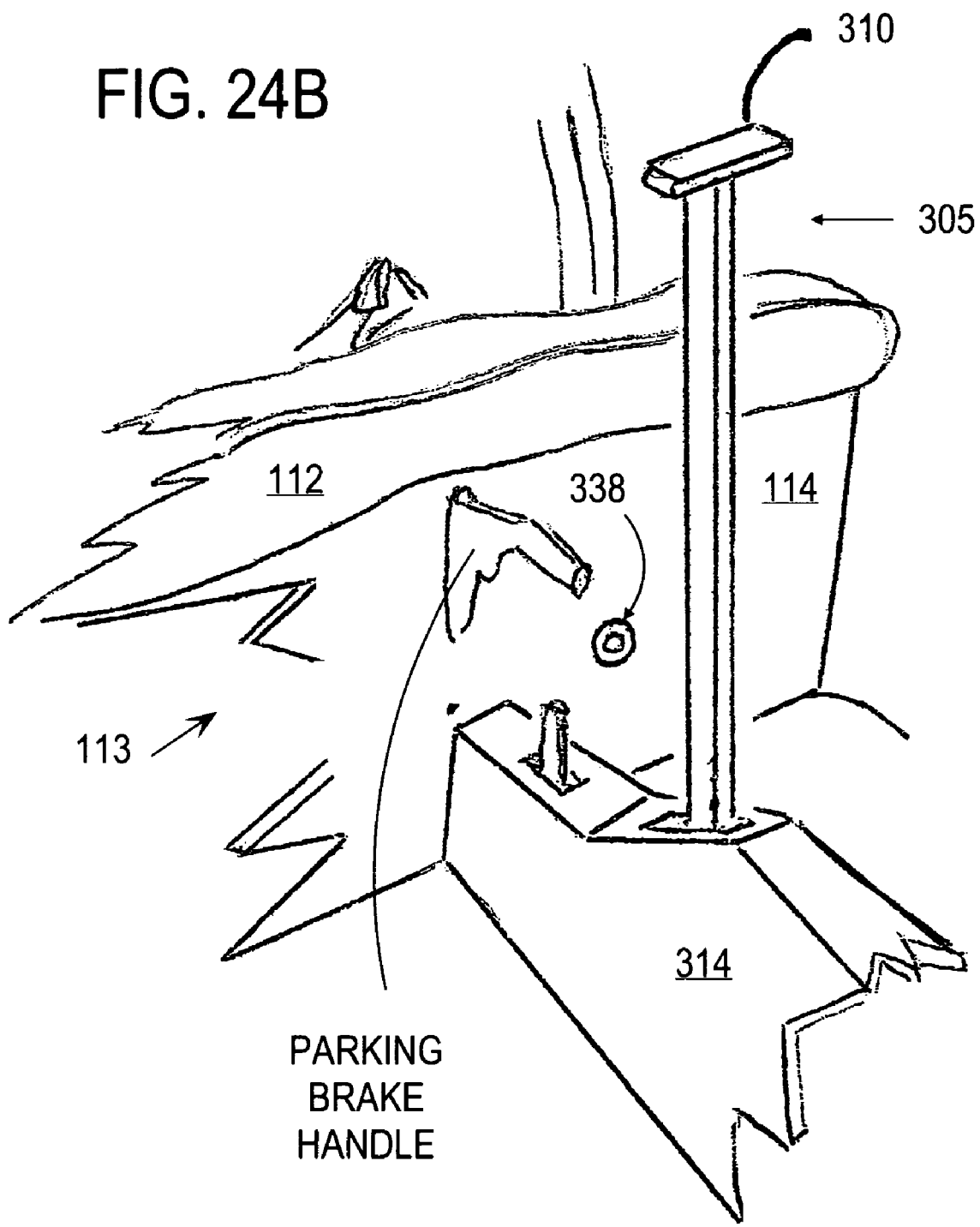
Figure 25A:
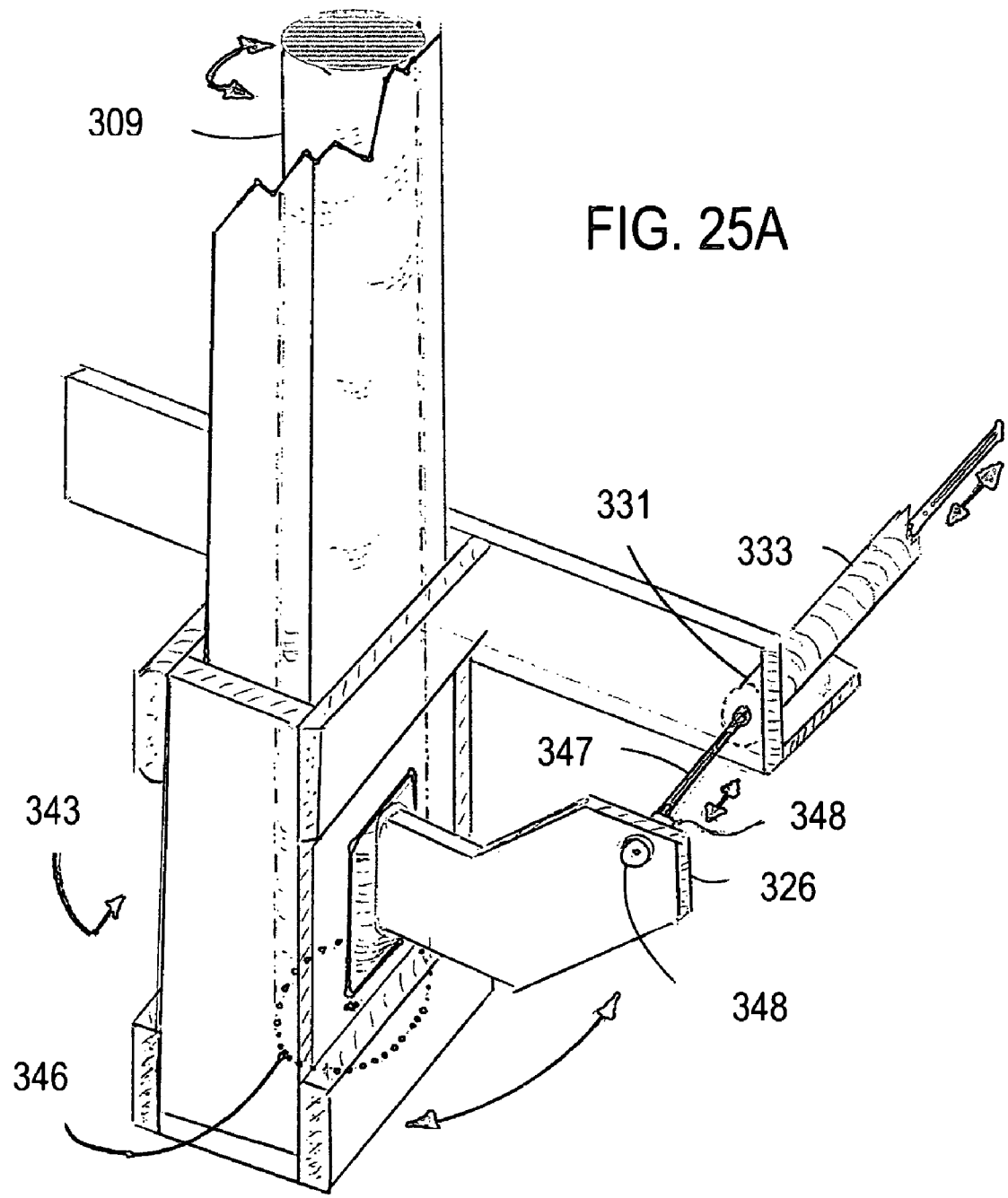
Figure 25B:
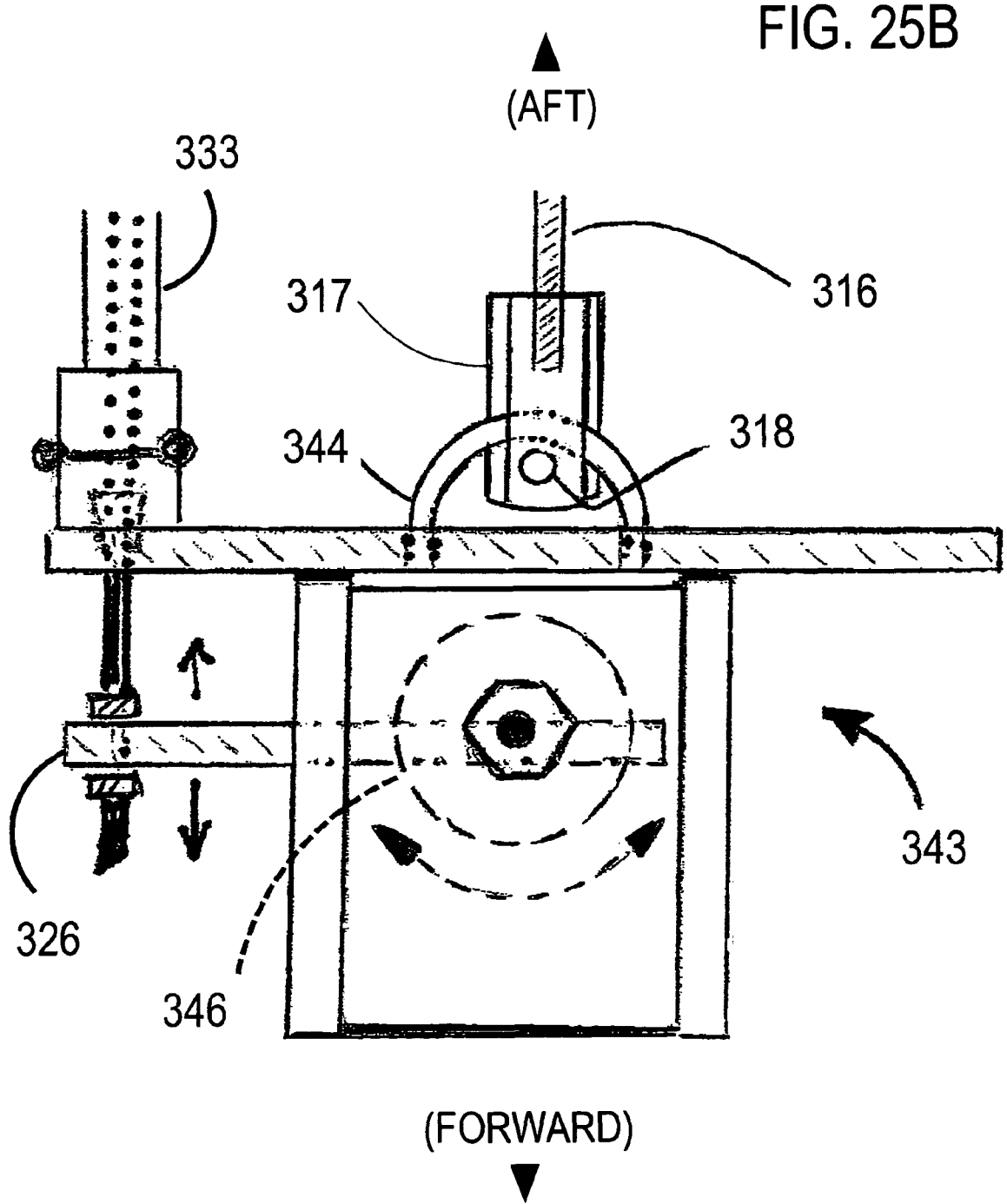
Figure 26:
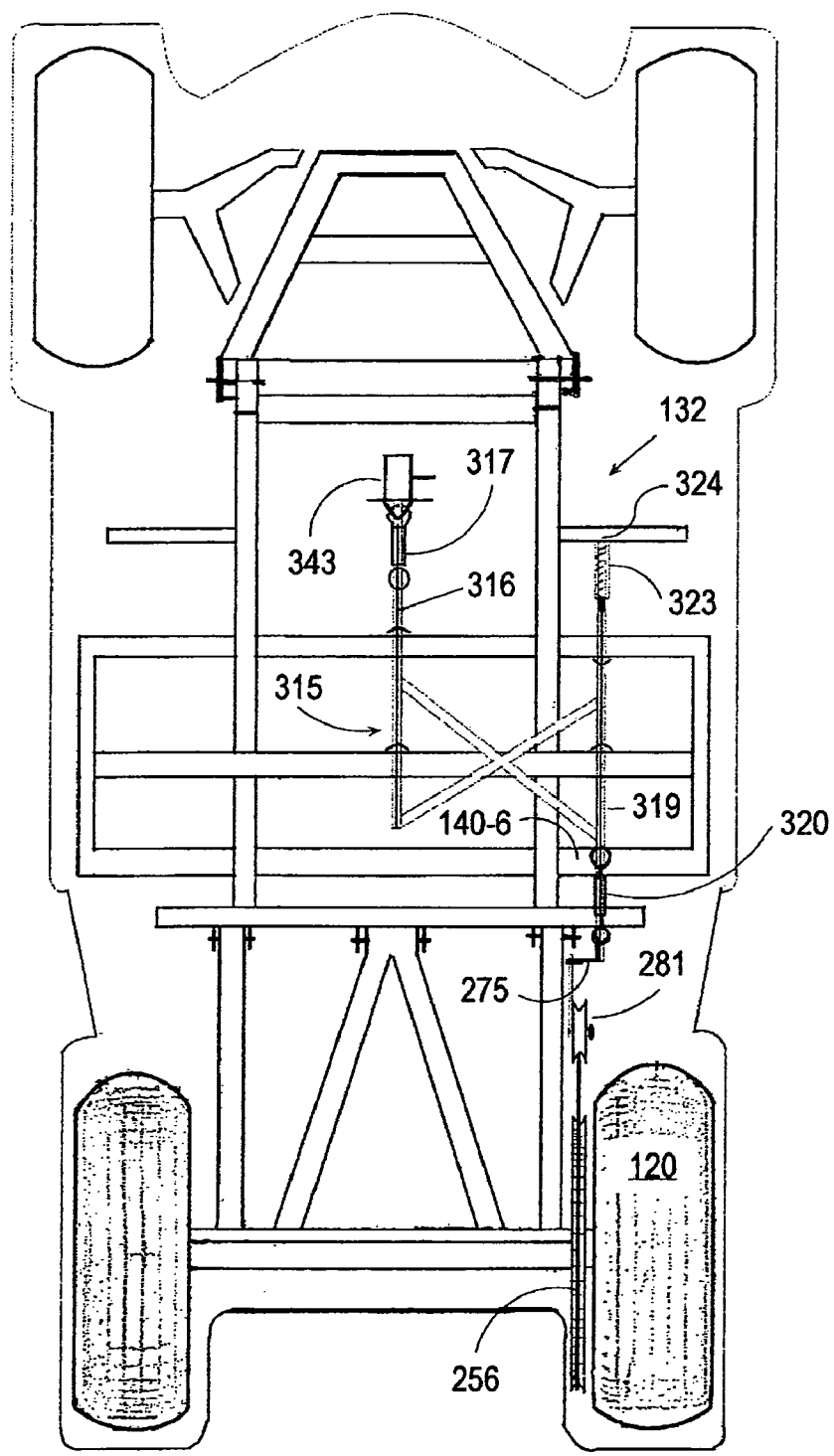
Figure 27:
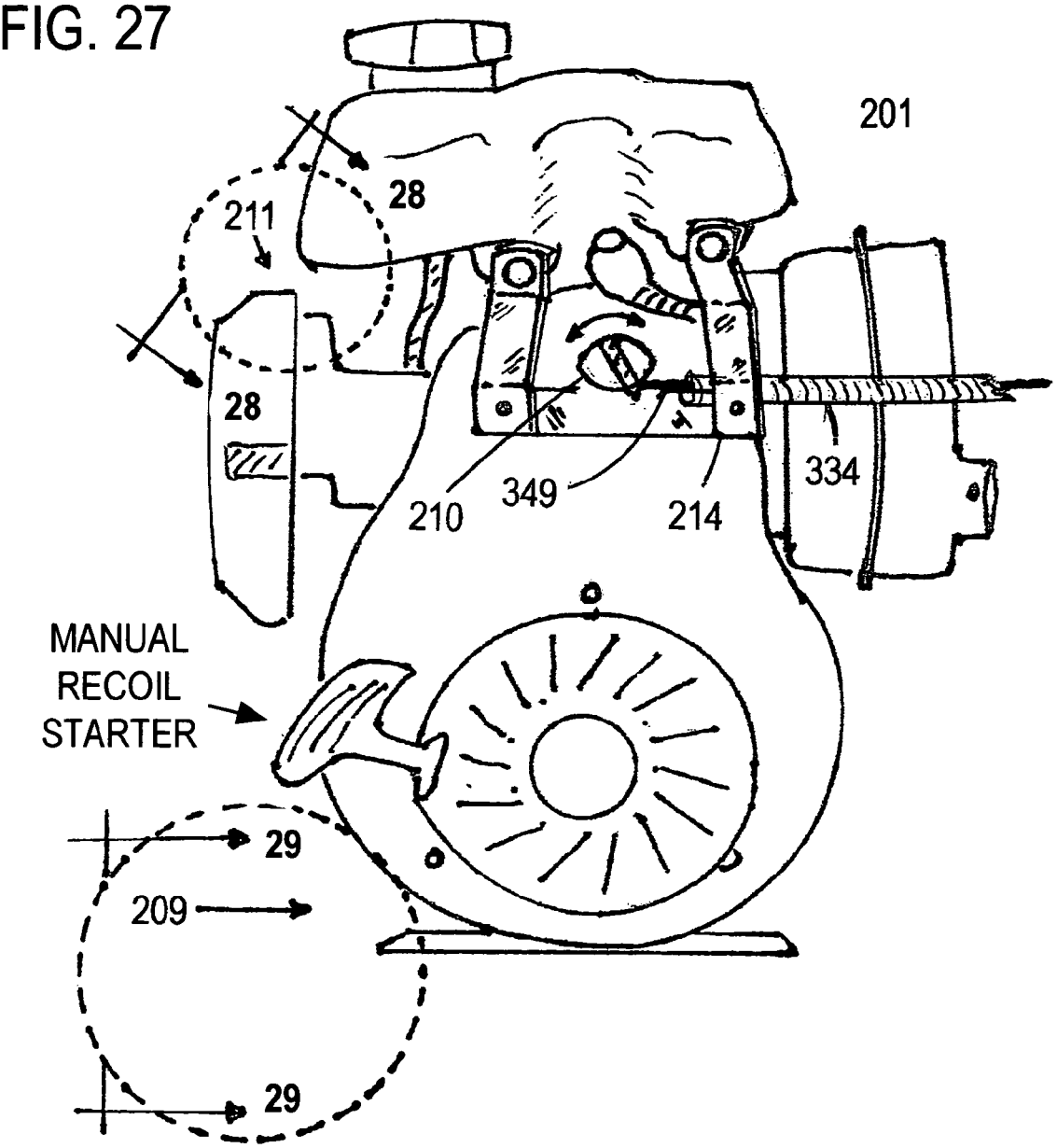

FIG. 24B—right perspective view drawing of the auxiliary-drive operational-controller assembly shown in FIG. 24A FIG. 25A—elevated perspective view drawing of dual-lever lower fitting of the operational controller assembly shown in FIGS. 24A&B FIG. 25B—bottom plan view drawing of dual-lever lower fitting of the operational controller assembly shown in FIG. 25A FIG. 26—bottom plan-view of under-chassis components of auxiliary-drive operational controller assembly shown in FIGS. 24A and 24B FIG. 27—front-view drawing of engine-attachment adapter for on-off circuit-control cable for an auxiliary-powertrain engine shown in FIG. 11

Figure 28:
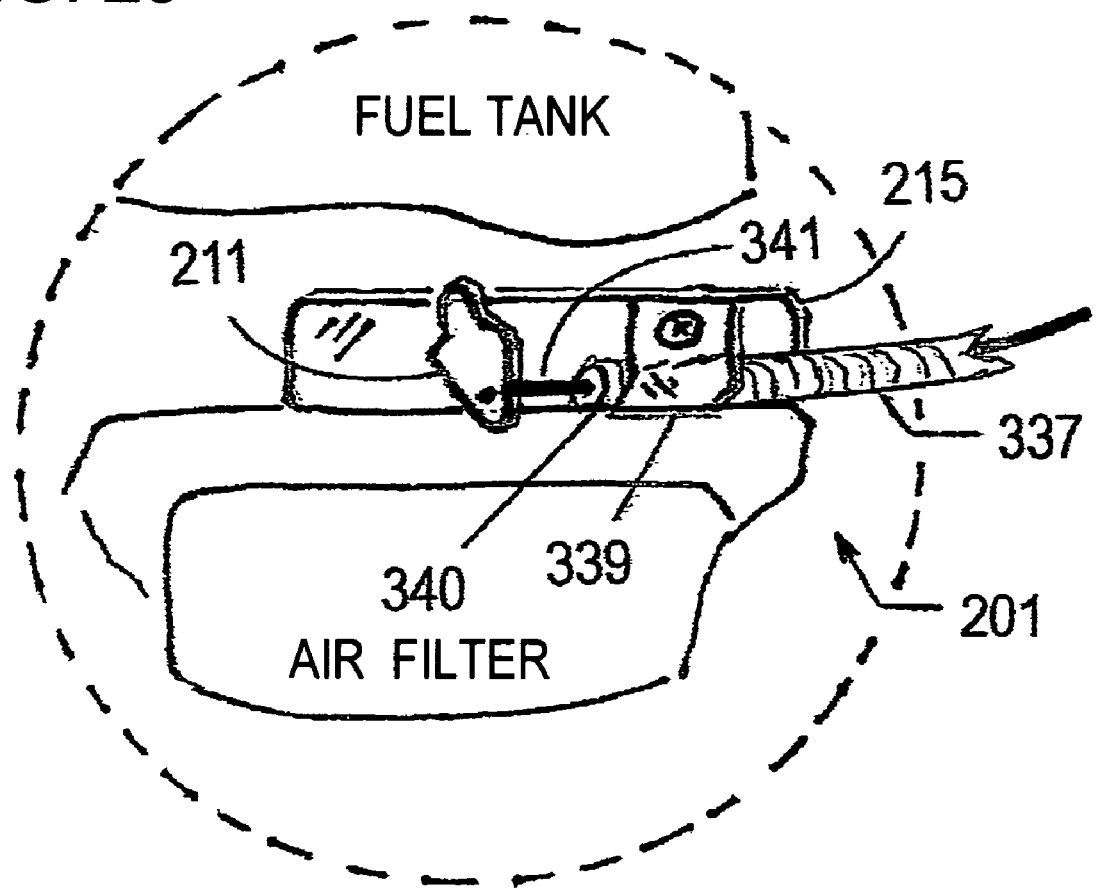

FIG. 28—front-view drawing of engine-attachment adapter for choke-cable for auxiliary-powertrain engine shown in FIG. 11

Figure 29:
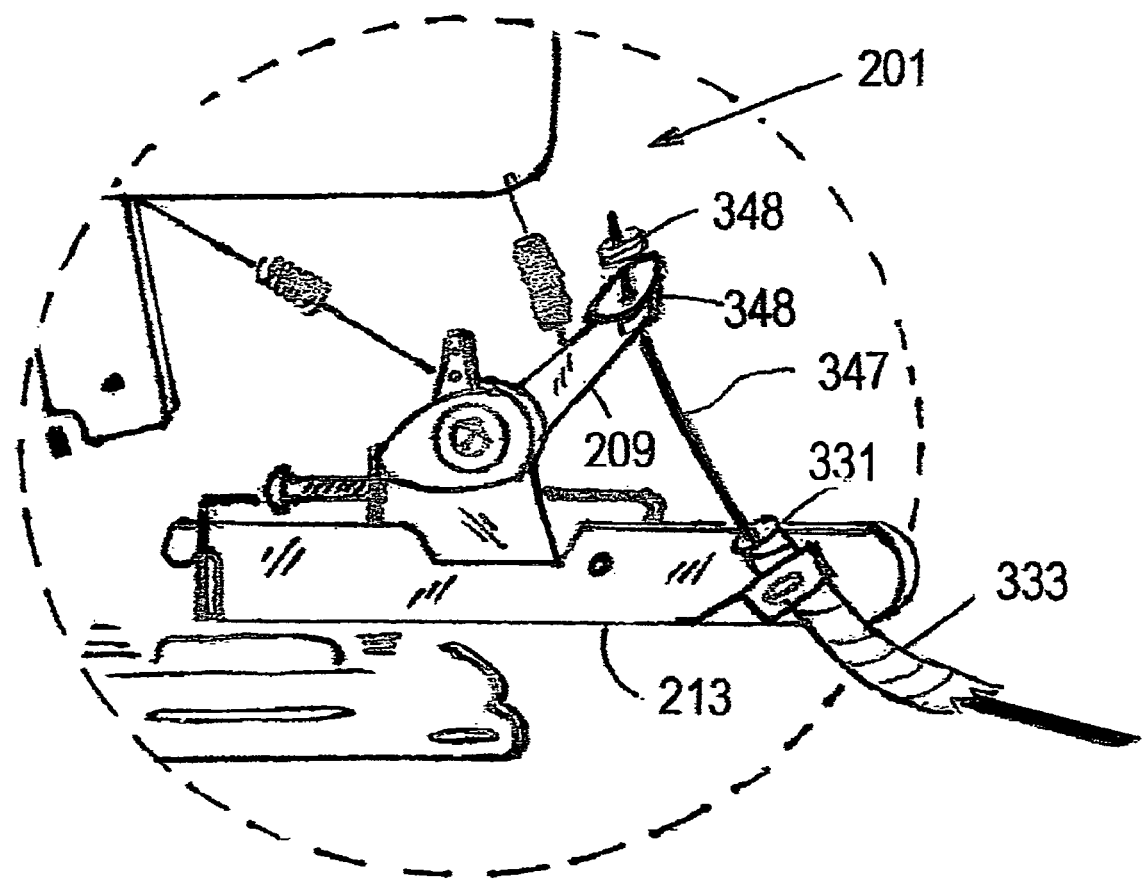

FIG. 29—front-view drawing of engine-attachment adapter for throttle control-cable for auxiliary-powertrain engine shown in FIG. 11

Figure 30A:
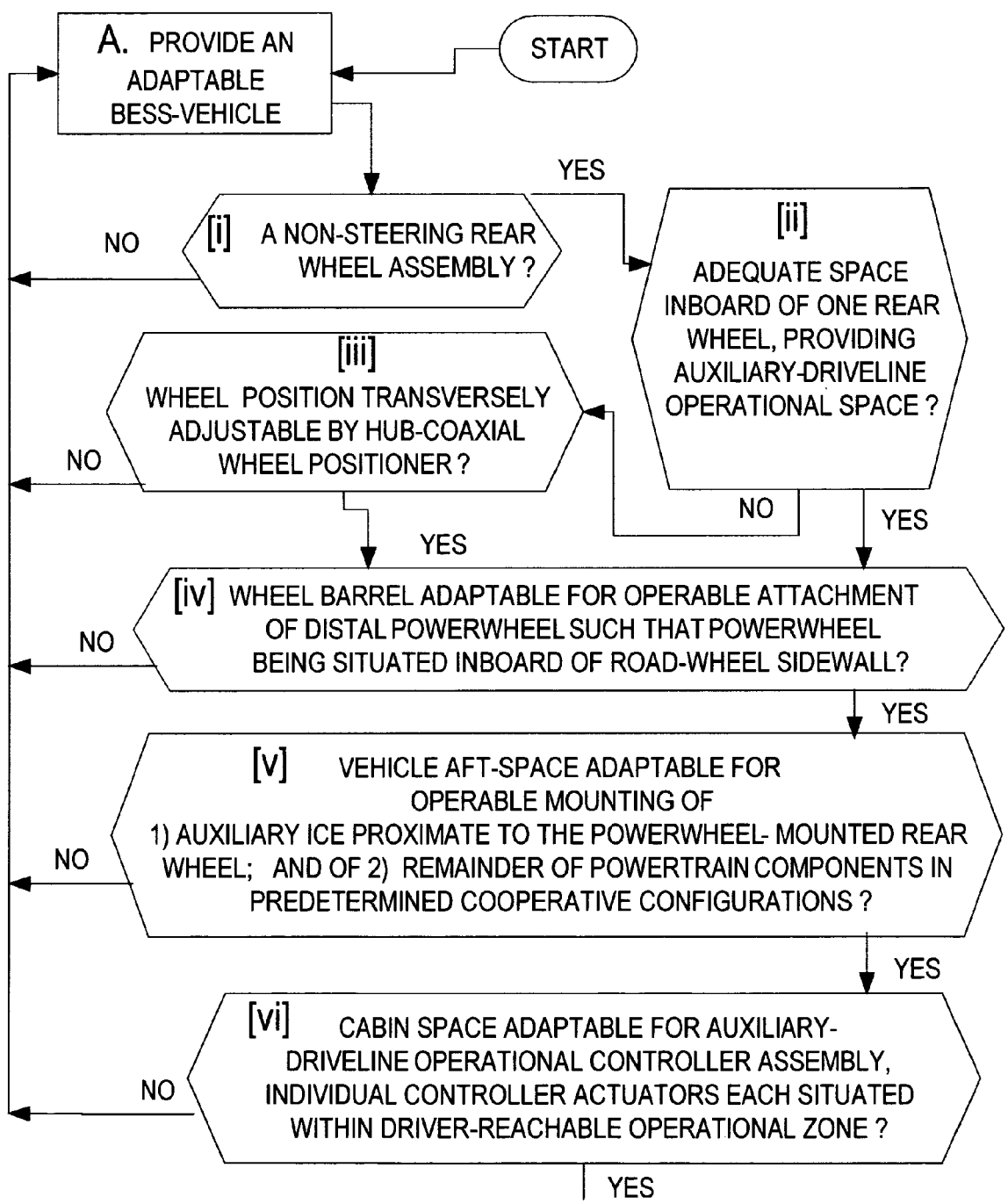
Figure 31A:
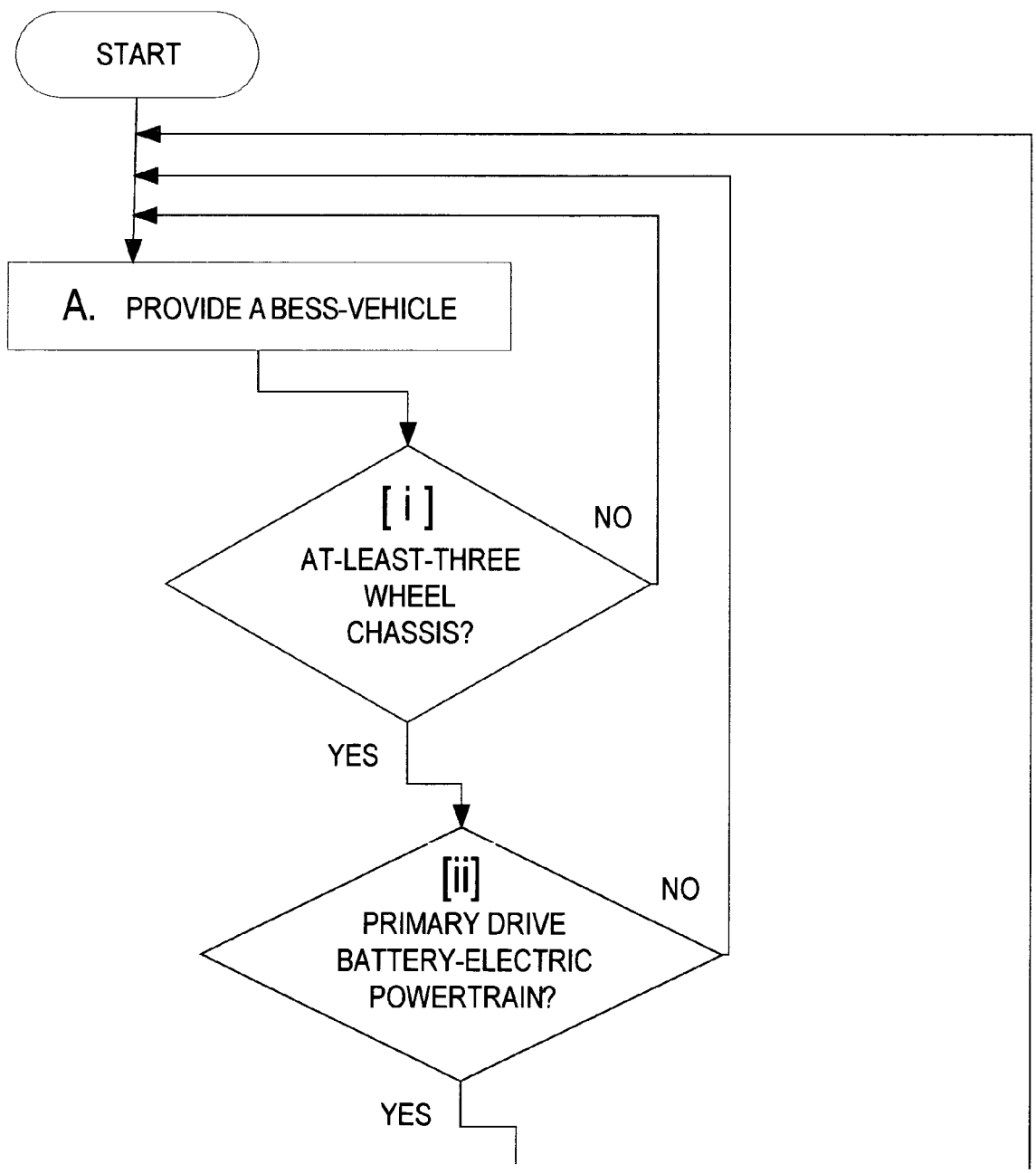
Figure 31C:
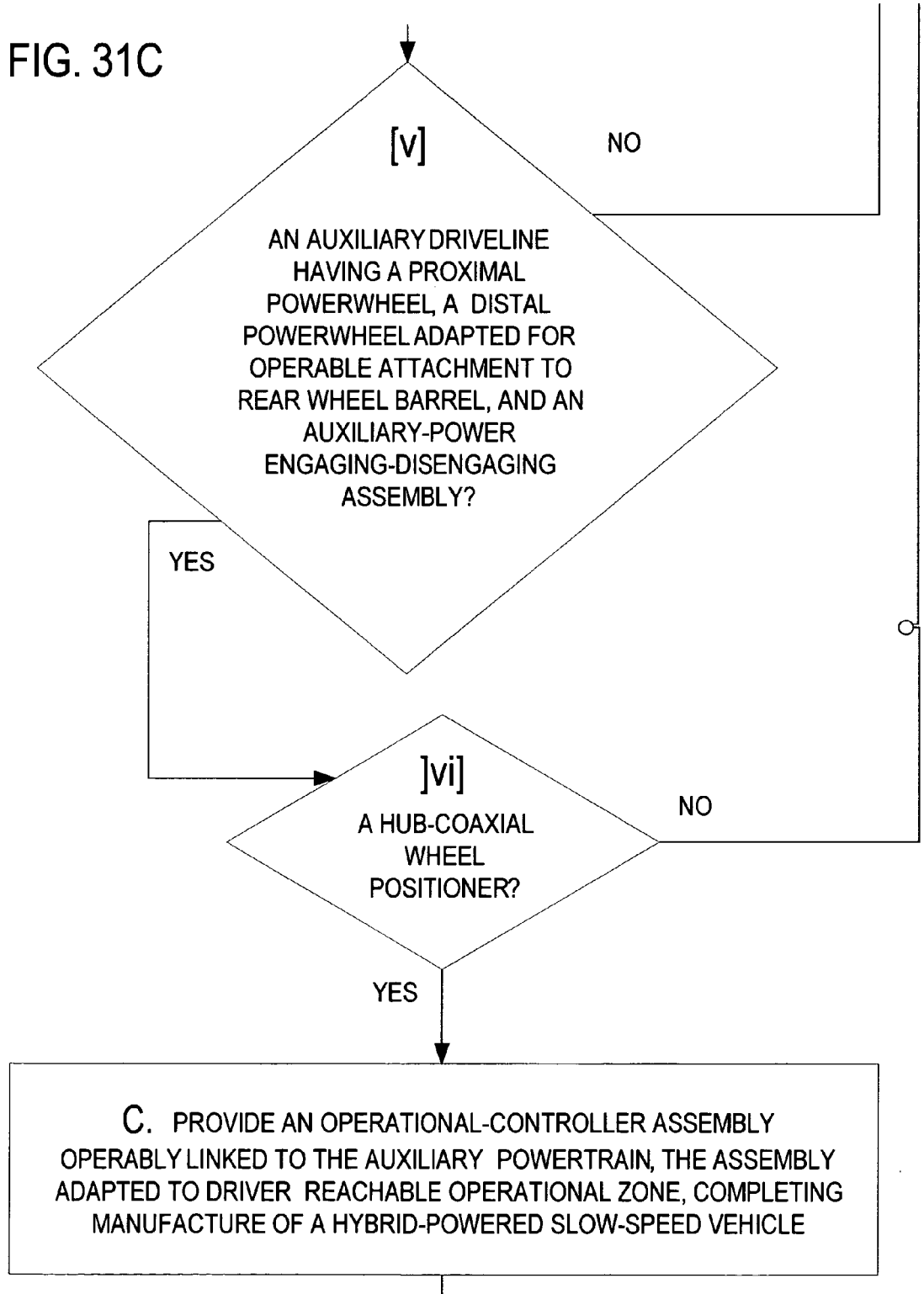
Figure 32:
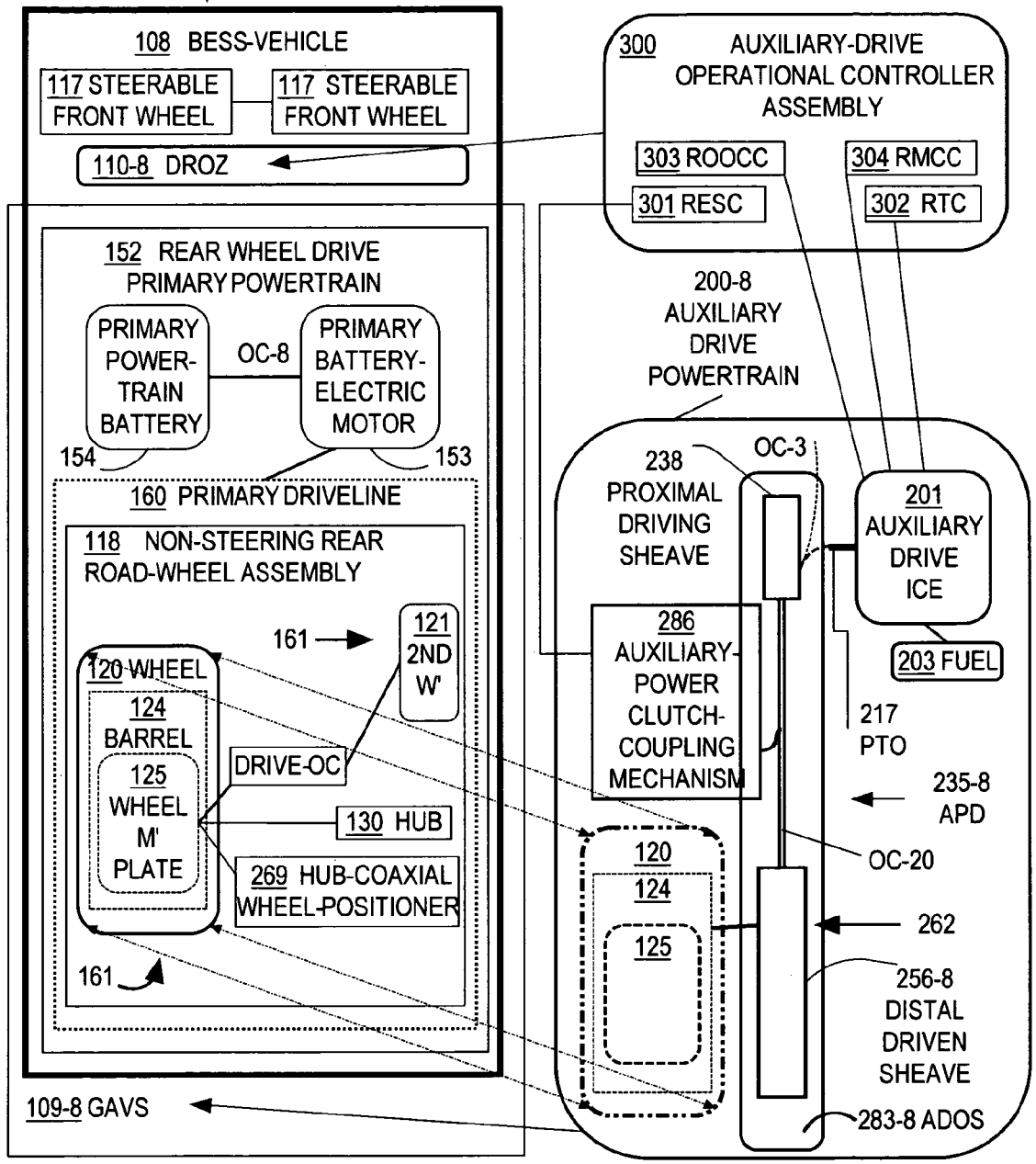
Figure 33:
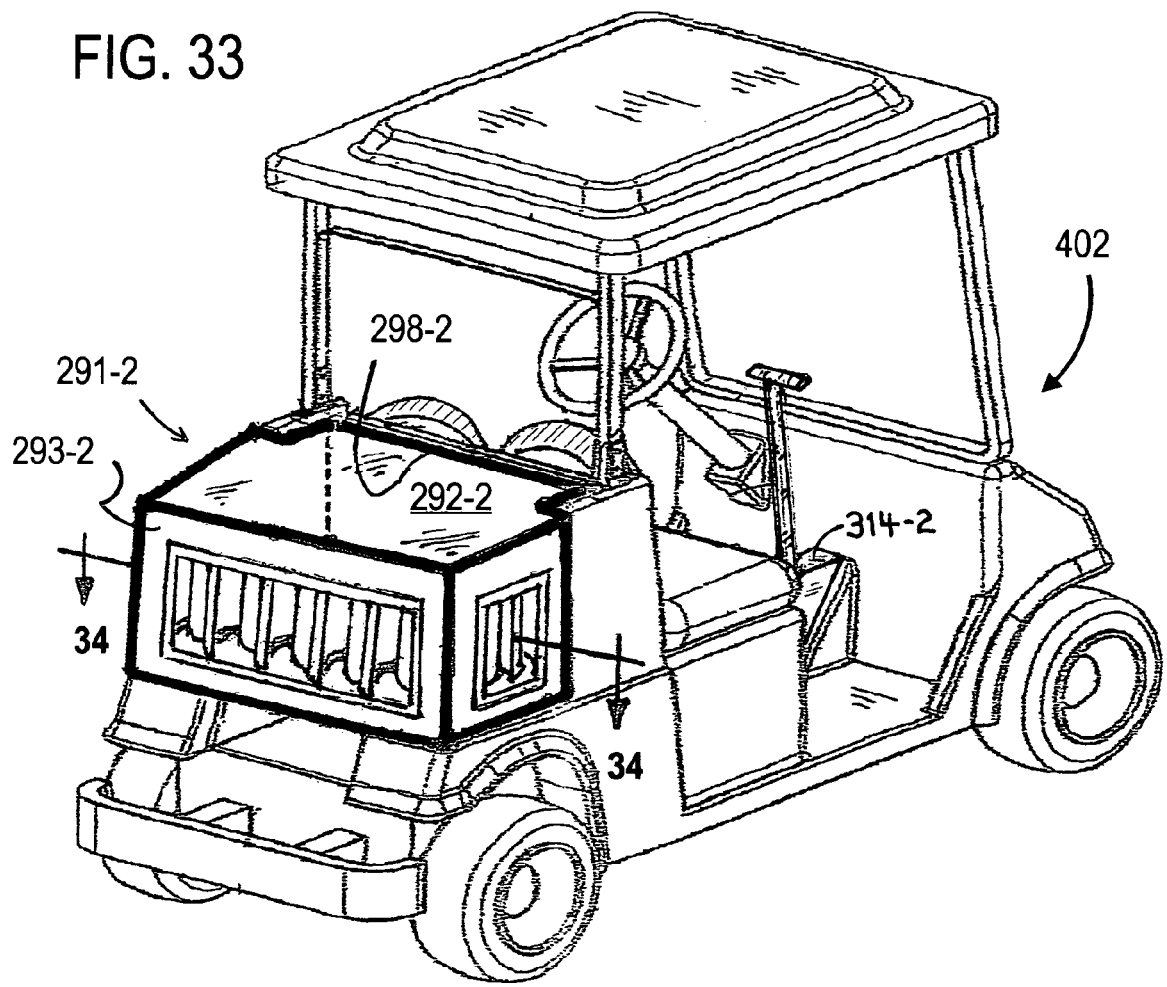

FIGS. 30A-C (Flowchart I)—steps in a method of manufacture of various embodiments of a slow-speed hybrid-powered vehicle in accordance with our present invention FIGS. 31A-D (Flowchart II)—steps in a method of travel-range extension for BESS-vehicles in accordance with various embodiments of our present invention FIG. 32—a block-format schematic illustrating certain fundamental configurations in a second embodiment of a hybrid-powered slow-speed vehicle in accordance with our present invention FIG. 33—elevated rear perspective view drawing of one auxiliary powertrain enclosure suitable for a second embodiment of our hybrid-powered vehicle as exemplified in FIG. 32

Figure 34:
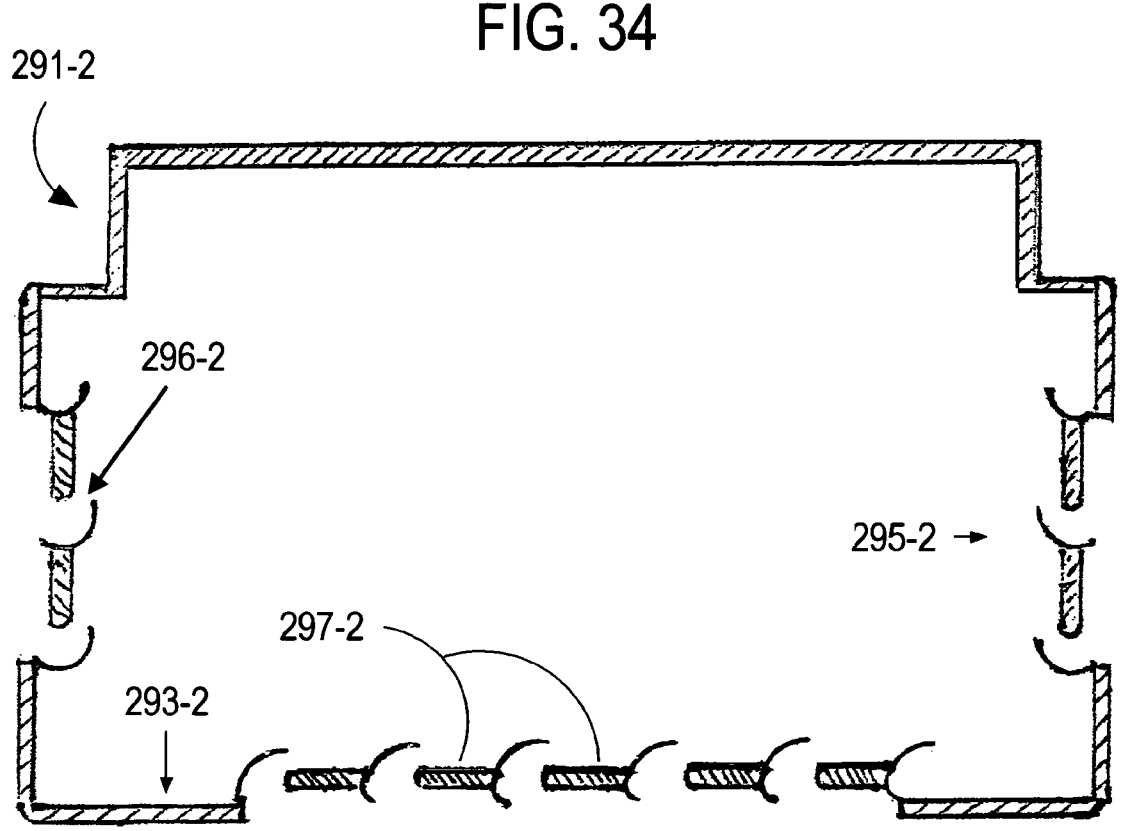

FIG. 34—enlarged transverse sectional view drawing through the enclosure shown in FIG. 33

Figure 36:
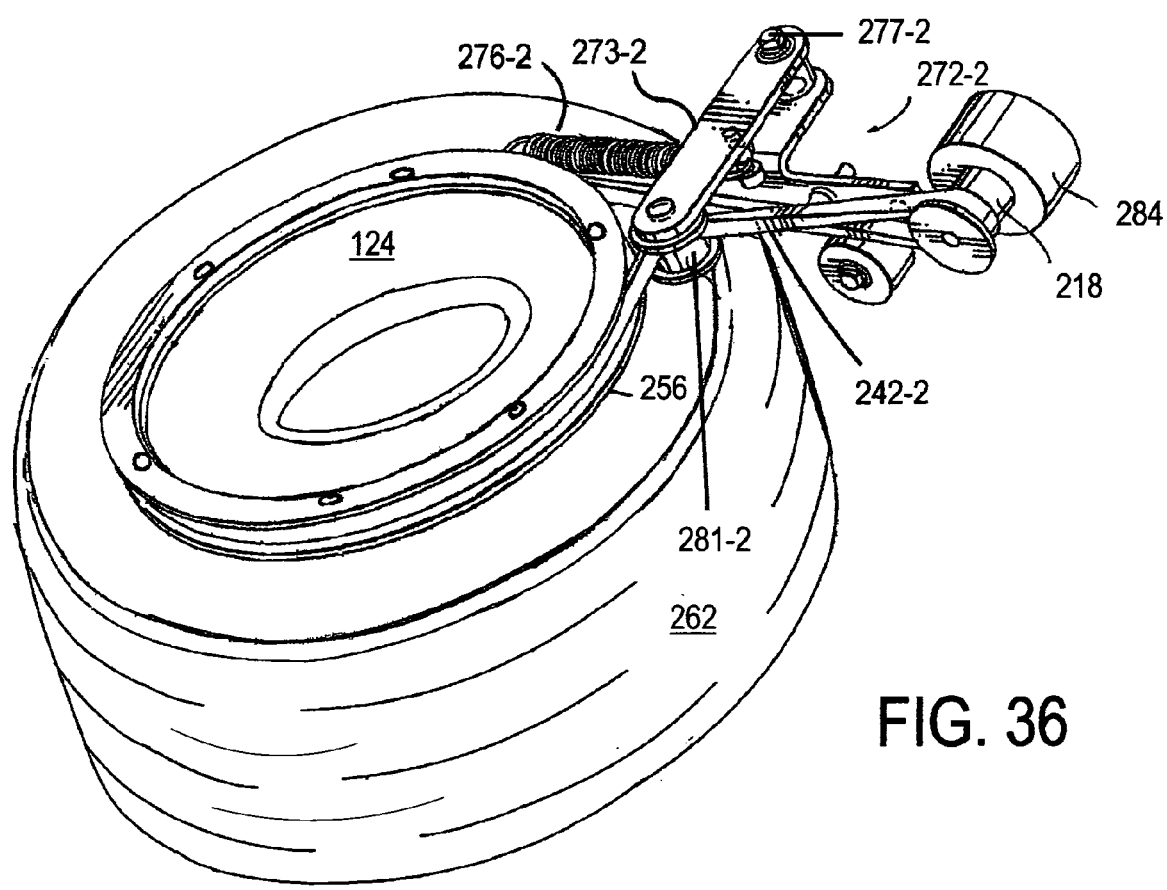
Figure 37:
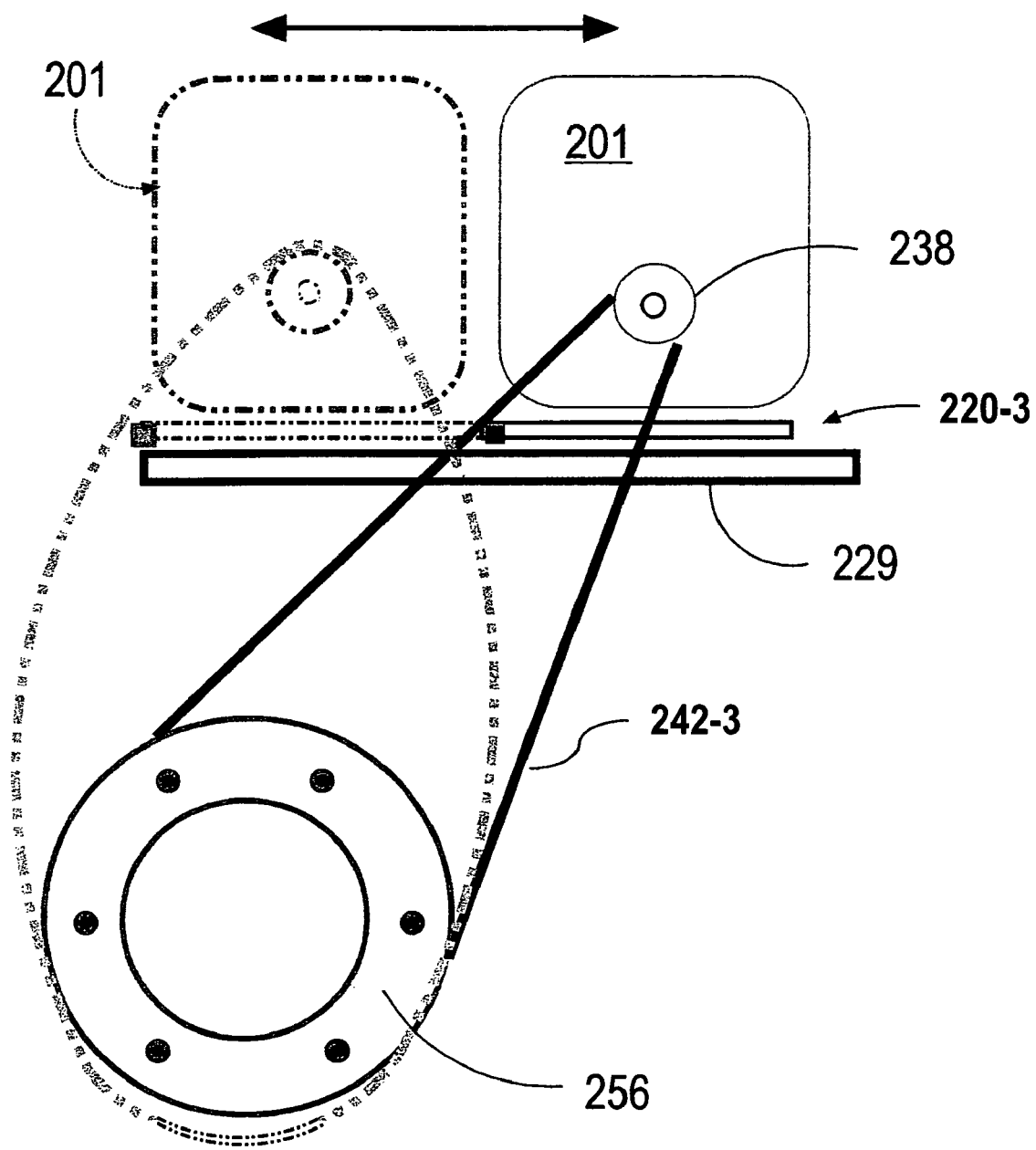
Figure 38:
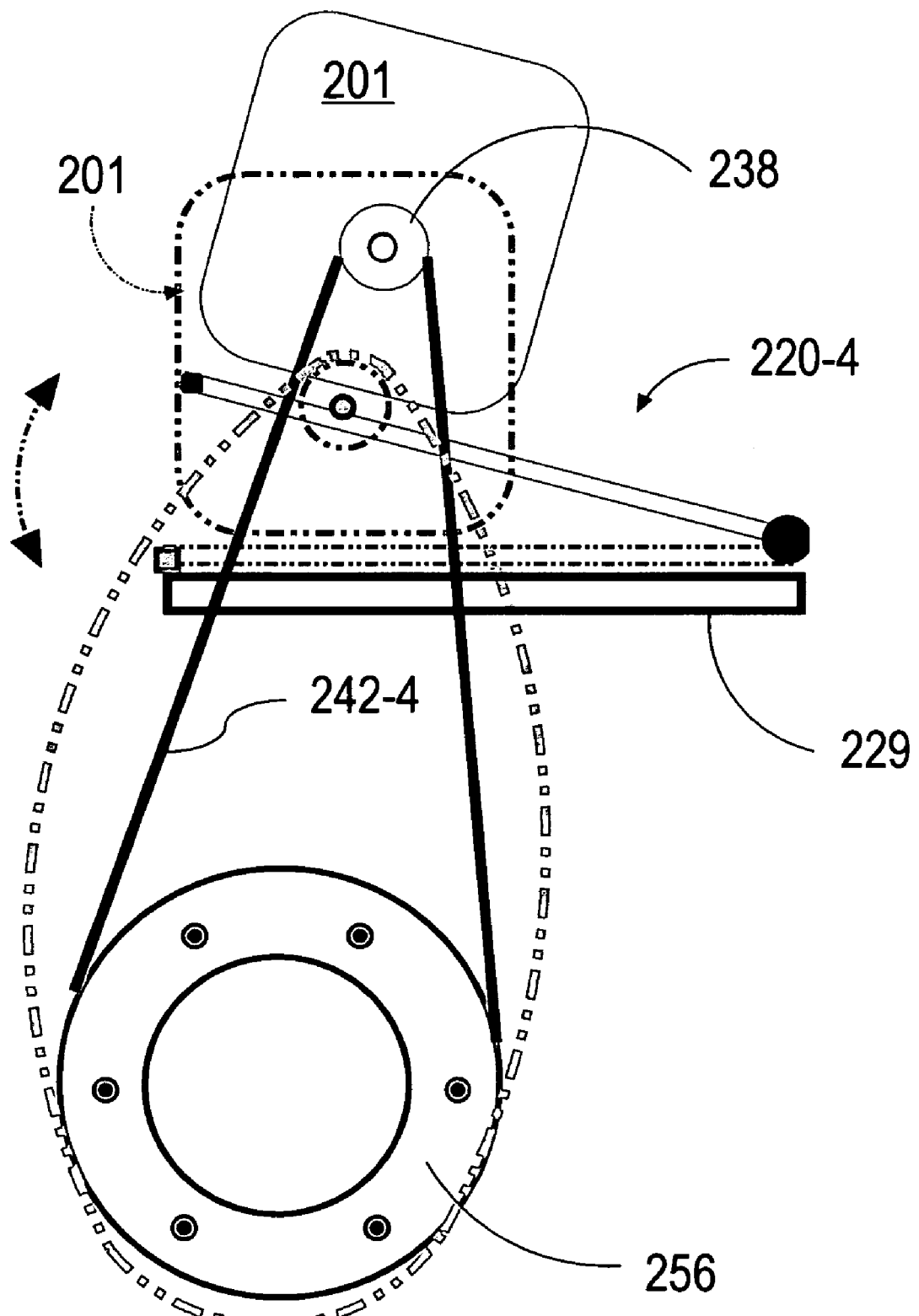

FIGS. 35A-F (Flowchart III)—steps in a method of manufacture of various embodiments of a slow-speed hybrid-powered vehicle in accordance with our present invention FIG. 36—perspective view drawing of one embodiment of a vertical PTO-shaft driveline-assembly for various embodiments of our hybrid slow-speed vehicle in accordance with our present invention FIG. 37—an orthogonal view action-drawing of a first engine-mount-integrated auxiliary-driveline clutch-coupling mechanism FIG. 38—an orthogonal view action-drawing of a second engine-mount-integrated auxiliary-driveline clutch-coupling mechanism

TABLE I

| REFERENCE NUMERALS: | |
| --- | --- |
| 101 | BESS-vehicle |
| 102 | BESS-vehicle |

TABLE I-continued

REFERENCE NUMERALS:

| | |
|---|---|
| 103 | BESS-vehicle |
| 104 | BESS-vehicle |
| 105 | BESS-vehicle |
| 106 | BESS-vehicle |
| 107 | year-2000 GEM ™ model e825 |
| 108 | golf-car BESS-vehicle |
| 109 | generally-aft vehicle-space |
| 110 | driver-reachable operational zone |
| 111 | vehicle cabin-floor |
| 112 | vehicle driver-seat |
| 113 | vehicle battery-compartment |
| 114 | driver seat-base front |
| 118 | non-steering rear road-wheel assembly |
| 120 | first rear road-wheel |
| 121 | second rear road wheel |
| 122 | rear road-wheel tire |
| 123 | rear-wheel (tire) outer diameter |
| 124 | rear road-wheel barrel |
| 125 | rear barrel wheel-mounting plate |
| 126 | rear wheel barrel outer diameter |
| 127 | non-steering rear axle |
| 128 | rear brake assembly |
| 130 | rear wheel-mountable hub |
| 132 | vehicle framework |
| 140 | aft vehicle-frame sites |
| 142 | predetermined maximum vehicle speed |
| 143 | gross vehicle weight rating (GVWR) |
| 144 | vehicle payload rating |
| 145 | primary-drive travel range |
| 151 | front-wheel-drive primary powertrain |
| 152 | rear-wheel-drive primary powertrain |
| 153 | primary battery-electric motor |
| 154 | primary-powertrain battery |
| 156 | aft-spat |
| 157 | encroaching vehicle structure |
| 160 | primary driveline |
| 161 | primary-driveline rear traction-wheel |
| 162 | steerable front traction-wheel |
| 200 | auxiliary-drive powertrain |
| 201 | auxiliary-drive internal combustion engine (ICE) |
| 203 | auxiliary-power fuel-supply |
| 204 | engine horsepower |
| 205 | engine torque |
| 206 | engine idle-speed |
| 207 | engine-speed operating range (in rpm's) |
| 209 | engine throttle arm |
| 210 | engine on-off switch |
| 211 | engine manual-choke lever |
| 213 | throttle cable-attachment adapter |
| 214 | on-off switch cable-attachment adapter |
| 215 | choke cable-attachment adapter |
| 217 | horizontal power take-off (PTO) shaft |
| 218 | vertical PTO shaft |
| 220 | engine-mounting pedestal assembly |
| 223 | lower-platform |
| 224 | pedestal support leg |
| 225 | pedestal support foot |
| 226 | pedestal-foot attachment-bar |
| 227 | upper broad-neck piece |
| 228 | lower narrow-neck piece |
| 229 | upper-platform |
| 230 | upper-neck set-screws |
| 231 | lower-neck collar |
| 232 | bolt |
| 235 | auxiliary-power driveline |
| 236 | proximal auxiliary-driveline assembly |
| 238 | proximal driving-sheave |
| 239 | proximal sheave outer diameter |
| 240 | proximal sheave bore |
| 242 | power transmission belt |
| 243 | proximal belt section |
| 245 | dual idler-pulley assembly |
| 246 | first idler-pulley |
| 247 | second idler-pulley |
| 248 | dual-pulley-assembly tetragonal frame |
| 249 | pulley-assembly first fasteners |

TABLE I-continued

REFERENCE NUMERALS:

| | |
|---|---|
| 251 | distal auxiliary-driveline assembly |
| 252 | distal belt section |
| 253 | axle-coaxial phantom cylinder |
| 254 | phantom cylinder diameter |
| 256 | distal driven-sheave |
| 257 | distal-sheave outer-diameter |
| 258 | distal-sheave inner-diameter |
| 259 | sheave spacer-block |
| 262 | auxiliary-driveline rear traction-wheel |
| 266 | rear-barrel inner aspect |
| 267 | rear-barrel sheave-coupling ring |
| 269 | hub-coaxial wheel positioned |
| 270 | rear wheel-spacers |
| 272 | auxiliary-driveline power-arm assembly |
| 273 | idler-arm |
| 274 | idler-arm upper end |
| 275 | idler-arm lower end |
| 276 | idler-arm belt-tensioning spring |
| 277 | idler-arm pivot-point |
| 279 | idler-arm guide |
| 281 | idler-arm sheave |
| 282 | power-arm assembly controller-linkage |
| 283 | auxiliary-driveline operational space |
| 284 | auxiliary-driveline centrifugal clutch |
| 286 | auxiliary-driveline clutch-coupling mechanism |
| 291 | auxiliary-powertrain enclosure |
| 292 | enclosure top |
| 293 | enclosure rear |
| 295 | enclosure noise-suppression arrangements |
| 296 | enclosure louvers |
| 297 | enclosure plates |
| 298 | enclosure-wall hinge-mechanism |
| 300 | auxiliary-drive operational-controller assembly |
| 301 | remote engine-startup controller |
| 302 | remote throttle-controller |
| 303 | remote on-off-circuit controller |
| 304 | remote manual-choke controller |
| 305 | startup-controller dual-lever assembly |
| 306 | startup-lever |
| 308 | startup-lever bottom-end |
| 309 | throttle-rod |
| 310 | throttle-rod handle |
| 311 | cabin-floor lever-assembly aperture |
| 312 | dual-lever latch-notch piece |
| 313 | startup-lever pivot-bolt |
| 314 | operational-controller assembly-console |
| 315 | startup-controller tie-rod |
| 316 | tie-rod forward end |
| 317 | tie-rod forward turnbuckle |
| 318 | forward clevis-pin |
| 319 | tie-rod aft-end |
| 320 | tie-rod aft-end turnbuckle |
| 321 | aft clevis-pin |
| 323 | tie-rod biasing spring |
| 324 | tie-rod-spring attachment site |
| 326 | throttle-rod wing |
| 331 | throttle-cable nipple |
| 333 | throttle-cable sheath |
| 334 | on-off cable |
| 335 | on-off cable lever |
| 336 | on-off cable aft-end |
| 337 | choke cable |
| 339 | choke-cable clamp |
| 340 | choke-cable sheath |
| 341 | choke-cable wire |
| 343 | console-lever bottom-end fitting |
| 344 | tie-rod connector loop |
| 346 | throttle-rod lower-end |
| 347 | throttle control-wire |
| 348 | throttle-wire ferrules |
| 349 | on-off control-wire |
| 351 | auxiliary-driveline spat-aperture |
| 352 | auxiliary pedestal-neck spat-aperture |
| 353 | wheel-mount lug-set |

TABLE I-continued

REFERENCE NUMERALS:

| | |
|---|---|
| 354 | first lug-set |
| 355 | second lug-set |
| 360 | belt operational-plane change-mechanism |
| 400 | hybrid-powered slow-speed vehicle |
| 500 | first method of vehicle manufacture |
| 502 | second method of vehicle manufacture |
| 600 | vehicle travel-range extension method |

DESCRIPTION

A First Embodiment

Overview

FIG. 10 is a block-format schematic illustrating certain fundamental configurations in a first embodiment of a hybrid-powered slow-speed vehicle 400 in accordance with our present invention. Vehicle 400 fundamentally comprises: 1] a low speed vehicle (LSV), vehicle 107 (see also FIGS. 8A-B), a member of a front-wheel-steerable, battery-electric-slow-speed (BESS)-vehicle group (see FIGS. 1-6, block-format schematics illustrating various wheelbase and primary-powertrain configurations non-exclusively included in this exemplary BESS-vehicle grouping); 2] auxiliary-drive powertrain 200; and 3] auxiliary-drive operational-controller assembly 300. While retaining many advantages of BESS-vehicle 107, vehicle 400 utilizes the primary battery-electric powertrain 151 of vehicle 107 and the auxiliary ICE-driven powertrain 200 in various cooperative sequences and combinations of operations, thereby increasing primary-drive travel range, also yielding other advantages as herein further disclosed.

STATIC DESCRIPTION

A. The BESS-Vehicle

BESS-Vehicle 107, shown in FIG. 8A, is a two-passenger LSV. Vehicle 107 is a model-year 2000 Neighborhood Electric Vehicle (NEV) embodiment manufactured by Global Electric Motorcars, Inc., of Fargo, N. Dak. Vehicle 107, a GEM™ Model e825, having general appearances represented by vehicle-illustrations of FIGS. 8A-C, has certain vehicle-specifications 141 as shown in FIG. 7 (Table II). Vehicle 107 has a curb weight of 445 kg (980 lbs), a gross vehicle weight rating 143 of 725 kg (1600 lbs), a vehicle payload rating 144 of 280 kg (620 lbs), a top vehicle speed (predetermined maximum forward vehicle-speed 142) of 40 km/h (25 mph). Travel range 145 of vehicle 107 provided by a full battery capacity is roughly 48 km (30 ml).

Primary powertrain Vehicle 107, and thereby vehicle 400 also (FIG. 10) has a front-wheel-drive primary drivetrain, primary powertrain 151, like that shown for vehicle 101 in FIG. 1. As also shown in Table II (FIG. 7) powertrain 151 includes: a) a six-battery array of 12-volt deep-cycle flooded lead-acid batteries, shown schematically in FIG. 10 as primary powertrain battery 154; b) a General Electric 3.5 hp (2.6 kW), @ 4500 rpm, DC-motor generating a SAE net torque of 5.2 lbs-ft (7 N-m) @ 2000 rpm, shown schematically in FIG. 10 as primary battery-electric motor 153; c) two steerable front traction-wheels within primary driveline 160, shown schematically in FIG. 10; and d) listed in FIG. 7, but not specifically shown in FIG. 10 are a Dana-Spicer differential, a GE motor controller, an accelerator pedal, an on-board plug-in Schott battery-charger.

In FIG. 10, in addition to primary powertrain 151, hybrid-vehicle 400 includes a non-steering rear road-wheel assembly 118 including a cooperative rear road-wheel pair, wheels 120 and 121. The pair has substantially equal outer tire-diameters 123 (see FIG. 16 for wheel 120; wheel 121 tire and diameters not shown). In this embodiment second wheel 121 is further like first wheel 120 (less the auxiliary-traction adaptations, discussed later). Each of the wheel-pair includes (see FIGS. 16&17—not showing wheel 121) a rear wheel tire 122 mounted on a wheel-barrel 124, rear road-wheel barrel 124 including rear-barrel wheel-mounting plate 125, common to this and a number of other slow-speed vehicles, as known to those familiar with the art. (In various other embodiments, certain features of wheel 120 compared with wheel 121 may differ.)

B. Auxiliary Powertrain

Auxiliary-drive powertrain 200 (FIG. 10), a second fundamental component of vehicle 400, is situated in a left-rear portion of vehicle 107 in generally-aft vehicle space (GAVS) 109.

Engine The powerplant of powertrain 200, a small spark-ignition (SI) internal combustion engine (ICE), is shown schematically in block-format in FIG. 10 as auxiliary-drive-ICE 201. For this first embodiment, engine 201 is a GX-Series commercial grade Honda™ GXH100. As shown in Table III (FIG. 11—certain auxiliary powertrain specifications) engine 201 features overhead valve design and counterclockwise-rotating horizontal power-take-off shaft, horizontal PTO shaft 217. Additional specifications for engine 201 include: c) dimensions 295 mm (11.6")×304 mm (12.0")×402 mm (15.8"); d) dry weight 10.6 kg (23.4#); e) a suitable fuel, auxiliary power combustible fuel-supply 203, being unleaded regular gasoline with up to 10% ethanol, in a 0.77 liter (0.81 US qt) engine-integral fuel tank (tank inferred by fuel-supply 203 block-boundary); g) a net horsepower output (engine-horsepower 204) of 2.8 hp (2.1 kW) @ 3600 rpm; h) a net torque (engine-torque 205) of 4.2 lbs-ft (5.7 N-m) @ 3600 rpm; i) an idle speed (engine idle-speed 206) of approximately 1500 rpm; j) and a recommended operating range (engine-speed operating range 207) of 2500-4000 rpm.

Auxiliary-power driveline Powertrain 200 further includes auxiliary-power driveline (APD) 235 of FIG. 10. Driveline 235 is illustrated in greater detail in FIGS. 12A&B, perspective and orthogonal views, respectively. Driveline 235 consists of proximal auxiliary-driveline assembly 236 and distal auxiliary-driveline assembly 251, the assemblies situated in auxiliary-driveline operational space 283. In this embodiment proximal assembly 236 includes a) a proximal power-wheel, proximal driving sheave 238, b) proximal belt portion 243, and c) an auxiliary-driveline clutch-coupling assembly, power-arm assembly 272. Distal assembly 251 includes a) an auxiliary-drive distal powerwheel, distal driven sheave 256, b) a vehicle-powering rear vehicle-wheel, auxiliary-driveline rear traction-wheel 262, and c) the non-proximal portion of belt 242, distal belt-section 252.

Proximal driveline segment Proximal driving sheave 238, here made of cast-aluminum, has a proximal sheave bore 240 compatible with the nominal ⅝ inch (16 mm) diameter of the power-take-off shaft of engine 201, horizontal PTO shaft 217. Proximal sheave 238 has a 1.4-inch (36 mm) outer-diameter 239. Sheave 238 is operably connected to shaft 217 by standard set screw (not shown) and 3/16 inch (9.52 mm) standard key to shaft-keyway (not shown). Belt 242 here a standard, continuous loop, reinforced-rubber, v-type drive-belt, ⅝-inches (16 mm) wide and 63 inches (1600 mm) long, has a proximal portion 243.

Power-arm assembly As in FIG. 14, power-arm assembly 272 in this embodiment includes: idler-arm 273, idler-arm pivot-point 277 on lever-pivot bolt 278 (⅜-inch [9.5-mm] bolt, & compatible washer, and lock-nut—not shown), idler-arm guide 279, guide fasteners (not shown with specificity), idler-arm sheave 281 near idler arm upper end 274, and idler-arm lower end 275. Arm guide-track 279, is bolted to left aft vehicle framework 132 (FIG. 13) at first and second vehicle-frame sites 140-1 and 140-2 (FIG. 14). Idler-arm belt-tensioning spring 276 connects idler-arm lower end 275 with sixth vehicle frame site 140-6 (see FIG. 26) Idler sheave 281 generally contacts the outer-perimeter surface of belt 242 within proximal belt segment 243. (See FIG. 12b)

Proximal driveline-adaptations to engine As shown in FIGS. 15A&B, dual idler-pulley assembly 245 provides two additional idler pulleys, first idler pulley 246 and second idler-pulley 247. Pulleys 246 and 247 engage the outer circumferential surface of belt 242 in segment 243 thereby urged against driving sheave 238. (Various other embodiments may omit this assembly.) Pulley 246 is forward of PTO shaft 217; pulley 247 is aft of shaft 217. Axial bolts, pulley-assembly first fasteners 249, operably attach each 4-inch (102 mm) outer-diameter idler-pulley, pulleys 246 and 247, near lower apices of a steel-bar tetragonally-configured fabrication, dual pulley-assembly tetragonal frame 248. Frame 248 is attached to engine 201 by compatible bolts 232-2 and lock washers (not shown) near the other two apices of frame 248, the bolts set into pre-tapped exterior holes (not shown) in the block of engine 201.

Distal driveline segment As illustrated in FIG. 16, outer diameter 123 of rear road-wheel 120, a dimension that includes the wheel's roadway-and-turf approved fully-inflated tubeless tire, tire 122 (size 205/50-10, or in metric 18.1×8.1/10), is approximately 18-inches (457 mm). Rear wheel barrel 124, upon which tire 122 is mounted, has a 10-inch (254 mm) outer diameter 126. As in FIG. 18, axle-coaxial phantom cylinder 253 having an 8-inch (203 mm) phantom cylinder diameter 254, encompasses rear brake assembly 128 and predetermined encroaching vehicle structure 157. Cooperatively, inner diameter 258 of driven sheave 256 (FIGS. 16&17) is also 8-inches (203 mm). Driven sheave outer diameter 257 is 12-inches (305 mm). Sheave 256, made of stamped steel, is mounted to inner aspect 266 of rear-wheel barrel 124. Six aluminum sheave-spacer blocks 259 (two of the six being shown in FIG. 17) separate the outboard face of sheave 256 from rear-barrel sheave-coupling ring 267, a flat-plate-steel ring concentrically attached to inner aspect 266 of wheel barrel 124. Sheave 256 and spacer-blocks 259 are boltedly-fastened to ring 267 near inboard rim of barrel 124 (FIGS. 16&17). The sheave-attached wheel provides auxiliary-driveline rear traction-wheel 262.

Engine Mount As illustrated in FIG. 19 (rear perspective on engine-mounting assembly), engine 201 is adaptedly mounted to vehicle 107 by assembly 220. Assembly 220 is fixedly attached to third and fourth aft vehicle-frame sites 140-3 and 140-4. Assembly 220 includes: a) lower first platform 223, b) pedestal support legs 224A and 224B having respective pedestal support feet 225A and 225B, c) upper broad-neck piece 227, d) lower narrow-neck piece 228, e) upper second platform 229, and f) duplicate feet elements 226A and 226B. Feet 225A & B are situated on top of surfaces of sites 140-3 and 140-4, respectively. Duplicate feet elements 226A and 226B, situated on the under surfaces of the respective frame sites, are each bolted to the corresponding foot overhead. Lower platform 223 is secured by bolts and nuts (not shown) to fifth vehicle-frame site 140-5. Engine 201 is attached to upper platform 229 by bolts and nuts (not shown). Upper neck 227 has four set-screw 230 radially directed through its lower perimeter adjustably-engaging lower neck piece 228 telescoped within neck 227 above. Lower-neck steel collar 231, also having four radially-directed set-screws (not shown), height-adjustably, supportingly, engages upper neck piece 227 below its lower rim. Engine-mounted driving-sheave 238 and rear-wheel mounted driven-sheave 256 are in operable alignment. Belt 242 operably rests in portions of the v-belt operational grooves of sheaves 238 and 256.

Axial-positioner of wheel (See FIGS. 17&20) A one-inch (outboardedly-displacing spacer-thickness) aluminum wheel-spacer (stainless-steel lug-studded), rear wheel-spacer 270, is mounted on lug-studded rear wheel-mountable rear hub, hub 130. Wheel barrel 124 of left rear wheel is mountedly positioned on the lugs of second lug-set 355 of rear wheel-spacer 270. Spacer 270 is mounted to lug-set 354 of hub 130. Similarly for this embodiment, for symmetry in wheelbase, right rear wheel 121 is equally spaced (not shown) outboardedly by another wheel-spacer 270 mounted to right rear hub (not shown). One outboard boundary of auxiliary driveline operational space 283 is immediately inboard of and parallel to the tire-inboard side-wall (not numbered) of tire 122.

Vehicle aft-spat FIG. 8B illustrates, in phantom, generally-aft vehicle space 109 for vehicle 107. Rear-spat 156 resides in space 109. FIG. 21 (prescribed modifications in all spat) illustrates vehicle body alterations in spat 156 in accordance with our present invention, alterations particularly suited for this first embodiment, including: a) a generally rectangular driveline opening, auxiliary-driveline spat-aperture 351, a roughly 2 inch (51 mm) wide and 14 inch (356 mm) long opening located in left rear fender region of spat 156, opening 351 penetrable by distal driveline assembly 251 shown incompletely in this Fig. by belt 242 engaging proximal sheave 238 (see also FIG. 12B); and b) a rounded (prolate) pedestal-neck opening, auxiliary pedestal-neck spat aperture 352, roughly 1.75 inch (44 mm) wide and 2 inch (51 mm) long, opening 352 penetrable, as shown, by pedestal neck-piece 228.

Enclosure Auxiliary powertrain 200 in vehicle 400 is largely enclosed by auxiliary powertrain enclosure 291 illustrated in FIG. 22 (elevated rear quarter perspective view of auxiliary-powertrain enclosure suitable for vehicle embodiment shown in FIG. 10). Enclosure 291 has noise suppression arrangements 295 comprising sets of vertically disposed and longitudinally shaped louvers, louvers 296, secured between vertically-spaced, generally-horizontal plates, enclosure plates 297. Enclosure top and rear walls, walls 292 and 293, are mounted on enclosure-wall hinge mechanisms 298. The drawing of FIG. 23 illustrates a transverse sectional view through a portion of the noise-suppression arrangement 295 portrayed from the directional perspective indicated by arrows 23-23 in FIG. 22. Top 292 and rear 293 surfaces of interior of enclosure 291 are partially covered by sound-absorbing foam (not shown).

C. Operational-Controller Assembly

As evident in the block-diagram in FIG. 10, auxiliary-drive operational-controller assembly 300, a third fundamental component of vehicle 400, includes remote engine-startup controller (RESC) 301, remote throttle controller (RTC) 302, remote on-off circuit controller (ROOCC) 303, and remote manual-choke controller (RMCC) 304. Assembly 300 is situated within driver-reachable operational zone (DROZ) 110.

Remote engine start-up controller Exemplified in greater detail in the drawings of FIGS. 24A&B (perspective views of operational controller assembly of FIG. 10), engine-startup controller 301 includes a startup-controller dual-lever assembly 305. In FIG. 24A assembly 305 is outwardly a generally-upright, forward-aft-forward pivoting, stiff, rectangularly-tubular vinyl rod, startup-lever 306. Tubular lever 306 surrounds an axially-pivotable round steel conduit, throttle-rod 309, that extends the length of lever-tube 306. Integrated controller assembly 305 extends downwardly through cabin-floor lever-assembly aperture 311. Aperture 311, a roughly rectangular opening, measures approximately 4-inch (88 mm) long by 1-inch (22 mm) wide. Lever assembly 305 pivots on startup-lever pivot-bolt 313. Bolt 313 is horizontally and transversely secured above floor 111 within operational-controller assembly-console 314. Console 314 is longitudinally positioned forward to aft and fastened (bolted means not illustrated) to floor 111, encompassing floor-opening 311. Assembly 305 is secured to console-lever bottom-end fitting 343 at startup lever bottom end 308. Dual-lever latch-notch 312 is in the mid-portion of console 314.

Rod 309 has a roughly horizontal handle, throttle-rod handle 310, fixedly attached to top end of rod 309, as in FIGS. 24A&B. Handle 310 is situated roughly in the mid-portion of vehicle-cabin space 109, within driver operationally engaging zone 110. Throttle-rod 309 is adapted at its lower end (see FIG. 25B) for axially pivotable connection to floor of console-lever bottom-end fitting 343.

Controller-lever assembly 305, at its lower end fitting 343 (FIGS. 25A, 25B, and 26) is pivotably attached to startup controller tie-rod 315 (FIG. 26) at tie-rod forward end 316 (FIGS. 25B and 26). Forward clevis pin 318 (FIG. 25B) links tie-rod forward turnbuckle 317 (FIGS. 25B and 26) to tie-rod connector loop 344 (FIG. 25B) fabricated on aft aspect of fitting 343. As shown in FIG. 26, tie-rod 315 courses beneath fundamental vehicle-framework 132 rear-ward and left-ward, supported by eyelets (not labeled) attached to under-framework 132. Tie-rod 315 couples at tie-rod aft end 319 with tie-rod aft end turnbuckle 320. Aft clevis pin (not illustrated) links turnbuckle 320 with idler-arm lower end 275 forward of left rear vehicle-wheel 120. Tie-rod biasing spring 323 connects tie-rod 315 to tie-rod spring attachment site 324.

Engine throttle controller (See FIGS. 25A & B) Throttle-rod 309, introduced above, has a limb, throttle-rod wing 326, that protrudes roughly 51-mm (two-inches) horizontally from the left side of rod 309 near throttle-rod lower end 346. Throttle-control wire 347, secured to wing 326 by fore and aft crimped throttle-wire ferrules 348, passes rearward into throttle-cable sheath 333. Conduit 333, forwardly, is stationarily attached behind throttle-cable nipple 331 to a left rear aspect of fabricated fitting 343. Conduit 333 courses rear-ward, secured with wire-ties (not shown) placed around tie-rod 315 at several locations. As illustrated in FIG. 28 (throttle-control cable engine-attachment adapter—see also FIG. 26 for context of FIG. 28), conduit 333 at its aft end at engine 201, is stationarily attached behind throttle-cable nipple 331 to throttle cable attachment adapter 213. Wire 347 is connected to engine throttle-arm 209.

Engine on-off circuit controller As shown in FIG. 24A, on-off cable lever 335 is situated topside near the aft of console 314. On-off cable 334 runs from its connection to lever 335 back through vehicle battery compartment 113 into generally-aft vehicle space 109. In space 109 cable 334 reaches engine 201 (see FIG. 26, engine-attachment adapter for on-off circuit control cable) where cable aft end 336 is clamped to on-off switch cable attachment adapter 214. On-off control-wire 349 connects to engine on-off switch 210.

Manual choke Engine manual-choke lever 211 (see FIG. 27, choke-cable engine attachment adapter) at engine 201 is operably pierced distally by choke-cable wire 341. Cable-clamp 339 secures choke-cable sheath 340 to choke-cable attachment-adapter 215 on engine 201. Cable 337 courses forward into vehicle-battery compartment 113 under cabin-seat 112 to seat-base front 114 where standard choke-cable control-knob 338 is secured.

OPERATIONAL DESCRIPTION

A. How to Make this Embodiment

FIGS. 30A-C provide a flowchart (Flowchart I) illustrating steps in a method, method 500, for the manufacture of certain embodiments, including our first embodiment of a slow speed hybrid-powered vehicle in accordance with our invention. Here the manufacture of vehicle 400 is based upon an existing adaptable BESS-vehicle. The skilled artisan, of course, will readily envision that embodiments of our present invention can be equally usefully produced in an integrated manufacturing/assembly process that accompanies base BESS-vehicle production. In addition, the method is not to be construed as requiring that its steps always be performed in the order in which they are exemplified in FIGS. 30A-C. This will be further apparent below. See also FIG. 10, and other FIGS as named from time to time, for a better understanding and appreciation of FIGS. 30A-C.

As in FIG. 30A, Step A, the first step is in providing adaptable BESS-vehicle, in this instance our first vehicle 107. Vehicle 107 is shown to be suitably adaptable for the addition of auxiliary powertrain 200, by the following criteria: a) rear wheel assembly is non-steering (see Decision [i]), b) rear wheel 120 is adjustable to a necessary transverse-position (see Decision [iii]) using hub-coaxial wheel positioner 269 (in this instance wheel-spacer 270 and lug-sets 354 and 355), providing sufficient auxiliary-driveline operational space 283 (see Decision [ii]); c) residual portions of aft-space 109 are adequate for the other components of auxiliary powertrain 200 (see Decision [v]); d) rear wheel 120 is adaptable for operable attachment of distal sheave 256 (see Decision [iv]); e) driver-reachable operational zone 110 in vehicle cabin-space 109 is available for addition of operational controller assembly 300 (see Decision [vi]).

Gathering Components Predetermined vehicle 107, partially-disassembled predetermined enclosure-fitted auxiliary powertrain 200, and partially-disassembled predetermined auxiliary operational-controller device 300, as previously described, are provided.

Removing Spat Vehicle 107 is positioned (Step B, FIG. 30B) to facilitate needed and convenient access to various components and spaces. The fiberglass rear-body section, vehicle body aft-spat 156, is unbolted and temporarily removed, providing always-useful and sometimes-essential exposure of aft vehicle-frame sites 140 (see FIG. 8C).

Removing rear wheels The rear wheels are removed and set aside. In certain other embodiments, only the intended traction-wheel would be removed. (Step C-1, FIG. 30B)

Operably attaching distal sheave to left rear wheel (See also FIGS. 16&17) Wheel barrel 124 is adapted for distal sheave attachment (Step C-2, FIG. 30B). A fabricated six-holed (5/16-inch, 8-mm) steel-plate open ring, rear-barrel sheave-coupling ring 267, is concentrically welded to inner surface of inboard aspect of left rear-wheel barrel 124, rear-barrel inner aspect 266. (For this step, rear-wheel tire 122 is temporarily removed from barrel 124 to protect from welding-damage, and then remounted after welding.) Distal driven sheave 256 is fabricated from a standard-stock stamped-steel sheave. A through-and-through disk of 8-inch (203 mm) diameter, a diameter equivalent to phantom cylinder diameter 254, is concentrically removed from the interior area of the stock-sheave. Holes are drilled perpendicularly through the remaining sheave-face, the drilling guided by the 8 mm (5/16 inch) holes of a template (not shown) of sheave-coupling ring 267 aligned concentrically on the sheave-face. Selected bolts 232-4 with lock-washer collars (not shown) are inserted through the six mounting holes in sheave 256, inserted from inboard to outboard. Sheave spacer-blocks 259 are then slipped onto each of bolts 232-4 which are aligned and advanced into respective bolt-holes in ring 267. The bolts are fastened outboard to ring 267 with locking-nuts (not shown). In a spatial plane parallel to that of a rotational plane of wheel 120, and operably inside of rear wheel inboard sidewall plane 268 of tire 122, distal sheave 256 is secured to wheel 120, creating auxiliary-driveline rear traction-wheel 262.

Mounting wheel-spacers onto each wheel-hub (See FIG. 20) (In certain embodiments, an option may be taken to treat only the selected auxiliary-driveline traction-wheel for spacer use.) Lug-bolt featured rear wheel-spacers 270 are mounted onto lug-bolt sets 354 of the rear wheel-mountable hubs 130. Spacers are secured. (Step D, FIG. 30B).

Operably mounting right wheel onto spacer Fenestrated rear-barrel wheel-mounting plate 264 of right (second) rear wheel 121 is slipped onto respective lug-set 355 of right spacer 270. Lug nuts (not shown) secure the mounting.

Loosely mounting left wheel onto wheel-spacer Large inner diameter 258 of mounted sheave 256 and deeper inner aspect 266 of rear-wheel barrel 124 of left auxiliary-driveline rear road-wheel 262 are together advanced inboardedly and concentrically over rear brake assembly 128 until fenestrated wheel-mounting plate 125 is slipped onto lugs of wheel-mount lug-set 355 of left spacer 270. The lug-nuts are hand-tightened. The temporarily installed wheel 262 thereby defines a portion of outboard boundary to auxiliary driveline operational space 283, as illustrated in FIG. 17.

Mounting engine pedestal to vehicle frame (See FIG. 19; see Step F, FIG. 30B) Engine-mounting assembly 220 is generally securely bolted, at lower platform 223 and below, to aft vehicle-frame sites 140-3,-4,&-5, while leaving upper broad-neck piece 227 and upper platform 229 positions finely adjustable.

Mounting engine to pedestal upper platform (Mounting ICE: Step G, FIG. 30B) Engine 201 is situated such that horizontal PTO shaft 217 is outboard of engine block and intersects auxiliary driveline operational space 283 roughly perpendicular to a forward-to-aft vertical plane through the interior of space 283. So-situated engine 201 is fastened to upper platform 229 with bolts and nuts (not shown). Engine exhaust pipe (FIG. 12A) is lengthened and curved, redirecting exhaust-exit forward of rear traction wheel 262 and just outboard the left border of space 109.

Mounting proximal sheave to PTO shaft (Step E, FIG. 30B) Proximal sheave 238 is mounted and lightly secured on PTO shaft 217 such that the operational groove of driving sheave 238 aligns with the operational groove of distal driven sheave 256.

Temporarily installing v-belt around sheaves V-belt 242 is slipped onto the operational grooves of operably aligned sheaves 238 and 256. Sheave alignment is reconfirmed; then attachment of proximal sheave 238 to shaft 217 is tightened.

Removing left rear wheel V-belt 242 is slipped off distal sheave 256. Lug nuts are removed from left spacer 270; and left rear auxiliary traction-wheel 262 is temporarily removed from left spacer 270 and set aside.

Installing auxiliary-driveline power-arm assembly (Step H, FIG. 30C) As illustrated in FIGS. 14&15, idler-arm guide 279 is bolted to vehicle frame sites 140-1 and 140-2 through new 8 mm (5/16 inch) holes (not shown) created in vehicle framework at those bolting locations. Idler arm 273 is inserted in slot of guide track 279. Vehicle-frame bolt (not shown) is removed from frame-site 140-7, inserted through pre-drilled idler-arm pivot-point 277, and then rebolted at same site, pivotably coupling arm 273 to vehicle 107. Idler-arm sheave 281 is then bolted to idler-arm upper end 274 with (not shown) 10 mm (3/8 inch) bolt, washers, and lock-nut, such that sheave 281 is aligned for engaging with the forward-facing outside surface of belt 242. Idler-arm belt-tensioning spring 276 is connected to idler-arm lower end 275 and to proximate vehicle frame site (not shown), further engaging and biasing sheave 281 against belt 242 in a belt-tensioning, clutch-coupling manner.

Securely remounting left rear wheel and attached sheave Auxiliary driveline road-wheel 262 is remounted onto left spacer 270 (see again Step D, FIG. 30B); v-belt 242 is inserted into lower operationally-grooved perimeter of distal sheave 256 (Step J, FIG. 30C). Lug set 355 firmly secures wheel 262 to spacer 270 and thereby operably to vehicle.

Installing auxiliary operational-controller device in vehicle cabin (Step K, FIG. 30C)

[A.] Overview Forward portions of auxiliary-drive operational controller assembly 300 (FIGS. 24A&B) are installed in driver-reachable operational zone (DROZ) 110 for operationally linking the respective controllers of assembly 300 distally with specified coupling-adapted action-governing parts of auxiliary-drive powertrain 200: a) dual controller-lever assembly 305 (FIGS. 24A&B) is linked under vehicle 107 (FIG. 26) to power idler-arm assembly 272 (FIGS. 13&14), a startup-actuator in this first embodiment; b) remote throttle-controller 302 (FIG. 24A) is linked to adapted engine-throttle arm 209 (FIG. 29); c) remote manual-choke controller 304 (FIG. 24B) is linked to engine manual-choke lever 211 (FIG. 28); d) remote on-offcircuit controller 303 is linked from on-off cable lever 335 (FIG. 24A) to connection-adapted engine on-off switch 210 (FIG. 27).

[B.] Console installation Aperture 311 is created in cabin floor. On-off cable lever 335 and its operably attached cable 334 are gathered. On-off lever-module 335 is attached to a predetermined module-mounting site on the left wall of console 314, the left wall secured to cabin floor 111, the wall aligned at the left edge of aperture 311. On-off cable 334 is threaded aft from console 314 through battery compartment 113 to engine 201, verifying an adequate cable length.

Dual controller-lever assembly 305, including startup-lever 306 and throttle-rod 309 with its handle 310, is vertically advanced at lower end 308 through aperture 311 until assembly 305 pivot hole aligns with the console-hole for bolt 313. The right wall of console 314 is then positioned next to dual-lever 305 and parallel to left wall of console 314; and bolt 313 is then inserted and fastened for forward and aft pivot of lever-assembly 305. Right wall is then fastened to left wall of console 314 with screws (not shown). Dual-lever latch-notch piece 312 is then fastened to top of console 314.

[C.] Throttle and startup controller linkages At underside of vehicle 107, bottom end fitting 343 (FIG. 24A) is slipped upward onto end 308 and fastened with a lock-nut as illustrated in FIG. 25B. Throttle-wing 326 is inserted and cotter-pin-secured (not shown) into its recipient slot in throttle-rod 309. Throttle conduit 333 is clamped to fitting 343; throttle wire 347 is operably attached to wing 326. At tie-rod forward end 316, turnbuckle 317 is coupled to loop 344 with clevis pin 318. At tie-rod aft end 319, turnbuckle 320 is linked to idler-arm lower end 275 with clevis pin 321. Tie-rod biasing spring 323 (FIG. 26) is attached forwardly at tie-rod-spring attachment site 324. Conduit 333 is secured with self-locking ties (not shown) to tie-rod 315 at several sites (not shown) from forward to aft. Distal end of throttle wire 347 is guided to engine 201, verifying an adequate cable length.

[D.] Choke controller (See FIG. 24B) A hole is created in seat-base wall 114 for choke-cable knob-assembly 338 which is fastened in wall 114 with nut and washer (not shown) of assembly 338. Choke cable is advanced distally under vehicle driver seat 112 through compartment 113 to engine 201, verifying an adequate cable length.

Preparing for rear spat modifications (Step F, FIG. 30B; FIG. 12B) V-belt 242 is slipped off proximal sheave 238 at PTO shaft 217. Then (FIG. 19) set screws 230 on neck 227 are loosened. Engine 201, attached platform 229 and contiguous upper neck piece 227 are lifted and temporarily removed from stationary lower neck piece 228. The removed powertrain components are set aside for later re-installation.

Altering Spat (Step F, FIG. 30B) Spat apertures 351 and 352 (see FIG. 21), required for the cooperative and compatible fit of spat 156 in the presence of various newly installed auxiliary powertrain components, are created in spat 156.

Remounting modified spat The newly-fenestrated spat 156 is reinstalled over pedestal neck 228 and idler-arm assembly 272. The original bolts (not shown) holding spat 156 to underlying framework 132 are reinserted and secured.

Re-mounting engine-attached upper pedestal assembly (Step G, FIG. 30B) Upper neck 227, with attached upper platform 229 and engine 201, is slipped back down onto vehicle-mounted lower neck piece 228. V-Belt 242 is again operably positioned in operational groove of proximal sheave 238. Controller links are reattached at respective engine-connection adaptations: (a) on-off controller wire 349 is operably attached to on-off switch 210; cable aft end 336 is securely clamped to attachment adapter 214; (b) throttle-wire 347 is connected to throttle-arm 209; conduit 333 is securely clamped to attachment-adapter 213; (c) choke-cable wire 341 is inserted into choke-lever 211; cable-conduit 340 is securely clamped to proximate attachment-adapter 215.

Installing PTO-related idler pulleys and frame-fabrication (See again Step E, FIG. 30B) Tetragonal frame 248 is bolted to engine 201; and idler pulleys 246 and 247 are then engaged with belt 242 and operably bolted to frame 248.

Fine-adjusting (Flowchart Step L) a) Travel of idler controller-arm 273 is adjusted; b) tension of idler-arm belt-tensioning spring 276 is adjusted; c) height and twist of pedestal neck 227 is adjusted. All attaching hardware assemblies are then continuingly secured.

Installing powertrain enclosure (Step M, FIG. 30C) Enclosure 291 is set over the top of engine 201 and certain auxiliary-driveline components. Exhaust pipe is directed down and then left for emission forward and outboard of left rear wheel 262. Enclosure 291 is secured to spat 156 with nut and bolt fastening means (not shown).

End (Manufacturing completed) The manufacturing essentials of a first embodiment in accordance with our present invention have been completed, providing a hybrid-powered slow-speed vehicle 400.

OPERATIONAL DESCRIPTION

B. How to Use; How it Works

FIGS. 31A-D provide a flowchart (Flowchart II) illustrating exemplary steps in an embodiment of a method, method 600, a method of travel-range extension through an embodiment of our hybrid slow-speed vehicle 400 (FIG. 10). FIGS. 31A-C address the composition of various embodiments of hybrid slow-speed vehicles in accordance with our invention. The teachings of the description below emphasize "operating the vehicle" (FIG. 31D, StepD). In general, our target of an extended travel-range is reached by hybrid-powered vehicle 400 utilizing its primary and auxiliary powertrains, powertrains 151 and 200, respectively, in various sequences and combinations, employing complementary and cooperative contributions of each powertrain, and their respective specific energies (torque), to provide vehicle-drive.

To the degree feasible, vehicle 107 fundamental operational features, with the exception of travel range limitations, survive the re-configuration into vehicle 400, a useful combination of vehicle 107 plus enclosed auxiliary powertrain 200 and auxiliary operational-controller assembly 300.

Vehicle 400 is generally started on travel solely using primary battery-electric powertrain 151 in the usual and customary manner employed for vehicle 107. Then, when the road-load on primary powertrain 151 and thus also the rate of battery-electric energy expenditure is to be reduced; and when appropriate circumstances and surroundings for the operation of auxiliary powertrain 200 exist; auxiliary ICE-powertrain 200 is then prepared for its cooperative contribution to vehicle 400 propulsion.

Vehicle 400 is kept moving under primary power 151, preferably bringing its speed to roughly the predetermined auxiliary-powered minimum speed, but generally (with exception, cited later) to no less than roughly 10 mph (16 km/h) in this embodiment, consistent with engine 201 idle speed 206 (1500 rpm, see FIG. 11). Remote auxiliary-controller 303 (FIGS. 24A&B) is utilized to set engine on-off switch 210 (FIG. 27) to "on"; remote control knob 338 (FIG. 24B) is pulled out to close engine manual-choke lever 211 (FIG. 28), if engine is "cold"; remote throttle handle 310 (FIGS. 24A&B) is rotated clockwise setting engine throttle-arm 209 (FIG. 29) to "start" position. Dual-lever 305 (FIG. 24A) is disengaged to the right from its console latch-notch 312; and handle 310 is then pulled aftward, displacing lower end 308 of dual-lever 305 forward. The forward motion of end 308 pulls tie-rod 315 (FIG. 26) forward, releasing spring-biased idler-arm 273 (FIG. 13). Arm 273 pivoting forward below its pivot-axis 278 moves arm 273 aft above pivot-axis 278, repositioning idler-arm sheave 281 to its spring-biased power-engaging position against driving-belt 242, tensioning belt 242 around driving and driven sheaves 238 and 256. This driveline clutch-coupling engagement results in left rear auxiliary-drive road-wheel 262 transferring useful kinetic energy of vehicle 400 forward motion through road-wheel 262 to sheave 256 to belt 242 to sheave 238 to PTO shaft 217, thereby cranking engine 201 into a startup. When engine has started, choke-knob 338 (FIG. 24B) is pushed back, restoring manual-choke lever 211 (FIG. 28) to "open" position.

Using foot-operated accelerator-pedal (not shown) for primary motor 153 speed selection, and using hand-operated throttle-controller handle 310 (FIG. 24A) for auxiliary engine 201 speed selection, the relative cooperative contributions of primary and auxiliary powertrains 151 and 200 (FIG. 10) to vehicle-drive are influenced. Auxiliary powertrain 200 can be throttled up or down, shut off, restarted, disengaged/re-engaged as is desired, adjusting vehicle speeds and ICE-201 contributions to desired levels, at or less than predetermined maximum forward vehicle-speed 142. When vehicle acceleration need or other conditions requiring additional torque arise, the simultaneous operation of both primary (151) and auxiliary (200) powertrains may be advantageous. Whenever vehicle 400 is slowed below auxiliary-power actuating speed, proximal and distal powerwheels 238 and 256 (FIG. 12B) are preferably operably disengaged through the clutch-coupling and engine 201 preferably roughly-simultaneously shut off (FIGS. 24A & 29), thereby immediately interrupting noise, emissions, and ICE-fuel consumption by auxiliary powertrain 200.

When auxiliary powertrain 200 is in vehicle-propulsion action, primary powertrain 151 use can be reduced and energy-efficiency of auxiliary powertrain 200 increased by rocking vehicle-direction-switch, VDS (not shown), to "neutral". It should be noted that vehicle 107 (and thus vehicle 400 also), like certain other BESS-vehicles, has a regenerative braking system in its primary powertrain 151. The motor-controller (not shown) triggers motor-braking during vehicle drive in certain circumstances, such as when the accelerator foot-pedal (not shown) is released to less than the needed depression-level for maintaining the vehicle speed at hand. The regenerative braking slows the vehicle more rapidly than does solely the friction of coasting.

In order to maximize battery-energy savings, it is within the spirit of our present invention (see FIG. 10) to operate auxiliary powertrain 200 at times without simultaneous propulsion-use of primary powertrain 151. Merely reducing primary-powertrain 151 accelerator-pedal depression does slow the energy drain on battery 154. However, as just mentioned, regenerative braking is thereby triggered, undesirably in this circumstance, adding a vehicle-slowing resistance and additional energy draw from any continuing auxiliary-propulsion force 201 and respective fuel-supply 203, albeit with some small degree of recharge to battery bank 154. To by-pass this electronic braking and its drain against auxiliary vehicle propulsion, the vehicle direction switch of primary drivetrain 151 (VDS rocker switch not shown, but providing three switch-positions—forward, neutral, and reverse) is switched to "neutral". In the neutral switch-position, the regenerative braking is temporarily disabled as the accelerator pedal remains depressed to any degree. In that way, the propulsion energy from auxiliary powertrain 200 is not diluted by having to overcome travel-resistance from regenerative braking. In terms of vehicle safety and reduction in rate of brake-shoe wear, one will appreciate that if auxiliary-power driveline 235 be engaged, throttling down engine 201 will also provide a certain auxiliary-ICE-201 slowing resistance to vehicle 400 motion by engine-compression braking. Optionally, when vehicle 400 slowing is desired, primary powertrain 151 may be re-engaged (unshown VDS switch rocked to "forward" position), and both primary (151) and auxiliary (200) power-trains used synchronously for their respective braking features, supplemented by mechanical braking, as needed.

The skilled artisan will recognize that another way of reducing or disabling regenerative braking may be through motor-controller reprogramming.

Vehicle 400 travel utilizing operation of auxiliary powertrain 200 generally can continue for as long as: a) vehicle 400 speed remains generally at or above predetermined auxiliary-powered minimum speed, b) ICE-fuel energy supply 203 remains adequate, c) auxiliary powertrain-200 use otherwise remains appropriate and desirable for circumstances at hand. When vehicle 400 slows below predetermined auxiliary-powered minimum speed, solely primary powertrain 151 use is generally resumed. If speed restriction for an operating circumstance requires travel below minimum speed for customary auxiliary powertrain operation and battery 154 energy reserve be at insufficient or undesirable* level for further supplying of primary powertrain 151, then full-featured vehicle-400 operation will cease. (*Those skilled in the art will know that depth of discharge, DOD, is a significant factor influencing service life of a deep cycle lead acid battery, shallower DOD's promoting longer battery life. Thus, what constitutes sufficient and desirable battery energy reserve will be subjectively influenced by battery-life considerations, among others.)

Our first embodiment of our present invention provides another advantage over a solely battery-electric vehicle, when primary powertrain 151 is not operable for vehicle propulsion and startup of auxiliary engine 201 by the kinetic energy of the electrically-powered vehicle 400 motion. By one of two methods, in such instances, vehicle 400 operation solely via auxiliary powertrain 200 can be used beginning even at a vehicle 400 forward speed and engine 201 speed each at zero. The differences in the methods are in the manner of starting engine 201.

By a first method, presuming ICE-fuel supply 203 being sufficient, vehicle 400 stalled, power idler-arm assembly 272 in power-disengaged position, ignition switch "off" or VDS (not shown) in "neutral", and vehicle parking-brake handle (FIG. 24B) engaged: enclosure-rear 293 (FIG. 22) is opened (not shown), auxiliary engine 201 is manually started by its standard manual recoil-starter (FIG. 27)—choke, on-switch, and throttle position-settings, as required. Enclosure-rear 293 is closed. By a second method, under the same presumptions, except that parking brake being disengaged, vehicle 400 forward motion is begun by coasting down a slope and/or by manual pushing of the vehicle. When a forward speed of roughly 2-4 mph is attained in this way, driver then engages clutch-sheave 281 (FIGS. 14&13) through controller handle 310 (FIG. 24A) bringing engine 201 to a start. The belt-tensioning (FIG. 14) is then released, allowing the engine to idle. With engine 201 running by either method, handbrake (FIG. 24B) is or has been released at this point. The throttle (FIG. 24A) is then "nursed" by the driver, and the driveline-clutching idler-arm sheave 281 gradually re-engaged against belt 242 (FIG. 13) by gradual pull-back on lever-handle 310 (FIG. 24A). The allowance of substantial belt 242 slippage, primarily through sheave 256, compensates for the relatively high gear ratio and low torque of this vehicle-startup method. Vehicle 400 is thereby eased into a gradually accelerating forward motion and eventually up to a power-efficient speed. By either of these methods, a self-propelled return of vehicle 400 to a suitable battery-charging location may be feasible, avoiding a need for vehicle-tow. Secondary accelerated wear of replaceable belt 242 may occur.

Vehicle 400 preserves significant advantages of BESS-vehicle 107. Given its high energy density, ICE fuel 203 can typically be readily stored onboard in weight and volume sufficient for a substantial daily sum of vehicle missions' ranges. Fuel storage may be in the primary tank, as shown. Additional onboard fuel capacity may be provided readily by primary tank replacement with larger one (not shown) and/or through addition of an accessory tank (not shown). Even when prematurely depleted, ICE-fuel supply 203 can generally be conveniently and rapidly replenished, in contrast to the long and slow standard rechargings of primary powertrain 151 battery bank 154. Auxiliary powertrain 200 thereby can take on a substantial share of the daily travel-propulsion of vehicle 400, a) reducing the rate of battery 154 energy depletion/discharge, and b) providing an auxiliary source of drive to vehicle 400 over an extended travel-range between battery 154 full-rechargings, a travel-range significantly greater than the battery-full-charge range of vehicle 107. As a further advantage, auxiliary powertrain 200 usage can extend life of battery 154 by reducing depth of discharges required to meet extended-travel demands. In addition, user-confidence regarding having an adequate travel range in many urban

DESCRIPTION

A Second Embodiment

FIGS. 32 & 33 exemplify certain fundamental features of a golf-car style embodiment of a hybrid ICE-electric slow-speed vehicle in accordance with our present invention. BESS-vehicle 108, incorporating wheelbase and primary-powertrain configurations like those of vehicle 102 (FIG. 2) as well as other features exemplified in FIG. 9, provides the BESS-vehicle component to hybrid-vehicle 402. The skilled artisan will readily envision a range of possible and necessary differences in certain shapes, dimensions, materials, sites and methods of attachments, and other undefining aspects of the fundamental components of auxiliary-drive powertrain and auxiliary-drive operational controller assembly that make up hybrid-vehicle 402 and other embodiments. The skilled artisan will also understand these and other un-defining differences between vehicle 402 and first embodiment 400 (FIG. 32 vs. 10 and FIG. 33 vs. 22), and others, as being within the scope of our present invention.

In the interest of product-cost containment and other considerations, many of the details exemplified in vehicle 402 are unchanged from vehicle 400, whenever possible. Those previously discussed require no further description here. Components of vehicle 402 in alternate forms to those of vehicle 400 are labeled with the suffix "-8" or "-2". Especially significant differences between vehicles 400 and 402 meriting mention here include: a) base BESS-vehicle 108 and thereby vehicle 402 having a rear-wheel-drive primary-powertrain, powertrain 152; b) primary-drive travel range of vehicles 108 and 402 being roughly 64 km (40 mi); c) predetermined top forward vehicle speed of vehicle 402 being 32 km/h (20 mph); d) distal sheave 256-8 outer diameter (not shown for vehicle 402) being 381 mm (15-inch)—proximal sheave outer diameter (see sheave-diameter 239, FIG. 13B) remaining 36 mm (1.4-inch); e) engine-mounting assembly (not shown), auxiliary-powertrain enclosure 291-2 (FIG. 33), and operational-controller assembly console 314-2 (FIG. 33) being shaped and sized compatibly for operably attaching and integrating with vehicle 108 chassis and body.

DESCRIPTION

Additional Embodiments

Overview Flowchart III as provided through FIGS. 35A-F present exemplary steps in a method 502 for the manufacture of various embodiments of slow-speed hybrid-powered vehicles in accordance with our present invention. Embodiments of our slow-speed hybrid-powered vehicles and our methods of manufacture of slow-speed hybrid-powered vehicles, collectively feature: a) battery-electric primary drivetrain slow-speed base-vehicles having predetermined top self-propelled speeds within the range of roughly 21-40 km/h (13-25 mph) when operating on level driving surfaces (Decision 502-$i$); b) the primary battery-electric powertrains driving various numbers and combinations of front and rear road-wheels (Step 502-A) (see also FIGS. 1-6); c) ICE-powered auxiliary powertrains at the least providing direct-drive to one reciprocally dismountable non-steering rear road-wheel of each vehicle, excluding from auxiliary-driveline coupling-sequence a power-transfer coupling to a live rear axle before the power-transfer sequence reaching the road-traction wheel (see FIGS. 10&11); d) one or more hub-axial wheel positioner (FIGS. 10&11) through which a suitably dimensioned operational space 283 (FIGS. 10, 11, 13A) for an auxiliary driveline is established (Step 502-D); e) remote control assemblies for the auxiliary powertrains, the controls situated in driver-reachable operational zones (Step 502-J).

Base-vehicles by wheelbase and primary powertrain configurations (See FIGS. 1-6) BESS-vehicle in some embodiments may have primary powertrain and wheelbase configurations that differ (see FIGS. 2-6) from those (FIG. 1) within our first embodiment. In others, they will be as in FIG. 1. For still others, the configuration may not have been illustrated herein. The primary electric powertrain in its various embodiments may be front-wheel-drive, rear-wheel drive, or both. Wheel numbers may vary from three to many. Wheel tracking can be in or out of line, front to rear. Auxiliary powertrain is always rear road-wheel powering, in a driveline-sequence excluding auxiliary-power-transferring coupling to a rear axle prior to power-transfer to an auxiliary driveline rear traction-wheel. These various additional (not shown) hybrid-powered embodiments may operationally serve in various capacities, such as hybrid-powered LSV's, hybrid-powered golf cars, hybrid-powered slow-speed utility vehicles, hybrid-powered slow-speed transport vehicles, and others within the scope of our claims. Vehicle wheels: total number, sizes, non-steering rear Vehicle 107 (and thereby vehicle 400 also) has four road-wheels. Many other vehicles of the vehicle-cohort of our present invention also have four road-wheels each; however, a three-wheeled chassis (see FIGS. 2, 4, and 6, or a more-than-four-wheel chassis (not shown) does not preclude membership in the cohort; and can be readily envisioned by one skilled in the art as satisfactory for certain embodiments of the present invention. A non-steering rear-wheel assembly—for example wheel-assembly 118, as non-exclusively exemplified in vehicles 400 and 402—is fundamental to each vehicle of this grouping. The 10-inch (254 mm) nominal diameter 126 of wheel barrel 124 and the 18-inch (457 mm) rear-wheel outer diameter 123, as in vehicles 107 & 400 is common, but not required. Smaller and larger wheel-barrel diameters, ranging from approximately 8-inch (203 mm) to 17-inch (432 mm), as in wheels well known in the base-vehicle market-niche—the barrels typically mated with tires yielding rear-wheel outer diameters ranging from near 16-inch (406 mm) to at least 23-inch (584 mm)—are suitable in various embodiments. Dimensions outside of those stated may also be satisfactory in certain embodiments.

Horsepower/Torque; and Other Engine 201 of powertrain 200 is selected from a small engine class that non-exclusively includes United States EPA nonroad SI (spark-ignition) subgroup I (less than 225 cc) and subgroup II (equal to or greater than 225 cc). As those familiar with the art will know, the range of possibilities is broad among internal-combustion spark-ignition small engines and the various compatible high energy-density fuels. Within the spirit of our present invention, among the considerations influencing engine-choice are two of primary mention: i) torque demands upon engine from vehicle road-load, travel-surface, and topography-characteristics; and ii) predetermined top travel-speed of vehicle to be provided by ICE-powertrain. Each of these considerations contributes to defining the minimum required horsepower and engine-speed operating-range. An engine rated as little as 1.5 kW (2 hp) and having suitable drive-gear ratio and torque curve can be configured to propel a BESS-vehicle 107 having a gross vehicle weight of up to at least 840 kg (1850 lbs) at a top vehicle speed of 40 km/h (25 mph) on smooth level grade. Other important considerations in engine selection for various engine embodiments include engine dimensions, weight, cost, features specific for noise and gaseous emissions-reductions (features through OEM, through aftermarket sources, or both), reliability, maintenance requirements, and fuel flexibility, to name some. Our present invention adds to already increasing market-pressures for production of more planet-friendly small-ICE powertrains, continuing today's trending away from smog-producing, soot-producing ones.

Horizontal PTO shaft The horizontal orientation of power-take-off shaft 217, as in our first embodiment, is advantageous. Counterclockwise shaft-rotation has influenced selection of engine 201 location at left of aft space 109. In some embodiments a right-sided engine location might be favored, as for example, for a clockwise-rotating PTO shaft (not shown). In still other embodiments, the auxiliary drive engine having a clockwise-rotating PTO shaft will be located aft and left, and an engine having counterclockwise shaft rotations will be located aft and right, as will be clear to the skilled artisan.

Vertical PTO shaft An alternative vertical shaft-orientation, as in shaft 218 in FIG. 36, can be acceptable in certain embodiments. It may increase the complexity and costs through the mechanism (FIG. 36) required for shifting engine rotational force into the plane of rotation of auxiliary-drive rear vehicle-wheel 262. Non-exclusive potential mechanisms to achieve such a force directional-shift include a belt operational-plane rotation mechanism 360, as shown, or a right-angle gear box (not shown), as will be readily envisioned by one skilled in the art.

Various driveline composition advantages Intending the powering contribution of our auxiliary powertrain engine 201 to vehicles 400 and 402 to most generally not begin until the vehicle be traveling in its low to mid or greater travel speed range, the relatively simple direct driveline 235 with single gear ratio is preferably employed for its economy and reliability. However, other more complex driveline assemblies, still having single gear-ratios, such as those utilizing centrifugal clutch 284 (FIG. 36) and/or jackshaft assemblies (not shown), can be alternatively suitable though generally more expensive, less energy-efficient, and may require additional engine features (for example—not shown—an electric engine-startup system). If a secondary mechanical clutch-engaging feature that was not dependent upon PTO shaft-powering clutch-rotations were to be integrated into a centrifugal clutch, such as clutch 284, in a hybrid configuration of a centrifugal clutch (not shown), then a need for an electric engine-startup system could be obviated in the uses of a centrifugal-clutch driveline clutch-coupling. Vehicle-motion kinetic energy startup, similar to that taught for vehicle 400, could be utilized in that hybrid-clutch configuration.

Alternate auxiliary-driveline clutch-coupling options As illustrated in FIG. 37 an engine-mount, mount 220-2, can readily be configured to slide fore and aft, thereby reciprocally increasing and decreasing the distances between the center-points of proximal and distal powerwheels. As shown in FIG. 38, an engine-mount 220-3 can readily be configured to reciprocally pivot on a horizontal axis that is perpendicular to, and fore or aft of, a line connecting the center-points of proximal and distal powerwheels, achieving a similar clutch-coupling outcome. Such engine-mount motions, sliding or pivoting, are readily controllable by adaptations in auxiliary operational controller assembly, adaptations (not shown) as will be readily envisioned by one skilled in the art. The sliding or pivoting engine-mount motions provide reciprocal tension and relaxation in a drivebelt that operably links the powerwheels, providing clutch-coupling engagements and disengagements.

Engine operating speed and powerwheel diameters Engine operating speed and powerwheel diameters determine vehicle speed. As exemplified in vehicle 400, engine operating-speed range 207 (FIG. 11), from high to low, and auxiliary driveline 235 specifications, particularly outer diameters 239 and 257 of powerwheels 238 and 256, respectively, are co-dependent variables. Assigned values for the two powerwheel diameters may solely define the powertrain gear ratio, as they do in our first embodiment. In embodiments utilizing jackshaft assembly, additional powerwheels will also figure into the gear-ratio equation. At the least, in all embodiments, proximal and distal powerwheels diameters always factor into the powertrain final gear-ratio.

For vehicle 400, vehicle top forward speed 142 of 40 km/h (25 mph) on wheel 262 having 18-inch (457 mm) outer diameter 126 corresponds to a wheel speed of approximately 470 rpm. Engine speed operating range 207 as recommended by engine manufacturer of engine 201 is 2500 rpm to 4000 rpm. The wheel-to-engine speed ratio in this instance is 470 divided by 4000, the rounded-off quotient being 0.12. As the wheel-to-engine speed ratio and the proximal-to-distal powerwheel diameter ratio are mathematically equivalent, the proper outer diameter of either powerwheel is readily calculable from the known diameter of the other, using the speed-ratio diameter-ratio quotient in the calculation. For a predetermined 12-inch (305 mm) outer diameter 257 for distal sheave 256, outer-diameter 239 of proximal sheave 238 would be 12-inch (305 mm) multiplied by 0.12, yielding the product of the computation, 1.4-inch (36 mm). If operable diameter 239 be even slightly larger, for example 1.5-inch (38 mm), then required engine speed to provide top vehicle speed 142 at 40 km/h (25 mph) would be slightly lower, at approximately 3760 rpm (12-inch divided by 1.5-inch multiplied by 470 rpm, or 305 mm divided by 38 mm multiplied by 470 rpm).

The above mathematical relationships are also useful in regard to lower vehicle speeds, as further explained here. The low end vehicle speed corresponding to engine 201 running at the lowest recommended operating speed, a speed of 2500 rpm for first embodiment, is calculable by multiplying the 25 mph (40 km/h) speed 142 by a relative rpm factor. The relative rpm factor is generated by dividing the engine low-end operating rpm by the engine high-end operating rpm. Thus the relative rpm factor in this first embodiment scenario would be 2500 divided by 4000, and for the other example above, 2500 divided by 3760—0.63 and 0.67, respectively. Thus, the vehicle 400 speeds for optional starts of efficient contributions from auxiliary powertrain 200 in these examples would be 25 mph (40 km/h) multiplied by 0.63 (for the first example) or multiplied by 0.67 (for the second example), which equals approximately 15.8 mph (25 km/h) and 16.8 mph (27 km/h), respectively.

Among many other specification-suitable and readily available small internal combustion engines, an engine manufacturer's recommended engine operating range of about 2000 rpm to about 3600 rpm is common. For alternative embodiments using an engine having that exemplary operating-speed range, the relative-rpm-factor is 0.56 (2000 rpm divided by 3600 rpm). When 25 mph (40 km/h) constitutes the top vehicle speed at a 3600 rpm engine-output, then 25 mph (40 km/h) multiplied by 0.56 (equals approximately 14 mph, roughly 23 km/h) becomes the recommended general use low-end vehicle speed for auxiliary operation of the ICE-powertrain.

In certain other embodiments, top vehicle speed is 20 mph (32 km/h). If engine operating range be 2500 to 4000 rpm for such a vehicle, and the other variables above have the previously stated values, then the low-end vehicle speed under auxiliary drive will be 20 mph (32 km/h) multiplied by the relative-rpm-factor of 0.63, the mathematical product being approximately 12.5 mph (20 km/h). If the engine operating range be 2000 to 3600 rpm, low-end vehicle speed under auxiliary drive will be 20 mph (32 km/h) multiplied by relative rpm factor 0.56, the product equaling approximately 11 mph (18 km/h).

Axial wheel position Various driveline dimensional differences in certain other embodiments can be accommodated by any one or more of various hub-coaxial wheel positioners 269 including wheel lug sets 353, wheel-spacers 270 (FIGS. 17 & 20), and mounting-plate off-sets (not shown), helping define necessary clearance for driveline operational space 283.

Other Among still other embodiments, some are generated through selecting other alternative qualitative and/or quantitative features of yet additional variables, still adhering to the spirit of our present invention. For non-exclusive examples: a) wide ranges of engine-mounting assemblies (not shown); b) a right rear-wheel-powering auxiliary drivetrain instead of a left-powering drivetrain (not shown); various other fixed attachment couplings of distal powerwheel 256 to rear-wheel barrel 124 (not shown); proximal driving powerwheel 237 coupled directly to centrifugal clutch 284 coupled to PTO shaft 217 (FIG. 36) and other proximal auxiliary driveline assemblies (FIGS. 30D&E); sprocket for sheave swap (not shown); jackshaft addition (not shown) within driveline, yielding interval powerwheels between proximal and distal powerwheels; other (not shown) mechanical, hydraulic, electrical, and/or wireless remote operational-controller linkages to powertrain; other controller-assembly designs and configurations (not shown); other engine specifications including alternate or additional fuel-burning capacities, alternate or additional engine emissions-reducing components (not shown) for gases, particulates, and/or noise.

Additionally, it will be readily apparent to those skilled in the art that certain embodiments of our travel-range extension method encompass slow-speed hybrid-vehicle auxiliary-powertrain configurations other than those taught above. For instance, an auxiliary ICE-powertrain mechanically integrated into the primary-powertrain driveline of the BESS-vehicle, be it a front or rear-wheel-powering driveline, may alternatively serve the essence of a travel-range extension method in accordance with our present invention.

CONCLUSIONS, RAMIFICATIONS, AND SCOPE

Those having skill in the art and other readers can now more readily appreciate various features fundamental and common to embodiments of our present invention. Although the descriptions provided herein contain many specificities, they should not be construed as limiting the scope of the embodiments, nor the ramifications; they merely provide illustration of certain embodiments. Various changes may be made and equivalents may be substituted for members thereof, without departing from the scope of the present invention.

Regarding our method claims, in the absence of explicit language constraining the order in which certain steps should be performed, the method claims should not be construed to require unequivocally that the steps always be performed in the order in which they are recited herein. Modifications may be made to adapt a particular situation to the teachings of the invention without departing from the essential scope thereof.

Therefore, it is intended that the present invention not be limited to the particular embodiments disclosed for carrying out this invention; rather that this invention will include all embodiments falling within the scope of the appended claims and their legal equivalents.

We claim:
1. An improved battery-electric slow-speed vehicle, whereas the improvement comprising an auxiliary-powertrain, said auxiliary powertrain comprising (i) an engine, (ii) an at least one non-steering rear road-wheel, (iii) a means for controllably coupling rotational force from said engine to said at least one non-steering rear road-wheel, the means comprising a predetermined distal powerwheel operably coupling to a wheel-barrel of the road-wheel, the powerwheel positioning in an auxiliary-driveline operational space, the space urged by a hub-coaxial rear-wheel positioner; and (iv) an auxiliary-drive operational-controller;

whereby, the auxiliary powertrain performing compatibly, cooperatively, and controllably with the primary powertrain, the auxiliary powertrain providing opportunity to extend battery life through reduced depths of battery-discharges, while extending vehicle travel-range and preserving many solely-electric-vehicle advantages.

2. A hybrid-powered slow-speed vehicle comprising:
(a) an at least one non-steering rear road-wheel;
(b) a battery-electric primary powertrain;
(c) an auxiliary-powertrain, said auxiliary powertrain comprising an internal combustion engine, an auxiliary-drive operational-controller, and an auxiliary-power driveline assembly, the driveline-assembly comprising (i) a predetermined proximal powerwheel at the engine and a predetermined distal powerwheel at the road-wheel, the proximal and distal powerwheels comprising predetermined diameters urging a predetermined power-ratio, (ii) a means for controllably engaging and disengaging rotational forces from one of the powerwheels to the other powerwheel, (iii) an intra-assembly rigid coupling joining the distal powerwheel with a wheel-barrel of the rear road-wheel, and (iv) a hub-coaxial wheel-positioner enabling an auxiliary-drive operational space for the distal powerwheel.

3. A method of vehicle travel-range extension for a battery-electric slow-speed vehicle, the method comprising the steps of:
(a) providing said battery-electric slow-speed vehicle, the vehicle comprising (1) an at-least-three-road-wheel chassis comprising a removable non-steering rear road-wheel adaptable for coaxial re-positioning, and (2) a primary-drive battery-electric powertrain;
(b) providing an auxiliary-powertrain assembly operationally attaching to the vehicle providing a hybridized said battery-electric slow-speed vehicle, the auxiliary powertrain comprising (1) a small internal combustion engine, (2) an onboard compatible high-energy-density fuel-cell, (3) an auxiliary-power driveline assembly, the driveline-assembly comprising (a) a predetermined proximal powerwheel at the engine and a predetermined distal powerwheel at the road-wheel, the proximal and distal powerwheels comprising predetermined diameters urging a predetermined power-ratio, (b) a means for controllably engaging and disengaging rotational forces from one of the powerwheels to the other powerwheel, (c) an intra-assembly rigid coupling joining the distal power-wheel with a wheel-barrel of the rear road-wheel, and (d) a hub-coaxial wheel-positioner urging an auxiliary-drive operational space for the distal powerwheel, and (4) an auxiliary-drive operational-controller;

(c) operating the hybridized vehicle utilizing said primary-drive battery-electric powertrain and the auxiliary powertrain in various cooperative combinations and sequences of operation, the combinations and sequences comprising: (1) actuating the primary powertrain generally operating alone for initiating forward travel of the vehicle from standstill, (2) continuing vehicle travel under the primary powertrain alone for very low vehicle-speed travels, (3) operating the vehicle under sole power of the primary powertrain for any of the range of possible vehicle speeds when requiring lowest vehicle-emissions during operation, (4) operably engaging the auxiliary powertrain after vehicle attaining a vehicle predetermined minimum travel-speed threshold compatible with engine and driveline operational specifications, assuming vehicle concurrently in suitable circumstances for the various emissions of auxiliary-powertrain use, (5) generally reciprocally discontinuing primary battery-electric powering during sustained uses of the auxiliary powertrain, preserving battery energy until required and strategically limiting depths of battery discharges between recharging, extending battery-life, (6) augmenting auxiliary powertrain service with concurrent primary powertrain operation during conditions requiring additional torque, the two powertrains then providing complementary contributions to vehicle-drive;

whereby the method achieving the extended travel-range while providing a means for battery-life extension and for augmented vehicle-power when needed.

4. The method of claim 3, wherein the engaging and disengaging means comprising at least one of the following members from a group comprising: (i) an auxiliary-driveline power-arm assembly, (ii) an auxiliary-driveline centrifugal clutch, (iii) an engine-mount pivot-assembly, and (iv) an engine-mount slide-assembly.

5. The method of claim 3, wherein fundamental components of the auxiliary powertrain being separate and distinct from fundamental components of the primary powertrain.

6. The method of claim 3, the auxiliary powertrain and the primary powertrain sharing said non-steering rear road-wheel, the road-wheel comprising a traction-wheel for each powertrain.

7. A method of vehicle-manufacture of a hybrid-powered slow-speed vehicle, steps in the method comprising:

(a) providing a predetermined battery-electric slow-speed vehicle, said predetermined battery-electric slow-speed vehicle adaptable for addition of an auxiliary powertrain in a generally-aft vehicle space, prerequisite adaptations comprising (1) providing an auxiliary-driveline operational space at a non-steering rear road-wheel, sufficient dimensions of the space urged by a hub-coaxial wheel-positioner, (2) attaching a predetermined distal power-wheel to a wheel-barrel of the rear road-wheel, 3) modifying the aft vehicle space for installing required components of said auxiliary powertrain, 4) modifying a driver-reachable operational space of the vehicle for installing an auxiliary-drive operational-controller means;

(b) providing and installing a predetermined said auxiliary powertrain, the powertrain comprising a small engine and an auxiliary-power driveline, the driveline comprising said non-steering rear road-wheel operationally coupled with the engine through said predetermined distal powerwheel attached to the rear road-wheel and situated in said auxiliary-driveline operational space urged by said hub-coaxial wheel-positioner;

(c) providing and installing said auxiliary-drive operational-controller means, the operational-controller means comprising on-off, startup, and throttle remote-controllers, the controller-means adapted for being operationally installed in said driver-reachable operational zone, the controller-means operationally linked into said auxiliary powertrain;

whereby the method yielding said hybrid-powered slow-speed vehicle providing practical means for extending vehicle travel-range between required battery recharging, for extending vehicle-battery life, and for augmenting vehicle power for certain circumstances.

8. The method of vehicle-manufacture of claim 7, wherein said auxiliary-power driveline further comprising a proximal powerwheel operably coupled with said engine, the powerwheels paired by a predetermined power-ratio of the respective powerwheel-diameters, the powerwheels operably linked by a rotational-force connecting element;

whereby the power-ratio matching the quotient of rear-wheel speed at a predetermined maximum speed of the vehicle divided by a predetermined maximum engine operational speed, a speed-ratio, limiting maximum vehicle-speed under solely auxiliary powertrain propulsion.

* * * * *